United States Patent
Chan et al.

(10) Patent No.: US 10,754,140 B2
(45) Date of Patent: Aug. 25, 2020

(54) PARALLEL IMAGING ACQUISITION AND RESTORATION METHODS AND SYSTEMS

(71) Applicant: California Institute of Technology, Pasadena, CA (US)

(72) Inventors: Chi Shing Chan, San Diego, CA (US); Changhuei Yang, South Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 16/179,688

(22) Filed: Nov. 2, 2018

(65) Prior Publication Data

US 2019/0137753 A1     May 9, 2019

Related U.S. Application Data

(60) Provisional application No. 62/581,529, filed on Nov. 3, 2017.

(51) Int. Cl.
| | |
|---|---|
| *G02B 21/36* | (2006.01) |
| *H04N 5/232* | (2006.01) |
| *G02B 21/06* | (2006.01) |
| *H04N 5/247* | (2006.01) |
| *H04N 5/225* | (2006.01) |

(52) U.S. Cl.
CPC ......... *G02B 21/367* (2013.01); *G02B 21/06* (2013.01); *H04N 5/2256* (2013.01); *H04N 5/23232* (2013.01); *H04N 5/247* (2013.01)

(58) Field of Classification Search
None
See application file for complete search history.

(56) References Cited

U.S. PATENT DOCUMENTS

| | | | |
|---|---|---|---|
| 5,475,527 | A | 12/1995 | Hackel et al. |
| 6,144,365 | A | 11/2000 | Young et al. |
| 6,154,196 | A | 11/2000 | Fleck et al. |
| 6,320,174 | B1 | 11/2001 | Tafas et al. |
| 6,320,648 | B1 | 11/2001 | Brueck et al. |
| 6,747,781 | B2 | 6/2004 | Trisnadi |
| 6,759,949 | B2 | 7/2004 | Miyahara |
| 6,905,838 | B1 | 6/2005 | Bittner |
| 7,436,503 | B1 | 10/2008 | Chen et al. |
| 7,460,248 | B2 | 12/2008 | Kurtz et al. |
| 7,706,419 | B2 | 4/2010 | Wang et al. |
| 7,738,095 | B2 | 6/2010 | Gardner, Jr. et al. |

(Continued)

FOREIGN PATENT DOCUMENTS

| | | |
|---|---|---|
| CN | 1688254 A | 10/2005 |
| CN | 1932565 A | 3/2007 |

(Continued)

OTHER PUBLICATIONS

Li, Jianping, and Yi Xiao. "GPU accelerated parallel FFT processing for Fourier transform hyperspectral imaging." Applied Optics 54.13 (2015): D91-D98. (Year: 2015).*

(Continued)

*Primary Examiner* — Rebecca A Volentine
(74) *Attorney, Agent, or Firm* — Sheila Martinez-Lemke; Weaver Austin Villeneuve & Sampson LLP

(57) ABSTRACT

Certain embodiments pertain to parallel digital imaging acquisition and restoration methods and systems.

14 Claims, 24 Drawing Sheets

(56) References Cited

U.S. PATENT DOCUMENTS

| | | |
|---|---|---|
| 7,787,588 B1 | 8/2010 | Yun et al. |
| 8,271,251 B2 | 9/2012 | Schwartz et al. |
| 8,313,031 B2 | 11/2012 | Vinogradov |
| 8,497,934 B2 | 7/2013 | Milnes et al. |
| 8,624,968 B1 | 1/2014 | Hersee et al. |
| 8,654,201 B2 | 2/2014 | Lim et al. |
| 8,942,449 B2 | 1/2015 | Maiden |
| 9,029,745 B2 | 5/2015 | Maiden |
| 9,426,455 B2 | 8/2016 | Horstmeyer et al. |
| 9,497,379 B2 | 11/2016 | Ou et al. |
| 9,829,695 B2 | 11/2017 | Kim et al. |
| 9,864,184 B2 | 1/2018 | Ou et al. |
| 9,892,812 B2 | 2/2018 | Zheng et al. |
| 9,983,397 B2 | 5/2018 | Horstmeyer et al. |
| 9,993,149 B2 | 6/2018 | Chung et al. |
| 9,998,658 B2 | 6/2018 | Ou et al. |
| 10,162,161 B2 | 12/2018 | Horstmeyer et al. |
| 10,168,525 B2 | 1/2019 | Kim et al. |
| 10,222,605 B2 | 3/2019 | Kim et al. |
| 10,228,550 B2 | 3/2019 | Ou et al. |
| 10,401,609 B2 | 9/2019 | Ou et al. |
| 10,419,665 B2 | 9/2019 | Ou et al. |
| 10,568,507 B2 | 2/2020 | Chung et al. |
| 10,606,055 B2 | 3/2020 | Horstmeyer et al. |
| 10,652,444 B2 | 5/2020 | Horstmeyer et al. |
| 10,665,001 B2 | 5/2020 | Horstmeyer et al. |
| 10,679,763 B2 | 6/2020 | Zheng et al. |
| 10,684,458 B2 | 6/2020 | Chung et al. |
| 10,718,934 B2 | 7/2020 | Horstmeyer et al. |
| 2001/0055062 A1 | 12/2001 | Shioda et al. |
| 2002/0141051 A1 | 10/2002 | Vogt et al. |
| 2003/0116436 A1 | 6/2003 | Amirkhanian et al. |
| 2003/0118223 A1 | 6/2003 | Rahn et al. |
| 2004/0057094 A1 | 3/2004 | Olszak et al. |
| 2004/0146196 A1 | 7/2004 | Van Heel |
| 2004/0190762 A1 | 9/2004 | Dowski, Jr. et al. |
| 2005/0211912 A1 | 9/2005 | Fox |
| 2006/0098293 A1 | 5/2006 | Garoutte et al. |
| 2006/0158754 A1 | 7/2006 | Tsukagoshi et al. |
| 2006/0173313 A1 | 8/2006 | Liu et al. |
| 2006/0291707 A1 | 12/2006 | Kothapalli et al. |
| 2007/0057184 A1 | 3/2007 | Uto et al. |
| 2007/0133113 A1 | 6/2007 | Minabe et al. |
| 2007/0159639 A1 | 7/2007 | Teramura et al. |
| 2007/0171430 A1 | 7/2007 | Tearney et al. |
| 2007/0189436 A1 | 8/2007 | Goto et al. |
| 2007/0206200 A1 | 9/2007 | Lindner et al. |
| 2007/0269826 A1 | 11/2007 | Geddes |
| 2008/0101664 A1 | 5/2008 | Perez |
| 2008/0182336 A1 | 7/2008 | Zhuang et al. |
| 2009/0046164 A1 | 2/2009 | Shroff et al. |
| 2009/0079987 A1 | 3/2009 | Ben-Ezra et al. |
| 2009/0125242 A1 | 5/2009 | Choi et al. |
| 2009/0284831 A1 | 11/2009 | Schuster et al. |
| 2009/0316141 A1 | 12/2009 | Feldkhun |
| 2010/0135547 A1 | 6/2010 | Lee et al. |
| 2010/0271705 A1 | 10/2010 | Hung |
| 2011/0075928 A1 | 3/2011 | Jeong et al. |
| 2011/0181869 A1 | 7/2011 | Yamaguchi et al. |
| 2011/0192976 A1 | 8/2011 | Own et al. |
| 2011/0235863 A1 | 9/2011 | Maiden |
| 2011/0255163 A1 | 10/2011 | Merrill et al. |
| 2012/0069344 A1 | 3/2012 | Liu |
| 2012/0099803 A1 | 4/2012 | Ozcan et al. |
| 2012/0105618 A1 | 5/2012 | Brueck et al. |
| 2012/0118967 A1 | 5/2012 | Gerst |
| 2012/0157160 A1 | 6/2012 | Ozcan et al. |
| 2012/0176673 A1 | 7/2012 | Cooper |
| 2012/0182541 A1* | 7/2012 | Canham ................ G01C 3/08 356/5.01 |
| 2012/0218379 A1 | 8/2012 | Ozcan et al. |
| 2012/0248292 A1 | 10/2012 | Ozcan et al. |
| 2012/0250032 A1 | 10/2012 | Wilde et al. |
| 2012/0281929 A1 | 11/2012 | Brand et al. |
| 2013/0057748 A1 | 3/2013 | Duparre et al. |
| 2013/0083886 A1 | 4/2013 | Carmi et al. |
| 2013/0093871 A1 | 4/2013 | Nowatzyk et al. |
| 2013/0094077 A1 | 4/2013 | Brueck et al. |
| 2013/0100525 A1 | 4/2013 | Chiang et al. |
| 2013/0170767 A1 | 7/2013 | Choudhury et al. |
| 2013/0182096 A1 | 7/2013 | Boccara et al. |
| 2013/0223685 A1 | 8/2013 | Maiden |
| 2014/0007307 A1 | 1/2014 | Routh, Jr. et al. |
| 2014/0029824 A1 | 1/2014 | Shi et al. |
| 2014/0043616 A1 | 2/2014 | Maiden et al. |
| 2014/0050382 A1 | 2/2014 | Adie et al. |
| 2014/0085629 A1* | 3/2014 | Bodkin ................ G01J 3/021 356/300 |
| 2014/0118529 A1 | 5/2014 | Zheng et al. |
| 2014/0126691 A1 | 5/2014 | Zheng et al. |
| 2014/0133702 A1 | 5/2014 | Zheng et al. |
| 2014/0139840 A1 | 5/2014 | Judkewitz et al. |
| 2014/0152801 A1 | 6/2014 | Fine et al. |
| 2014/0153692 A1 | 6/2014 | Larkin et al. |
| 2014/0160236 A1 | 6/2014 | Ozcan et al. |
| 2014/0160488 A1 | 6/2014 | Zhou |
| 2014/0217268 A1 | 8/2014 | Schleipen et al. |
| 2014/0267674 A1 | 9/2014 | Mertz et al. |
| 2014/0347672 A1 | 11/2014 | Pavillon et al. |
| 2014/0368812 A1 | 12/2014 | Humphry et al. |
| 2015/0003714 A1* | 1/2015 | McCarty ............ G02B 21/367 382/133 |
| 2015/0036038 A1 | 2/2015 | Horstmeyer et al. |
| 2015/0044098 A1* | 2/2015 | Smart ................ A61B 5/0013 422/82.05 |
| 2015/0054979 A1 | 2/2015 | Ou et al. |
| 2015/0160450 A1 | 6/2015 | Ou et al. |
| 2015/0264250 A1 | 9/2015 | Ou et al. |
| 2015/0286042 A1 | 10/2015 | Hilbert et al. |
| 2015/0331228 A1 | 11/2015 | Horstmeyer et al. |
| 2016/0088205 A1 | 3/2016 | Horstmeyer et al. |
| 2016/0110584 A1 | 4/2016 | Remiszewski et al. |
| 2016/0156880 A1 | 6/2016 | Teich et al. |
| 2016/0178883 A1 | 6/2016 | Horstmeyer et al. |
| 2016/0202460 A1 | 7/2016 | Zheng |
| 2016/0210763 A1 | 7/2016 | Horstmeyer et al. |
| 2016/0216208 A1* | 7/2016 | Kim ................ G01N 21/6452 |
| 2016/0216503 A1 | 7/2016 | Kim et al. |
| 2016/0266366 A1 | 9/2016 | Chung et al. |
| 2016/0320595 A1 | 11/2016 | Horstmeyer et al. |
| 2016/0320605 A1 | 11/2016 | Ou et al. |
| 2016/0341945 A1 | 11/2016 | Ou et al. |
| 2017/0061599 A1 | 3/2017 | Remiszewski et al. |
| 2017/0146788 A1 | 5/2017 | Waller et al. |
| 2017/0178317 A1 | 6/2017 | Besley et al. |
| 2017/0188853 A1 | 7/2017 | Nakao et al. |
| 2017/0273551 A1 | 9/2017 | Chung et al. |
| 2017/0299854 A1 | 10/2017 | Kim et al. |
| 2017/0354329 A1 | 12/2017 | Chung et al. |
| 2017/0363853 A1 | 12/2017 | Besley |
| 2017/0371141 A1 | 12/2017 | Besley |
| 2018/0045569 A1* | 2/2018 | Nath ................ G01J 3/36 |
| 2018/0048811 A1 | 2/2018 | Waller et al. |
| 2018/0078447 A1 | 3/2018 | Viner et al. |
| 2018/0078448 A9 | 3/2018 | Shockley, Jr. et al. |
| 2018/0088309 A1 | 3/2018 | Ou et al. |
| 2018/0120553 A1 | 5/2018 | Leshem et al. |
| 2018/0231761 A1 | 8/2018 | Dai et al. |
| 2018/0307017 A1 | 10/2018 | Horstmeyer et al. |
| 2018/0316855 A1 | 11/2018 | Ou et al. |
| 2018/0329194 A1 | 11/2018 | Small et al. |
| 2018/0348500 A1 | 12/2018 | Naaman, III et al. |
| 2018/0373016 A1 | 12/2018 | Leshem et al. |
| 2019/0049712 A1 | 2/2019 | Kim et al. |
| 2019/0056578 A1 | 2/2019 | Horstmeyer et al. |
| 2019/0077610 A1 | 3/2019 | Flammann |
| 2019/0097523 A1 | 3/2019 | Schaefer |
| 2019/0097524 A1 | 3/2019 | Lin |
| 2019/0317311 A1 | 10/2019 | Kim et al. |

(56) References Cited

U.S. PATENT DOCUMENTS

2019/0331902 A1  10/2019  Ou et al.
2019/0391382 A1  12/2019  Chung et al.

FOREIGN PATENT DOCUMENTS

| | | |
|---|---|---|
| CN | 1311392 C | 4/2007 |
| CN | 101408623 A | 4/2009 |
| CN | 101680848 A | 3/2010 |
| CN | 101743519 A | 6/2010 |
| CN | 101868740 A | 10/2010 |
| CN | 101872033 A | 10/2010 |
| CN | 101957183 A | 1/2011 |
| CN | 102292662 A | 12/2011 |
| CN | 102608597 A | 7/2012 |
| CN | 102753935 A | 10/2012 |
| CN | 103096804 A | 5/2013 |
| CN | 103154662 A | 6/2013 |
| CN | 103201648 A | 7/2013 |
| CN | 103377746 A | 10/2013 |
| CN | 104101993 A | 10/2014 |
| CN | 104181686 A | 12/2014 |
| CN | 104200449 A | 12/2014 |
| JP | 2007-299604 A | 11/2007 |
| JP | 2008-147629 A | 6/2008 |
| JP | 2010-012222 A | 1/2010 |
| KR | 10-1998-0075050 A | 11/1998 |
| TW | 201428339 A | 7/2014 |
| WO | WO 99/53469 A1 | 10/1999 |
| WO | WO 2002/102128 A1 | 12/2002 |
| WO | WO 2003/062744 A1 | 7/2003 |
| WO | WO 2008/116070 A1 | 9/2008 |
| WO | WO 2011/093043 A1 | 8/2011 |
| WO | WO 2012/037182 A1 | 3/2012 |
| WO | WO 2014/070656 A1 | 5/2014 |
| WO | WO 2015/017730 A1 | 2/2015 |
| WO | WO 2015/027188 A1 | 2/2015 |
| WO | WO 2016/090331 A1 | 6/2016 |
| WO | WO 2016/106379 A1 | 6/2016 |
| WO | WO 2016/118761 A1 | 7/2016 |
| WO | WO 2016/123156 A1 | 8/2016 |
| WO | WO 2016/123157 A1 | 8/2016 |
| WO | WO 2016/149120 A1 | 9/2016 |
| WO | WO 2016/187591 A1 | 11/2016 |
| WO | WO 2017/066198 A1 | 4/2017 |
| WO | WO 2017081539 A1 | 5/2017 |
| WO | WO 2017081540 A1 | 5/2017 |
| WO | WO 2017081542 A2 | 5/2017 |

OTHER PUBLICATIONS

Preliminary Amendment dated Mar. 17, 2014 filed in U.S. Appl. No. 14/065,280.
Preliminary Amendment dated Apr. 25, 2016 filed in U.S. Appl. No. 14/710,947.
Preliminary Amendment dated Jun. 13, 2018 filed in U.S. Appl. No. 15/820,295.
U.S. Office Action dated Aug. 16, 2016 in U.S. Appl. No. 14/065,280.
U.S. Final Office Action dated Apr. 3, 2017 in U.S. Appl. No. 14/065,280.
U.S. Office Action dated Jan. 25, 2018 in U.S. Appl. No. 14/065,280.
U.S. Final Office Action dated Nov. 29, 2018 in U.S. Appl. No. 14/065,280.
U.S. Office Action dated Oct. 5, 2015 in U.S. Appl. No. 14/065,305.
U.S. Notice of Allowance dated Dec. 4, 2015 in U.S. Appl. No. 14/065,305.
U.S. Office Action dated Sep. 16, 2016 in U.S. Appl. No. 14/065,305.
U.S. Notice of Allowance dated Jan. 13, 2017 in U.S. Appl. No. 14/065,305.
U.S. Notice of Allowance dated Jun. 9, 2017 in U.S. Appl. No. 14/065,305.
U.S. Notice of Allowance dated Dec. 4, 2017 in U.S. Appl. No. 14/065,305.
U.S. Notice of Allowance dated Jan. 22, 2016 in U.S. Appl. No. 14/466,481.
U.S. Notice of Allowance dated Apr. 22, 2016 in U.S. Appl. No. 14/466,481.
U.S. Notice of Allowance dated Aug. 23, 2016 in U.S. Appl. No. 14/466,481.
U.S. Notice of Allowance dated Aug. 16, 2017 in U.S. Appl. No. 15/209,604.
U.S. Notice of Allowance dated Jan. 26, 2018 in U.S. Appl. No. 15/209,604.
U.S. Office Action dated Dec. 26, 2018 in U.S. Appl. No. 15/963,966.
U.S. Notice of Allowance dated Jan. 14, 2016 in U.S. Appl. No. 14/448,850.
U.S. Notice of Allowance dated Apr. 13, 2016 in U.S. Appl. No. 14/448,850.
U.S. Notice of Allowance dated Jun. 9, 2017 in U.S. Appl. No. 15/206,859.
U.S. Notice of Allowance dated Sep. 1, 2017 in U.S. Appl. No. 15/206,859.
U.S. Notice of Allowance dated Jan. 23, 2018 in U.S. Appl. No. 15/206,859.
U.S. Office Action dated Dec. 26, 2018 in U.S. Appl. No. 15/959,050.
U.S. Notice of Allowance dated Nov. 2, 2016 in U.S. Appl. No. 14/572,493.
U.S. Notice of Allowance dated Mar. 8, 2017 in U.S. Appl. No. 14/572,493.
U.S. Notice of Allowance dated Mar. 31, 2017 in U.S. Appl. No. 14/572,493.
U.S. Notice of Allowance dated Jun. 20, 2017 in U.S. Appl. No. 14/572,493.
U.S. Notice of Allowance dated Oct. 11, 2017 in U.S. Appl. No. 14/572,493.
U.S. Notice of Allowance dated Sep. 17, 2018 in U.S. Appl. No. 15/820,295.
U.S. Notice of Allowance dated Jan. 14, 2019 in U.S. Appl. No. 15/820,295.
U.S. Office Action dated Mar. 13, 2017 in U.S. Appl. No. 14/658,019.
U.S. Final Office Action dated Jan. 17, 2018 in U.S. Appl. No. 14/658,019.
U.S. Office Action dated Oct. 4, 2018 in U.S. Appl. No. 14/658,019.
U.S. Office Action dated Mar. 24, 2017 in U.S. Appl. No. 14/710,947.
U.S Final Office Action dated Dec. 28, 2017 in U.S. Appl. No. 14/710,947.
U.S. Notice of Allowance dated Jul. 25, 2018 in U.S. Appl. No. 14/710,947.
U.S. Office Action dated Feb. 21, 2017 in U.S. Appl. No. 14/960,252.
U.S. Final Office Action dated Dec. 14, 2017 in U.S. Appl. No. 14/960,252.
U.S. Office Action dated Dec. 13, 2018 in U.S. Appl. No. 14/960,252.
U.S. Office Action dated Jul. 14, 2016 in U.S. Appl. No. 15/007,196.
U.S. Final Office Action dated Jan. 23, 2017 in U.S. Appl. No. 15/007,196.
U.S. Notice of Allowance dated Mar. 22, 2017 in U.S. Appl. No. 15/007,196.
U.S. Notice of Allowance dated Jun. 9, 2017 in U.S. Appl. No. 15/007,196.
U.S. Office Action dated Aug. 31, 2017 in U.S. Appl. No. 15/636,494.
U.S. Notice of Allowance dated Sep. 20, 2017 in U.S. Appl. No. 15/007,196.
U.S. Notice of Allowance dated Jun. 27, 2018 in U.S. Appl. No. 15/636,494.
U.S. Notice of Allowance dated Oct. 5, 2018 in U.S. Appl. No. 15/636,494.
U.S. Office Action dated Nov. 30, 2017 in U.S. Appl. No. 15/007,159.
U.S. Notice of Allowance dated Jul. 16, 2018 in U.S. Appl. No. 15/007,159.
U.S. Office Action dated Sep. 7, 2018 in U.S. Appl. No. 14/979,154.
U.S. Office Action dated Nov. 22, 2016 in U.S. Appl. No. 15/003,559.
U.S. Final Office Action dated Jul. 27, 2017 in U.S. Appl. No. 15/003,559.
U.S. Office Action dated Apr. 4, 2018 issued in U.S. Appl. No. 15/003,559.

(56) References Cited

OTHER PUBLICATIONS

U.S. Final Office Action dated Dec. 10, 2018 issued in U.S. Appl. No. 15/003,559.
U.S. Office Action dated Nov. 3, 2017 in U.S. Appl. No. 15/068,389.
U.S. Office Action Interview Summary dated May 3, 2018 in U.S. Appl. No. 15/068,389.
U.S. Final Office Action dated Jun. 6, 2018 issued in U.S. Appl. No. 15/068,389.
U.S. Office Action dated Jan. 17, 2019 issued in U.S. Appl. No. 15/068,389.
U.S. Office Action dated May 19, 2017 in U.S. Appl. No. 15/081,659.
U.S. Notice of Allowance dated Oct. 20, 2017 in U.S. Appl. No. 15/081,659.
U.S. Notice of Allowance dated Feb. 9, 2018 in U.S. Appl. No. 15/081,659.
U.S. Office Action dated Apr. 13, 2018 issued in U.S. Appl. No. 15/160,941.
U.S. Notice of Allowance dated Oct. 19, 2018 issued in U.S. Appl. No. 15/160,941.
U.S. Notice of Allowance dated Jan. 15, 2019 issued in U.S. Appl. No. 15/620,674.
International Search Report and Written Opinion dated Feb. 21, 2014 in PCT/US2013/067068.
International Preliminary Report on Patentability dated May 14, 2015 in PCT/US2013/067068.
European Third-Party Observations, dated Jan. 20, 2016 in EP Application No. 13851670.3.
European Extended Search Report dated Mar. 31, 2016 in EP Application No. 13851670.3.
Japanese Office Action dated Oct. 17, 2017 issued in Application No. 2015-539884.
Australian Examination Report No. 1, dated Jan. 18, 2018 issued in AU 2014308673.
Chinese Second Office Action dated Oct. 26, 2017 issued in CN 201480057911.6.
Chinese Third Office Action dated Jul. 13, 2018 issued in CN 201480057911.6.
International Preliminary Report on Patentability dated Mar. 3, 2016 issued in PCT/U5S2014/052351.
International Search Report and Written Opinion dated Dec. 5, 2014 issued in PCT/US2014/052351.
Japanese First Office Action dated Jul. 31, 2018 issued in Application No. JP 2016-531919.
International Search Report and Written Opinion dated Nov. 13, 2014 issued in PCT/US2014/049297.
International Preliminary Report on Patentability dated Feb. 11, 2016 issued in PCT/US2014/049297.
Chinese First Office Action dated Jan. 28, 2019 issued in CN 201580072950.8.
International Search Report and Written Opinion dated Feb. 22, 2016 issued in PCT/US2015/064126.
European Extended Search Report dated Jun. 6, 2018 issued in Application No. 15865492.1.
International Search Report and Written Opinion dated May 4, 2016 issued in PCT/US2016/015001.
Extended European Search Report dated Aug. 8, 2018 issued in Application No. EP 16744002.3.
Chinese First Office Action dated Feb. 24, 2018 issued in CN 201680003937.1.
European Extended Search Report dated Aug. 14, 2018 issued in EP 16744003.1.
International Search Report and Written Opinion dated May 11, 2016 issued in PCT/US2016/015002.
International Search Report and Written Opinion dated Jun. 27, 2016 issued in PCT/US2016/022116.
Chinese First Office Action dated Dec. 28, 2018 issued in Application No. CN 201680005491.6.
International Search Report and Written Opinion dated Jun. 30, 2016 issued in PCT/US2016/014343.
International Search Report and Written Opinion dated Sep. 5, 2016 issued in PCT/US2016/033638.
Chinese Office Action [Description in English] dated May 31, 2016 issued in Application No. CN 201380068831.6.
Chinese First Office Action dated Dec. 13, 2016 issued in Application No. CN201480057911.6.
Extended European Search Report dated Feb. 16, 2017 issued in Application No. 14837844.1.
Extended European Search Report dated Feb. 15, 2017 issued in Application No. 14832857.8.
Chinese Second Office Action [Description in English] dated Jan. 22, 2017 issued in Application No. CN201380068831.6.
International Preliminary Report on Patentability dated Jun. 15, 2017 issued in Application No. PCT/US2015/064126.
European Office Action dated May 16, 2017 issued in European Patent Application No. 13851670.3.
Chinese First Office Action dated Dec. 26, 2018 issued in Application No. CN 201580067354.0.
International Search Report and Written Opinion dated Apr. 19, 2016 issued in PCT/US2015/067498.
International Preliminary Report on Patentability dated Jul. 6, 2017 issued in Application No. PCT/US2015/067498.
Extended European Search Report dated Jul. 3, 2018 issued in Application No. EP 15874344.3.
International Preliminary Report on Patentability dated Aug. 3, 2017 issued in Application No. PCT/US2016/014343.
Extended European Search Report dated Sep. 12, 2018 issued in Application No. EP 16740769.1.
International Preliminary Report on Patentability dated Aug. 10, 2017 issued in Application No. PCT/US2016/015001.
International Preliminary Report on Patentability dated Aug. 10, 2017 issued in Application No. PCT/US2016/015002.
Chinese Third Office Action [Summary in English] dated Jul. 24, 2017 issued in Application No. 201380068831.6.
Chinese First Office Action dated Aug. 2, 2017 issued in Application No. CN 201480054301.0.
Chinese Second Office Action dated Jul. 3, 2018 issued in Application No. CN 201480054301.0.
Australian Office Action dated Sep. 18, 2017 issued in Application No. AU 2014296034.
International Preliminary Report on Patentability dated Sep. 28, 2017 issued in Application No. PCT/US2016/022116.
Extended European Search Report dated Oct. 25, 2018 issued in Application No. EP 16765505.9.
International Preliminary Report on Patentability dated Nov. 30, 2017 issued in PCT/US2016/033638.
International Search Report and Written Opinion dated Feb. 22, 2019 issued in PCT/US2018/059059.
About Molemap, About Us-Skin Cancer Mole Check NZ, pp. 1-2. [retrieved Oct. 23, 2015 ] <URL:http://molemap.net.au/about-us/>.
Abrahamsson, S., et al., "Fast multicolor 3D imaging using aberration-corrected mulitfocus microscopy," Brief Communications: Nature Methods, vol. 10, No. 1, Jan. 2013, pp. 60-65. <doi:10.1038/nmeth.2277>.
Abramowitz, M. et al, "Immersion Media," Olympus Microscopy Resource Center: Microscope Optical Components, Published 2012, pp. 1-6.[retrieved on Feb. 6, 2012] <URL: http://www.olympusmicro.com/primer/anatomy/immersion.html>.
Abramowitz, M., et al, "Field Curvature," Olympus Microscopy Resource Center, 2012 Olympus America Inc., pp. 1-3. [retrieved on Feb. 24, 2016] <URL:http://www.olympusmicro.com/primer/anatomy/fieldcurvature.html>.
Age-Related Macular Degeneration (AMD) | National Eye Institute. 2010 Table, pp. 1-8. [retrieved Apr. 5, 2016] <URL: https://www.nei.nih.gov/eyedata/amd#top>.
Alexandrov, S., et al, "Spatial information transmission beyond a system's diffraction limit using optical spectral encoding of the spatial frequency," Journal of Optics A: Pure and Applied Optics 10, Feb. 4, 2008, 025304, pp. 1-5. <doi:10.1088/1464-4258/10/2/025304> [retrieved Dec. 2, 2015] <URL: http://www.stacks.iop.org/JOptA/10/025304>.

(56) References Cited

OTHER PUBLICATIONS

Alexandrov, S.A., et al, "Synthetic Aperture Fourier Holographic Optical Microscopy," Physical Review Letters, vol. 97, No. 16, Oct. 20, 2006, pp. 168102-1-168102-4. <doi: 0.1103/PhysRevLett.97.168102>.

Arimoto, H., et al, "Integral three-dimensional imaging with digital reconstruction," Optics Letters, Optical Society of America, Feb. 1, 2001, vol. 26, No. 3, pp. 157-159. <doi: 10.1364/OL.26.000157>.

Balan, R., et al, "On signal reconstruction without phase," Applied and Computational Harmonic Analysis, vol. 20, Issue 3, May 2006, pp. 345-356. <doi:10.1016/j.acha.2005.07.001>.

Balan, R., et al, "Painless Reconstruction from Magnitudes of Frame Coefficients," Journal Fourier Analysis and Applications, vol. 15, Issue 4, Mar. 25, 2009, pp. 488-501. <doi:10.1007/s00041-009-9065-1>.

Bauschke, H., et al, "Phase retrieval, error reduction algorithm, and Fienup variants: a view from convex optimization," Journal of the Optical Society America, A., vol. 19, No. 7, Jul. 2002, pp. 1334-1345. <doi: 10.1364/JOSAA.19.001334>.

Becker, S.R., et al, "Templates for Convex Cone Problems with Applications to Sparse Signal Recovery," Mathematical Programming Computation, Sep. 2010, vol. 3, No. 3, pp. 1-49. <doi: 10.1007/s12532-011-0029-5>.

Betti, R., et al, "Observational study on the mitotic rate and other prognostic factors in cutaneous primary melanoma arising from naevi and from melanoma de novo," Journal of the European Academy of Dermatology and Venereology (JEADV), Dec. 2014, vol. 28, No. 12, pp. 1738-1741. <doi: 10.1111/jdv.12395>.

Bian, L., et al, "Fourier ptychographic reconstruction using Poisson maximum likelihood and truncated Wirtinger gradient," Nature Publishing Group; Scientific Reports, vol. 6, No. 27384, Jun. 10, 2016, pp. 1-10. <doi: 10.1038/srep27384>.

Bian, L., et al, "Fourier ptychographic reconstruction using Wirtinger flow optimization," Optics Express, vol. 23, No. 4, Feb. 23, 2015, pp. 4856-4866. <doi: 10.1364/OE.23.004856>.

Bian, Z., et al, "Adaptive system correction for robust Fourier ptychographic imaging," Optics express, Dec. 30, 2013, vol. 21, No. 26, pp. 32400-32410. <doi: 10.1364/OE.21.032400>.

BioTek® Brochure: BioTek's Multi-Mode Microplate Reading Technologies, BioTek Instruments, Inc. pp. 2. [retrieved on Mar. 14, 2016] <URL: http://www.biotek.com>.

Bishara, W., et al, "Holographic pixel super-resolution in portable lensless on-chip microscopy using a fiber-optic array," NIH-PA, Lab Chip, Author manuscript; available in PMC Aug. 8, 2011, pp. 1-9. (Published in final edited form as: Lab Chip. Apr. 7, 2011; 11(7): 1276-1279. <doi:10.1039/c01c00684j>).

Bishara, W., et al, "Lensfree on-chip microscopy over a wide field-of-view using pixel super-resolution," Optics Express, vol. 18, No. 11, May 24, 2010, pp. 11181-11191. <doi: 10.1364/OE.18.011181>.

Blum, A., et al, "Clear differences in hand-held dermoscopes," Journal der Deutschen Dermatologischen Gesellschaft (JDDG); Case Reports, Dec. 2006, vol. 4, No. 12, pp. 1054-1057. <doi:10.1111/j.1610-0387.2006.06128.x>.

Blum, A., et al, "Dermatoskopisch sichtbare Strukturen," Chapter 4.1 Grundlagen, Dermatoskopie von Hauttumoren: Auflichtmikroskopie; Dermoskopie; Digitale Bildanalyse; mit 28 Tabellen. Springer-Verlag Berlin Heidelberg 2003, pp. 15-66. (English Translation of Summary) <doi: 10.1007/978-3-642-57446-7_4>.

Born, M., et al, "Principles of Optics: Electromagnetic theory of propagation, interference and diffraction of light," Seventh (Expanded) Edition, Cambridge University Press, England 1999, pp. 1-31. [ISBN 0 521 642221 hardback].

Brady, D. et al., "Multiscale gigapixel photography," Nature, vol. 486, Jun. 21, 2012, pp. 386-389. <doi:10.1038/nature11150>.

Bunk, O., et al, "Influence of the overlap parameter on the convergence of the ptychographical iterative engine," Ultramicroscopy, vol. 108, (2008), pp. 481-487. <doi: 10.1016/j.ultramic.2007.08.003>.

Burer, S., et al, "A nonlinear programming algorithm for solving semidefinite programs via low-rank factorization," Mathematical Programming, Series B., vol. 95, No. 2, Feb. 2003, pp. 329-357. <doi:10.1007/s10107-002-0352-8>.

Burer, S., et al, "Local Minima and Convergence in Low-Rank Semidefinite Programming," Mathematical Programming, Series A., vol. 103, Issue 3, Jul. 1, 2005, pp. 427-444. <doi:10.1007/s10107-004-0564-1>.

Candes, E.J., et al, "Phase Retrieval via Wirtinger Flow: Theory and Algorithms," IEEE Transaction on Information Theory, vol. 61, No. 4, Apr. 2015, pp. 1985-2007. <doi: 10.1109/TIT.2015.2399924>.

Candes, E.J., et al, pre published manuscript of "Phase Retrieval via Matrix Completion," ArXiv e-prints, 24 pages (Submitted on Sep. 2, 2011 (v1), last revised Sep. 20, 2011 (this version, v2)). [retrieved Nov. 9, 2015] <URL: arXiv:1109.0573v2 [cs.IT] Sep. 20, 2011>.

Candes, E.J., et al, pre-published Manuscript of "PhaseLift: Exact and Stable Signal Recovery from Magnitude Measurements via Convex Programming," ArXiv e-prints, 31 pages (Submitted Sep. 2011 (v1)). [retrieved Nov. 9, 2015] <URL: arXiv:1109.4499v1 [cs.IT] Sep. 21, 2011>.

Carroll, J., "Adaptive Optics Retinal Imaging: Applications for Studying Retinal Degeneration," Archives of Ophthalmology, vol. 126, No. 6, Jun. 9, 2008, pp. 857-858. [retrieved Feb. 24, 2016] <doi:10.1001/archopht.126.6.857>.

Chai, A., et al, "Array imaging using intensity-only measurements," IOP Publishing: Inverse Problems, vol. 27, No. 1, Jan. 2011, pp. 1-16. <doi:10.1088/0266-5611/27/1/015005>.

Chao, W. et al, "Soft X-ray microscopy at a spatial resolution better than 15 nm," Nature Letters, vol. 435, Jun. 30, 2005, pp. 1210-1213. <doi:10.1038/nature03719>.

Chen, T., et al, "Polarization and Phase-Shifting for 3D Scanning of Translucent Objects," 2007 IEEE Conference on Computer Vision and Pattern Recognition; on Jun. 17-22, 2007, pp. 1-8. <doi:10.1109/CVPR.2007.383209>.

Chin, L., et al, "Malignant melanoma: genetics and therapeutics in the genomic era," CSH Press: Genes & Development, Aug. 15, 2006, vol. 20, pp. 2149-2182. <doi: 10.1101/gad.1437206> [retrieved Sep. 9, 2015]. <URL: http://genesdev.cshlp.org/content/20/16/2149>.

Choi, W., et al, "Tomographic phase microscopy," NPG: Nature Methods | Advance Online Publication, Aug. 12, 2007, pp. 1-3. <doi:10.1038/NMETH1078>.

Chung, J., et al, "Counting White Blood Cells from a Blood Smear Using Fourier Ptychographic Microscopy," PLoS ONE, vol. 10, No. 7, Jul. 17, 2015, pp. 1-10. <doi:10.1371/journal.pone.0133489>.

Chung, J., et al, "Wide field-of-view fluorescence image deconvolution with aberration-estimation from Fourier ptychography," Biomedical Optics Express, vol. 7, No. 2, Feb. 1, 2016, pp. 352-368. <doi: 10.1364/BOE.7.000352>.

Chung, J., et al, pre-published manuscript of "Wide-field Fourier ptychographic microscopy using laser illumination source," ArXiv e-prints (Submitted on Feb. 9, 2016 (v1), last revised Mar. 23, 2016 (this version, v2)). [retrieved on May 20, 2016] <URL:arXiv:1602.02901v2 [physics. Optics] Mar. 23, 2016>.

Colomb, T., et al, "Automatic procedure for aberration compensation in digital holographic microscopy and applications to specimen shape compensation," Applied Optics, vol. 45, No. 5, Feb. 10, 2006, pp. 851-863. <doi: 10.1364/AO.45.000851>.

De Sa, C., et al, "Global Convergence of Stochastic Gradient Descent for Some Non-convex Matrix Problems," Proceedings of the 32nd International Conference on Machine Learning, Lille, France, 2015. JMLR: W&CP, vol. 37, pp. 10. [retrieved on Nov. 9, 2015]<URL: https://arxiv.org/abs/1411.1134>.

Debailleul, M., et al, "High-resolution three-dimensional tomographic diffractive microscopy of transparent inorganic and biological samples," Optics Letters, Optical Society of America, vol. 34, No. 1, Jan. 1, 2009, pp. 79-81. <doi: 10.1364/OL.34.000079>.

Denis, L., et al, "Inline hologram reconstruction with sparsity constraints," Optics Letters, Optical Society of America, vol. 34, No. 22, Oct. 12, 2009, pp. 3475-3477. <doi:10.1364/OL.34.003475> <ujm-00397994v2>.

Di, J., et al, "High resolution digital holographic microscopy with a wide field of view based on a synthetic aperture technique and use

(56) References Cited

OTHER PUBLICATIONS of linear CCD scanning," Applied Optics, vol. 47, No. 30, Oct. 20, 2008, pp. 5654-5659. <doi: 10.1364/AO.47.005654>.
Dierolf, M., et al, "Ptychographic X-ray computed tomography at the nanoscale," Nature Letter, vol. 467, Sep. 23, 2010, pp. 436-439. <doi:10.1038/nature09419>.
Dierolf, M., et al, "Ptychographic coherent diffractive imaging of weakly scattering specimens," New Journal of Physics, vol. 12, Mar. 31, 2010, 035017, pp. 14. <doi: 10.1088/1367-2630/12/3/035017>.
Doctor Mole—Skin Cancer App, App to check skin cancer by Dr. Mole, p. 1. (Webpage) [retrieved on Oct. 23, 2015] <URL: http://www.doctormole.com>.
Dong, S., et al, "FPscope: a field-portable high-resolution microscope using a cellphone lens," Biomedical Optics Express, vol. 5, No. 10, Oct. 1, 2014, pp. 3305-3310. <doi:10.1364/BOE.5.003305>.
Dong, S., et al, "High-resolution fluorescence imaging via pattern-illuminated Fourier ptychography," Optics Express, vol. 22, No. 17, Aug. 25, 2014, pp. 20856-20870. <doi:10.1364/OE.22.020856>.
Dong, S., et al, "Aperture-scanning Fourier ptychography for 3D refocusing and super-resolution macroscopic imaging," Optics Express, vol. 22, No. 11, Jun. 2, 2014, pp. 13586-13599. <doi:10.1364/OE.22.013586>.
Eldar, Y.C., et al, "Sparse Phase Retrieval from Short-Time Fourier Measurements," IEEE Signal Processing Letters, vol. 22, No. 5, May 2015, pp. 638-642. <doi:10.1109/LSP.2014.2364225>.
Emile, O., et al, "Rotating polarization imaging in turbid media," Optics Letters, vol. 21, No. 20, Oct. 15, 1996, pp. 1706-1708. <doi: 10.1364/OL.21.001706>.
Essen BioScience, "Real-time, quantitative live-cell analysis, IncuCyte® ZOOM System," IncuCyte Zoom System Brochure 2016, pp. 1-4. [retrieved Feb. 25, 2016] [URL: http://www.essenbioscience.com/IncuCyte].
Faulkner, H.M.L., et al, "Error tolerance of an iterative phase retrieval algorithm for moveable illumination microscopy," Ultramicroscopy, vol. 103, No. 2, May 2005, pp. 153-164. <doi:10.1016/j.ultramic.2004.11.006>.
Faulkner, H.M.L., et al., "Movable Aperture Lensless Transmission Microscopy: A Novel Phase Retrieval Algorithm," Physical Review Letters, vol. 93, No. 2, Jul. 9, 2004, pp. 023903-1-023903-4. <doi:10.1103/PhysRevLett.93.023903>.
Fazel, M., "Matrix rank minimization with applications," PhD dissertation submitted to the Dept. of Electrical Engineering and Committee on Graduate Studies of Stanford University, Mar. 2002, pp. 1-117. [retrieved on Nov. 9, 2015] <URL:http://faculty.washington.edu/mfazel/thesis-final.pdf>.
Feng, P., et al, "Long-working-distance synthetic aperture Fresnel off-axis digital holography," Optics Express, vol. 17, No. 7, Mar. 30, 2009, pp. 5473-5480. <doi: 10.1364/OE.17.005473>.
Fienup, J. R., "Invariant error metrics for image reconstruction," Applied Optics, vol. 36, No. 32, Nov. 10, 1997, pp. 8352-8357. <doi: 10.1364/AO.36.008352>.
Fienup, J. R., "Lensless coherent imaging by phase retrieval with an illumination pattern constraint," Optics Express, vol. 14, No. 2, Jan. 23, 2006, pp. 498-508. <doi: 10.1364/OPEX.14.000498>.
Fienup, J. R., "Phase retrieval algorithms: a comparison," Applied Optics, vol. 21, No. 15, Aug. 1, 1982, pp. 2758-2769. <doi: 10.1364/AO.21.002758>.
Fienup, J. R., "Reconstruction of a complex-valued object from the modulus of its Fourier transform using a support constraint," Journal of the Optical Society of America A, vol. 4, No. 1, Jan. 1987, pp. 118-123. <doi: 10.1364/JOSAA.4.000118>.
Fienup, J. R., "Reconstruction of an object from the modulus of its Fourier transform," Optics Letter, vol. 3, No. 1, Jul. 1978, pp. 27-29. <doi: 10.1364/OL.3.000027>.
Gan, X., et al, "Image enhancement through turbid media under a microscope by use of polarization gating methods," Journal of the Optical Society of America A, vol. 16, No. 9, Sep. 1999, pp. 2177-2184. <doi: 10.1364/JOSAA.16.002177>.
Gerke T.D., et al, "Aperiodic volume optics," Nature Photonics, vol. 4, Feb. 7, 2010, pp. 188-193. <doi:10.1038/nphoton.2009.290>.
Ghosh, A., et al, pre-published manuscript of "Multiview Face Capture using Polarized Spherical Gradient Illumination," via USC Institute for Creative Technologies; to appear in ACM Transactions on Graphics (TOG), vol. 30, No. 6, Dec. 2011, pp. 1-10. [Retrieved Sep. 28, 2011]. <URL:http://doi.acm.org/10.1145/2024156.2024163>.
Godara, P., et al, "Adaptive Optics Retinal Imaging: Emerging Clinical Applications," *NIH-PA Author Manuscript*; available in PMC Dec. 1, 2011. Published in final edited form as: Optom. Vis. Sci.. Dec. 2010; 87(12): 930-941. <doi: 10.1097/OPX.0b013e3181ff9a8b>.
Godden, T.M. et al., "Ptychographic microscope for three-dimensional imaging," Optics Express, vol. 22, No. 10, May 19, 2014, pp. 12513-12523.
Goodman, J.W., "Introduction to Fourier Optics," Third Ed., Roberts & Company Publishers (Englewood, Colorado 2005) pp. 1-172. <ISBN 0-9747077-2-4>.
Goodson, A.G., et al, "Comparative analysis of total body vs. dermatoscopic photographic monitoring of nevi in similar patient populations at risk for cutaneous melanoma," NIH-PA Author Manuscript; available in PMC Jul. 1, 2011. Published in final edited form as: Dermatol. Surg. Jul. 2010; 36(7): 1087-1098. <doi: 10.1111/j.1524-4725.2010.01589.x>.
Granero, L., et al, "Synthetic aperture superresolved microscopy in digital lensless Fourier holography by time and angular multiplexing of the object information," Applied Optics, vol. 49, No. 5, Feb. 10, 2010, pp. 845-857. <doi: 10.1364/AO.49.000845>.
Grant, M., et al, "CVX: Matlab Software for Disciplined Convex Programming," CVX Research Inc., pp. 1-3. [Webpage] [retrieved on Dec. 18, 2015] <URL: http://cvxr.com/cvx>.
Greenbaum, A., et al, "Field-portable wide-field microscopy of dense samples using multi-height pixel super-resolution based lensfree imaging," Lab Chip, The Royal Society of Chemistry, vol. 12, No. 7, Jan. 31, 2012, pp. 1242-1245. [retrieved on Feb. 27, 2016] <URL:http://dx.doi.org/10.1039/C2LC21072J>.
Greenbaum, A., et al, "Increased space—bandwidth product in pixel super-resolved lensfree on-chip microscopy," Scientific Reports, vol. 3, No. 1717, Apr. 24, 2013, pp. 1-8. [doi: 10.1038/srep01717].
Gruev, V., et al, "Dual-tier thin film polymer polarization imaging sensor," Optics Express, vol. 18, No. 18, Aug. 30, 2010, pp. 19292-19303. <doi: 10.1364/OE.18.019292>.
Guizar-Sicairos, M., and Fienup, J.R.,"Phase retrieval with transverse translation diversity: a nonlinear optimization approach," Optics Express, vol. 16, No. 10, May 12, 2008, pp. 7264-7278. <doi: 10.1364/OE.16.007264>.
Gunturk, B.K., et al, "Restoration in the Presence of Unknown Spatially Varying Blur," Ch. 3, in *Image Restoration: Fundamentals and Advances* (CRC Press 2012), pp. 63-68. <ISBN 978-1-4398-6955-0>.
Guo, K., et al, "Optimization of sampling pattern and the design of Fourier.ptychographic illuminator," Optics Express, vol. 23, No. 5, Mar. 9, 2015, pp. 6171-6180. <doi: 10.1364/OE.23.006171>.
Gustafsson, M.G.L., "Surpassing the lateral resolution limit by a factor of two using structured illumination microscopy," Journal of Microscopy, vol. 198, Pt. 2, May 2000, pp. 82-87. <doi:10.1046/j.1365-2818.2000.00710.x>.
Gutzler, T., et al, "Coherent aperture-synthesis, wide-field, high-resolution holographic microscopy of biological tissue," Optics Letters, vol. 35, No. 8, Apr. 15, 2010, pp. 1136-1138. <doi: 10.1364/OL.35.001136>.
Haigh, S. J., et al, "Atomic Structure Imaging beyond Conventional Resolution Limits in the Transmission Electron Microscope," Physical Review Letters, vol. 103, Issue 12, Sep. 18, 2009, pp. 126101.1-126101.4. <doi:10.1103/PhysRevLett.103.126101>.
Han, C., et al, "Wide Field-of-View On-Chip Talbot Fluorescence Microscopy for Longitudinal Cell Culture Monitoring from within the Incubator" Analytical Chemistry, vol. 85, No. 4, Jan. 28, 2013, pp. 2356-2360. <doi:10.1021/ac303356v>.
Hillman, T.R., et al, "High-resolution, wide-field object reconstruction with synthetic aperture Fourier holographic optical micros-

(56) References Cited

OTHER PUBLICATIONS copy," Optics Express, vol. 17, No. 10, May 11, 2009, pp. 7873-7892. <doi:10.1364/OE.17.007873>.
Hofer, H., et al, "Dynamics of the eye's wave aberration," Journal of Optical Society of America A., vol. 18, No. 3, Mar. 2001, pp. 497-506. <doi: 10.1364/JOSAA.18.000497>.
Hofer, H., et al, "Organization of the Human Trichromatic Cone Mosaic," The Journal of Neuroscience, vol. 25, No. 42, Oct. 19, 2005, pp. 9669-9679. <doi: 10.1523/JNEUROSCI.2414-05.2005>.
Holloway, J., et al. "SAVI: Synthetic apertures for long-range, subdiffraction-limited visible imaging using Fourier ptychography," Science Advances | Research Article, vol. 3, No. 4, Apr. 14, 2017, pp. 1-11. <doi:10.1126/sciadv.1602564> [retrieved on Nov. 28, 2017] <URL:http://advances.sciencemag.org/>.
Hong, S-H., et al, "Three-dimensional volumetric object reconstruction using computational integral imaging," OSA Publishing: Optics Express, vol. 12, No. 3, Feb. 9, 2004, pp. 483-491. <doi:10.1364/OPEX.12.000483>.
Hoppe, W., "Diffraction in inhomogeneous primary wave fields. 1. Principle of phase determination from electron diffraction interference." Acta Crystallographica Section a-Crystal Physics Diffraction Theoretical and General Crystallography, A25, Jan. 1, 1969, pp. 495-501. (English Machine Translation Incl.).
Horstmeyer, R., et al, "A phase space model of Fourier ptychographic microscopy," Optics Express, vol. 22, No. 1, Jan. 13, 2014, pp. 338-358. <doi:10.1364/OE.22.000338>.
Horstmeyer, R., et al, "Diffraction tomography with Fourier ptychography," Optica, Optical Society of America, vol. 3, No. 8, Aug. 2016, pp. 827-835. <doi:10.1364/OPTICA.3.000827>.
Horstmeyer, R., et al, "Digital pathology with Fourier Ptychography," Computerized Medical Imaging and Graphics, vol. 42, Jun. 2015, pp. 38-43. <doi: 10.1016/j.compmedimag.2014.11.005>.
Horstmeyer, R., et al, "Overlapped Fourier coding for optical aberration removal," Optics Express, vol. 22, No. 20, Oct. 6, 2014, pp. 24062-24080. <doi: 10.1364/OE.22.024062>.
Horstmeyer, R., et al, "Solving ptychography with a convex relaxation," New Journal of Physics, vol. 17, May 27, 2015, pp. 1-14. <doi: 10.1088/1367-2630/17/5/053044> [URL: http://iopscience.iop.org/1367-2630/17/5/053044].
Horstmeyer, R., et al, "Standardizing the resolution claims for coherent microscopy," Nature Photonics | Commentary, vol. 10, No. 2, Feb. 2016, pp. 68-71. <doi:10.1038/nphoton.2015.279> [URL:http://dx.doi.org/10.1038/nphoton.2015.279].
Hüe, F., et al, "Wave-front phase retrieval in transmission electron microscopy via ptychography," Rapid Communications: Physical Review B, vol. 82, No. 12, Sep. 15, 2010, pp. 121415-1-121415-4. <doi:10.1103/PhysRevB.82.121415>.
Humphry, M., et al, "Ptychographic electron microscopy using high-angle dark-field scattering for sub-nanometre resolution imaging," Nature Communications, vol. 3, Mar. 6, 2012, pp. 1-7. <doi: 10.1038/ncomms1733>.
Jacques, et al., "Imaging Superficial Tissues With Polarized Light," Lasers in Surgery and Medicine, vol. 26, No. 2, Apr. 25, 2000, pp. 119-129.
Jaganathan, K., et al, "Recovery of sparse 1-D signals from the magnitudes of their Fourier transform," *2012 IEEE International Symposium on Information Theory Proceedings*, Cambridge, MA, 2012, pp. 1473-1477. <doi: 10.1109/ISIT.2012.6283508.>.
Jaganathan, K., et al, "Phase retrieval with masks using convex optimization," 2015 IEEE International Symposium on Information Theory (ISIT), Hong Kong, 2015, pp. 1655-1659.<doi: 10.1109/ISIT.2015.7282737>.
Jaganathan, K., et al, pre published manuscript of "STFT Phase retrieval: uniqueness guarantees and recovery algorithms," ArXiv e-prints, 10 pages, (Submitted on Aug. 12, 2015 (v1). <doi: 10.1109/JSTSP.2016.2549507> [retrieved Nov. 9, 2015] <URL: https://arxiv.org/abs/1508.02820v1>.
Jensen, et al. "Types of imaging, Part 2: An Overview of Fluorescence Microscopy." The Anatomical Record, vol. 295, No. 10, Oct. 1, 2012, pp. 1621-1627.

Joeres, S., et al, "Retinal Imaging With Adaptive Optics Scanning Laser Ophthalmoscopy in Unexplained Central Ring Scotoma," Arch. Ophthalmol., vol. 126, No. 4, Apr. 2008, pp. 543-547. [retrieved Jun. 10, 2015] [URL: http://archopht.jamanetwork.com/].
Jung, J.H., et al, Author Manuscript of"Microfluidic-integrated laser-controlled microactuators with on-chip microscopy imaging functionality," Published in final edited form as: Lab Chip, Oct. 7, 2014, vol. 14, No. 19, pp. 3781-3789. <doi: 10.1039/c41c00790e>.
Kawata, S. et al, "Optical microscope tomography. I. Support constraint," Journal Optical Society America A, vol. 4, No. 1, Jan. 1987, pp. 292-297. <doi:10.1364/JOSAA.4.000292>.
Kay, D. B., et al, Author Manuscript of"Outer Retinal Structure in Best Vitelliform Macular Dystrophy," Published in final edited form as: JAMA Ophthalmol., Sep. 2013, vol. 131, No. 9, pp. 1207-1215. <doi: 10.1001/jamaophthalmol.2013.387>.
Kim, J., et al, "Incubator embedded cell culture imaging system (EmSight) based on Fourier ptychographic microscopy," Biomedical Optics Express, vol. 7, No. 8, Aug. 1, 2016, pp. 3097-3110. <doi: 10.1364/BOE.7.003097>.
Kim, M., et al, "High-speed synthetic aperture microscopy for live cell imaging," Optics Letters, vol. 36, No. 2, Jan. 15, 2011, pp. 148-150. <doi:10.1364/OL.36.000148>.
Kim, M., et al, "High-speed synthetic aperture microscopy for live cell imaging," NIH-PA, Author Manuscript available in PMC Mar. 30, 2011. Published in final edited form as: Opt Lett. Jan. 15, 2011; 36(2): pp. 148-150. <PMCID: PMC3068016>.
Kirkland, A.I., et al, "Multiple beam tilt microscopy for super resolved imaging," Journal of Electron Microscopy (Tokyo) Jan. 1, 1997, vol. 46, No. 1, pp. 11-22. [doi: 10.1093/oxfordjournals.jmicro.a023486].
Kirkland, A.I., et al, "Super-resolution by aperture synthesis: tilt series reconstruction in CTEM," Elsevier Science B.V., Ultramicroscopy 57, Mar. 1995, pp. 355-374. <doi: 10.1016/0304-3991(94)00191-O>.
Kittler, H., et al, "Morphologic changes of pigmented skin lesions: A useful extension of the ABCD rule for dermatoscopy," Journal of the American Academy of Dermatology (JAAD), Apr. 1999. vol. 40, No. 4, pp. 558-562. <doi: 10.1016/S0190-9622(99)70437-8>.
Kner, P., "Phase diversity for three-dimensional imaging," Journal of the Optical Society of America A, vol. 30, No. 10, Oct. 1, 2013, pp. 1980-1987. <doi:10.1364/JOSAA.30.001980>.
Kozak, I., "Retinal imaging using adaptive optics technology," Saudi Journal of Ophthalmology, vol. 28, No. 2, Feb. 25, 2014, pp. 117-122. <doi:10.1016/j.sjopt.2014.02.005>.
Lauer, V., "New Approach to optical diffraction tomography yielding a vector equation of diffraction tomography and a novel tomographic microscope," Journal of Microscopy, Feb. 2002, vol. 205, No. 2, pp. 165-176. <doi: 10.1046/j.0022-2720.2001.00980.x>.
Lee, K., et al, "Synthetic Fourier transform light scattering," Optics Express, vol. 21, No. 19, Sep. 23, 2013, pp. 22453-22463. <doi:10.1364/OE.21.022453>.
Levoy, M., et al, "Light field microscopy," ACM Transactions Graphics, vol. 25, No. 3, proceedings of ACM SIGGRAPH Jul. 2006, pp. 1-11. [doi: 10.1145/1141911.1141976].
Levoy, M., et al, "Recording and controlling the 4D light field in a microscope using microlens arrays," Journal of Microscopy, vol. 235, Pt. 2, Aug. 2009, pp. 144-162. <doi: 10.1111/j.1365-2818.2009.03195.x>.
Li, X., et al, "Sparse Signal Recovery from Quadratic Measurements via Convex Programming," SIAM Journal on Mathematical Analysis, vol. 45, No. 5, Sep. 26, 2013, pp. 3019-3033. [doi:10.1137/120893707] [retrieved Feb. 13, 2014] <URL: http://dx.doi.org/10.1137/120893707>.
Lohmann, A. W., et al, "Space—bandwidth product of optical signals and systems," Journal of the Optical Society of America A, vol. 13, No. 3, Mar. 1996, pp. 470-473. <doi: 10.1364/JOSAA.13.000470>.
Lu, H., et al, "Quantitative phase imaging and complex field reconstruction by pupil modulation differential phase contrast," Optics Express, vol. 24, No. 22, Oct. 31, 2016, pp. 25345-25361. <doi:10.1364/OE.24.025345>.
Lue, N., et al, "Live Cell Refractometry Using Hilbert Phase Microscopy and Confocal Reflectance Microscopy," NIH-PA Author

(56) References Cited

OTHER PUBLICATIONS

Manuscript, available in PMC Apr. 22, 2010. Published in final edited form as: J Phys Chem A. Nov. 26, 2009; 113(47); 13327-13330. <PMCID: PMC2858636>.
Luxexcel® Brochure, "Luxexcel: 3D Printing Service Description" pp. 1-5. [retrieved on Mar. 7, 2016] <URL: http://www.luxexcel.com>.
LYTRO | ILLUM, Lytro-Products [webpages], pp. 1-6. [Online] [retrieved Oct. 23, 2015] <URL:https://www.lytro.com/>.
Ma, W., et al, "Rapid Acquisition of Specular and Diffuse Normal Maps from Polarized Spherical Gradient Illumination," EGSR'07 Proceedings of the 18th Eurographics conference on Rendering Techniques, Eurographics Association, Aire-la-Ville, Switzerland 2007, pp. 183-194. <doi: 10.2312/EGWR/EGSR07/183-194>.
Mahajan, V.N., "Zernike Circle Polynomials and Optical Aberrations of Systems with Circular Pupils," Engineering Laboratory Notes: Supplemental to *Applied Optics*, vol. 33 No. 34, Dec. 1, 1994, pp. 8121-8124. <doi:10.1364/AO.33.008121>.
Maiden, A.M., et al, "A new method of high resolution, quantitative phase scanning microscopy," in Proceedings of SPIE, Jun. 2, 2010, vol. 7729, pp. 7729II-1-7729II-8. <doi: 10.1117/12.853339> [retrieved on Dec. 16, 2015] <URL: proceedings.spiedigitallibrary.org>.
Maiden, A.M., et al, "An improved ptychographical phase retrieval algorithm for diffractive imaging," Ultramicroscopy, vol. 109, No. 10, Sep. 2009, pp. 1256-1262. <doi: 10.1016/j.ultramic.2009.05.012>.
Maiden, A.M., et al, "Superresolution imaging via ptychography," Journal of the Optical Society of America A. (JOSAA), vol. 28, No. 4, Apr. 1, 2011, pp. 604-612. <doi: 10.1364/JOSAA.28.000604>.
Maiden, A.M., et al, "Optical ptychography: a practical implementation with useful resolution," Optics Letters, vol. 35, No. 15, Aug. 1, 2010, pp. 2585-2587. <doi: 10.1364/OL.35.002585>.
Maiden, A.M., et al., "Ptychographic transmission microscopy in three dimensions using a multi-slice approach," Journal of the Optical Society of America A., vol. 29, No. 8, Aug. 1, 2012, pp. 1606-1614.
Marchesini S., "Invited Article: A unified evaluation of iterative projection algorithms for phase retrieval," Review of Scientific Instruments, vol. 78, No. 1, Apr. 19, 2007, pp. 011301-1-011301-10. <doi: 10.1063/1.2403783> [retrieved May 7, 2014] <URL: http://dx.doi.org/10.1063/1.2403783>.
Marchesini S., et al, pre published manuscript of "Augmented projections for ptychographic imaging," (Submitted on Sep. 21, 2012 (v1), last revised Aug. 29, 2013 (this version, v5)) pp. 1-18. Published in Inverse Problems vol. 29, No. 11 (2013). [retrieved on Nov. 9, 2015] <URL: https://arxiv.org/pdf/1209.4924>.
Marrison, J., et al, "Ptychography—a label free, high-contrast imaging technique for live cells using quantitative phase information," Scientific Reports, vol. 3, No. 2369, Aug. 6, 2013, pp. 1-7. <doi: 10.1038/srep02369>.
Medoff, B.P., et al, "Iterative convolution backprojection algorithms for image reconstruction from limited data," Journal of the Optical Society of America, vol. 73, No. 11, Nov. 1, 1983, pp. 1493-1500. <doi: 10.1364/JOSA.73.001493>.
Melafind, Optics by Carl Zeiss, MELA Sciences 2015, pp. 1-4. [Webpage] [retrieved Oct. 23, 2015] <URL: http://www.melafind.com/>.
Meyer, R.R., et al, "A new method for the determination of the wave aberration function of high-resolution TEM. 2. Measurement of the antisymmetric aberrations," Ultramicroscopy, vol. 99, No. 2-3, May 2004, pp. 115-123. <doi: 10.1016/j.ultramic.2003.11.001>.
Miao, J., et al, "High Resolution 3D X-Ray Diffraction Microscopy," Physical Review Letters, vol. 89, No. 8, Aug. 19, 2002, pp. 088303-1-088303-4. <doi: 10.1103/PhysRevLett.89.088303>.
Mico, V., et al, "Synthetic aperture microscopy using off-axis illumination and polarization coding," Optics Communications, vol. 276, No. 2, Aug. 15, 2007, pp. 209-217. <doi:10.1016/j.optcom.2007.04.020>.
Mico, V., et al, "Synthetic aperture superresolution with multiple off-axis holograms," Journal of the Optical Society of America A, vol. 23, No. 12, Dec. 1, 2006, pp. 3162-3170. <doi:10.1364/JOSAA.23.003162>.
Mir, M. et al, "Optical measurement of cycle-dependent cell growth," Proceedings of the National Academy of Sciences (PNAS) vol. 108, No. 32, Aug. 9, 2011, pp. 13124-13129. <doi:10.1073/pnas.1100506108>.
Mir, M., et al, "Blood screening using diffraction phase cytometry," Journal of Biomedical Optics: vol. 15, No. 2, Mar./Apr. 2010, pp. 027016-1-027014-4. <doi:10.1117/1.3369965> [retrieved on Feb. 6, 2015] <URL:http://dx.doi.org/10.1117/1.3369965>.
Moreno, I., "Creating a desired lighting pattern with an LED array," Proceedings of SPIE, Eighth International Conference on Solid State Lighting, vol. 705811, Sep. 2, 2008, pp. 9. <doi:10.1117/12.795673>.
Mrejen, S., et al, "Adaptive Optics Imaging of Cone Mosaic Abnormalities in Acute Macular Neuroretinopathy," Ophthalmic Surgery, Lasers & Imaging Retina, vol. 45, No. 6, Nov./Dec. 2014, pp. 562-569. <doi: 10.3928/23258160-2014111812>.
Nayar, S. K., et al, pre-published manuscript of "Fast separation of direct and global components of a scene using high frequency illumination," (Submitted 2006, this one (v.1)), Published in: ACM SIGGRAPH 2006 Papers, Boston, Massachusetts Jul.-Aug. 3, 2006, pp. 935-944. <doi: http://dx.doi.org/10.1145/1179352.1141977>.
Ng, R., et al, "Light Field Photography with a Hand-held Plenoptic Camera," Stanford Tech Report, Computer Science Technical Report (CSTR) Apr. 20, 2005, vol. 2, No. 11, pp. 1-11. <URL: https://classes.soe.ucsc.edu/cmps290b/Fall05/readings/lfcamera-150dpi.pdf>.
Nomura, H., et al., "Techniques for measuring aberrations in lenses used in photolithography with printed patterns," Applied Optics, vol. 38, No. 13, May 1, 1999, pp. 2800-2807. <doi: 10.1364/AO.38.002800>.
Ohlsson, H., et al, "Compressive Phase Retrieval From Squared Output Measurements Via Semidefinite Programming," arXiv:1111.6323, Technical Report; Nov. 28, 2011, pp. 6. <URL: http://cds.cern.ch/record/1402765>.
Ou, X., et al, "High numerical aperture Fourier ptychography: principle, implementation and characterization," Optics Express, vol. 23, No. 3, Feb. 9, 2015, pp. 3472-3491. <doi: 10.1364/oe.23.003472>.
Ou, X., et al, "Aperture scanning Fourier ptychographic microscopy," Biomedical Optics Express, vol. 7, No. 8, Aug. 1, 2016, pp. 3140-3150. <doi:10.1364/BOE.7.003140>.
Ou, X., et al, "Quantitative phase imaging via Fourier ptychographic microscopy," NIH-PA Author Manuscript; available in PMC Dec. 26, 2014. Published in final edited form as: Opt Lett. Nov. 15, 2013; 38(22): 4845-4848. <doi: 10.1364/OL.38.004845>.
Ou. X., et al, "Embedded pupil function recovery for Fourier ptychographic microscopy," Optics Express, vol. 22, No. 5, Mar. 10, 2014, pp. 4960-4972. <doi: 10.1364/OE.22.004960> Erratum Attached, dated Dec. 28, 2015, vol. 23, No. 26, p. 33027. <doi:10.1364/OE.23.033027>.
Ou. X., et al, pre published manuscript of "Embedded pupil function recovery for Fourier ptychographic microscopy," (submitted on Dec. 26, 2013 (this version, v1); revised Feb. 12, 2014; accepted Feb. 17, 2014; published Feb. 24, 2014) pp. 1-13. <doi: 10.1364/OE.22.004960>.
Pacheco, S., et al, "Reflective Fourier Ptychography," Journal of Biomedical Optics, vol. 21, No. 2, Feb. 18, 2016, pp. 026010-1-026010-7. <doi: 10.1117/1.JBO.21.2.026010> [retrieved on Mar. 8, 2016] <URL: http://biomedicaloptics.spiedigitallibrary.org>.
Pankajakshan, P., "Blind Deconvolution for Confocal Laser Scanning Microscopy," Doctoral dissertation, Universite Nice Sophia Antipolis, 2009. <URL: https://tel.archives-ouvertes.fr/tel-00474264>.
Phillips, Z., et al, "Multi-Contrast Imaging and Digital Refocusing on a Mobile Microscope with a Domed LED Array," PLoS One, vol. 10, No. 5, May 13, 2015, pp. 1-13. <doi:10.1371/journal.pone.0124938>.
Recht, B., et al, "Guaranteed Minimum-Rank Solutions of Linear Matrix Equations via Nuclear Norm Minimization," SIAM Review,

(56) References Cited

OTHER PUBLICATIONS vol. 52, No. 3, Aug. 5, 2010, pp. 471-501. <doi: 10.1137/070697835> [retrieved on Nov. 20, 2015] <URL: https://doi.org/10.1137/070697835>.
Reinhard, E., et al, "High Dynamic Range Imaging: Acquisition, Display, and Image-based Lighting" Second Edition § 5.2 HDR Image Capture: Morgan Kaufmann, May 28, 2010, pp. 148-151. <ISBN: 9780123749147>.
Rodenburg, J. M., et al, "A phase retrieval algorithm for shifting illumination," Applied Physics Letters, vol. 85, No. 20, Nov. 15, 2004, pp. 4795-4797. <doi: 10.1063/1.1823034>.
Rodenburg, J. M., et al, "Hard-X-ray Lensless Imaging of Extended Objects," Physical Review Letters, vol. 98, No. 3, Jan. 19, 2007, pp. 034801-1-034801-4. <doi: 10.1103/PhysRevLett.98.034801>.
Rodenburg, J. M., et al, "The Theory of Super-Resolution Electron Microscopy Via Wigner-Distribution Deconvolution," Philosophical Transactions of the Royal Society A, vol. 339, No. 1655, Jun. 15, 1992, pp. 521-553. <doi: 10.1098/rsta.1992.0050>.
Rodenburg, J.M., "Ptychography and related Diffractive Imaging Methods," Adv. Imaging Electron Phys., vol. 150, Dec. 31, 2008, pp. 87-184. <doi: 10.1016/S1076-5670(07)00003-1>.
Rossi, E.A., et al, "In vivo imaging of retinal pigment epithelium cells in age related macular degeneration," Biomedical Optics Express, vol. 4, No. 11, Nov. 1, 2013, pp. 2527-2539. <doi: 10./1364/BOE.4.002527].
Rowe, M., et al, "Polarization-difference imaging: a biologically inspired technique for observation through scattering media," Optics Letters, vol. 20, No. 6, Mar. 15, 1995, pp. 608-610. <doi:10.1364/OL.20.000608>.
Sarder, et al. "Deconvolution Methods for 3-D Fluorescence Microscopy Images," IEEE Signal Processing Magazine, vol. 23, No. 3, May 2006, pp. 32-45.
Sankaranarayanan, Aswin C., et al, "CS-MUVI: Video Compressive Sensing for Spatial-Multiplexing Cameras," Proceedings of the IEEE International Conference Computational Photography (ICCP), Apr. 2012, pp. 11. <doi:10.1109/ICCPhot.2012.6215212>.
Schechner, Y., "Multiplexing for Optimal Lighting," IEEE Transactions on Pattern Analysis and Machine Intelligence, vol. 29, No. 8, Aug. 2007, pp. 1339-1354. <doi: 10.1109/TPAMI.2007.1151.>.
Schnars, U., et al, "Digital recording and numerical reconstruction of holograms," Measurement Science and Technology, vol. 13, No. 9, Aug. 7, 2002, pp. R85-R101. <doi: 10.1088/0957-0233/13/9/201>.
Schwarz, C., et al, "Imaging interferometric microscopy," Optics letters, vol. 28, No. 16, Aug. 15, 2003, pp. 1424-1426. <doi: 10.1364/OL.28.001424>.
Shechner, Y., et al, "Polarization-based vision through haze," Applied Optics, vol. 42, No. 3, Jan. 20, 2003, pp. 511-525. <doi: 10.1364/AO.42.000511>.
Shechtman, Y., et al, "Sparsity based sub-wavelength imaging with partially incoherent light via quadratic compressed sensing," Optics Express, vol. 19, No. 16, Aug. 1, 2011, pp. 14807-14822. <doi:10.1364/OE.19.014807>.
Siegel, R., et al, "Cancer Statistics 2013," CA: A Cancer Journal for Clinicians, vol. 63, No. 1, Jan. 1, 2013, pp. 11-30. <doi:10.3322/caac.21166>.
Stoecker, W., et al, "Diagnostic Inaccuracy of Smartphone Applications for Melanoma Detection: Representative Lesion Sets and the Role for Adjunctive Technologies," JAMA Dermatology, vol. 149, No. 7, Jul. 1, 2013, pp. 884-884. <doi:10.1001/jamadermatol.2013.4334>.
Sun, D., et al, "Estimating a signal from a magnitude spectrogram via convex optimization," arXiv preprint arXiv:1209.2076, Sep. 10, 2012, pp. 1-7. [retrieved Nov. 9, 2015] <URL: https://arxiv.org/abs/1209.2076>.
Sun, J., "Coded multi-angular illumination for Fourier ptychography based on Hadamard codes," In Proc. SPIE, vol. 9524, Jul. 17, 2015, pp. 95242C-1-94242C-5. <doi:10.1117/12.2189655> [retrieved Jul. 23, 2015] <URL: http://proceedings.spiedigitallibrary.org>.
Tam, K., et al, "Tomographical imaging with limited-angle input," Journal of the Optical Society of America, vol. 71, No. 5, May 1981, pp. 582-592. <doi:doi.org/10.1364/JOSA.71.000582>.
Thibault, P. et al, "Probe retrieval in ptychographic coherent diffractive imaging," Ultramicroscopy, vol. 109, No. 4, Mar. 2009, pp. 338-343. <doi: 10.1016/j.ultramic.2008.12.011>.
Thibault, P., et al, "High-resolution scanning X-ray diffraction microscopy," Science AAAS, vol. 321, No. 5887, Jul. 18, 2008, pp. 379-382. <doi:10.1126/science.1158573>.
Thomas, L., et al, "Semiological Value of ABCDE Criteria in the Diagnosis of Cutaneous Pigmented Tumors," Dermatology, vol. 197, No. 1, Jul. 13, 1998, p. 11-17. <doi:10.1159/000017969>.
Tian, L., et al, "3D differential phase-contrast microscopy with computational illumination using an LED array," Optics Letters, vol. 39, No. 5, Mar. 1, 2014, pp. 1326-1329. <doi:10.1364/OL39.001326>.
Tian, L., et al, "Computational illumination for high-speed in vitro Fourier ptychographic microscopy," Optica: Research Article, vol. 2, No. 10, Oct. 14, 2015, pp. 904-911. <doi:10.1364/OPTICA.2.000904>.
Tian, L., et al, "Multiplexed Coded Illumination for Fourier Ptychography with an LED Array Microscope," Biomedical Optics Express, vol. 5, No. 7, Jul. 1, 2014, pp. 14. <doi:10.1364/BOE.5.002376>.
Tippie, A.E., et al, "High-resolution synthetic-aperture digital holography with digital phase and pupil correction," Optics Express, vol. 19, No. 13, Jun. 20, 2011, pp. 12027-12038. <doi:10.1364/OE.19.012027>.
Turpin, T., et al, "Theory of the synthetic aperture microscope," SPIE Proceedings, vol. 2566: Advanced Imaging Technologies and Commercial Applications, Aug. 23, 1995, pp. 230-240. [retrieved Mar. 16, 2015] <URL: http://dx.doi.org/10.1117/12.217378>.
Tyson, R., "Principles of Adaptive Optics" Third Ed., Series in Optics and Optoelectronics, CRC Press, Sep. 14, 2010, pp. 1-299. <ISBN: 13: 978-1-4398-0859-7>.
Vulovic, M., et al, "When to use the projection assumption and the weak-phase object approximation in phase contrast cryo-EM," Ultramicroscopy, vol. 136, Jan. 2014, pp. 61-66.<doi:10.1016/j.ultramic.2013.08.002>.
Waldspurger, I., et al, "Phase recovery, MaxCut and complex semidefinite programming," Mathematical Programming, vol. 149, No. 1-2, Feb. 2015, pp. 47-81. <doi:10.1007/s10107-013-0738-9>.
Wang, Q., et al, "Adaptive Optics Microperimetry and OCT Images Show Preserved Function and Recovery of Cone Visibility in Macular Telangiectasia Type 2 Retinal Lesions," Investigative Ophthalmology Visual Science, vol. 56, No. 2, Feb. 2015, pp. 778-786. <doi:10.1167/iovs.14-15576> [retrieved on Apr. 5, 2016] [URL: http://iovs.arvojournals.org].
Wang, Z., et al, "Tissue refractive index as marker of disease," Journal of Biomedical Optics, vol. 16, No. 11, Nov. 2011, pp. 116017-1-16017-7. <doi: 10.1117/1.3656732>.
Watanabe, M., et al, "Telecentric optics for focus analysis," IEEE Transactions on Pattern Analysis and Machine Intelligence: Short Papers, vol. 19, No. 12, Dec. 1997, pp. 1360-1365. <doi:10.1109/34.643894>.
Wesner, J., et al, "Reconstructing the pupil function of microscope objectives from the intensity PSF," Proc. SPIE 4767, Current Developments in Lens Design and Optical Engineering III, 32 (Oct. 1, 2002), pp. 32-43. <doi:10.1117/12.451320> [retrieved Dec. 16, 2015] <URL:http://proceedings.spiedigitallibrary.org>.
Williams, A., et al, "Fourier ptychographic microscopy for filtration-based circulating tumor cell enumeration and analysis," Journal of Biomedical Optics, vol. 19, No. 6, Jun. 20, 2014, pp. 066007.1-66007.8. <doi:10.1117/1.JBO.19.6.066007> [retrieved Feb. 10, 2016] <URL:http://biomedicaloptics.spiedigitallibrary.org>.
Wills, S., "Synthetic Apertures for the Optical Domain," Optics & Photonics News Article [webpage], the Optical Society (OSA), Apr. 18, 2017, pp. 2. <URL:https://www.osa-opn.org/home/newsroom/2017/april/synthetic_apertures_for_the_optical_domain/>.
Wolf, J., et al, "Diagnostic Inaccuracy of Smartphone Applications for Melanoma Detection," JAMA Dermatol. Author Manuscript;

(56) References Cited

OTHER PUBLICATIONS available in PMC May 13, 2014. Published in final edited form as: JAMA Dermatol. Apr. 2013; 149(4): 422-426. <doi:10.1001/jamadermatol.2013.2382>.
Wu, J., et al, "Focal plane tuning in wide-field-of-view microscope with Talbot pattern illumination," Optics Letters, vol. 36, No. 12, Jun. 15, 2011, pp. 2179-2181. <doi: 145985>.
Wu, J., et al, "Harmonically matched grating-based full-field quantitative high-resolution phase microscope for observing dynamics of transparent biological samples," Optics Express, vol. 15, No. 26, Dec. 24, 2007, pp. 18141-18155. <doi:10.1364/OE.15.018141>.
Wu, J., et al, "Paired-angle-rotation scanning optical coherence tomography forward-imaging probe," Optics Letters, vol. 31, No. 9, May 1, 2006, pp. 1265-1267. <doi:10.1364/OL.31.001265>.
Wu, J., et al, "Wide field-of-view microscope based on holographic focus grid illumination," Optics Letters, vol. 35, No. 13, Jul. 1, 2010, pp. 2188-2190. <doi:10.1364/OL.35.002188>.
Xu, W., et al, "Digital in-line holography for biological applications," Proceedings of the National Academy of Sciences of the USA (PNAS), vol. 98, No. 20, Sep. 25, 2001, pp. 11301-11305. <doi:10.1073/pnas.191361398>.
Yeh, et al., "Experimental robustness of Fourier ptychography phase retrieval algorithms," Optics Express, vol. 23, No. 26, Dec. 28, 2015, pp. 33214-33240. <doi: 10.1364/OE.23.033214>.
Yuan, C., et al, "Angular multiplexing in pulsed digital holography for aperture synthesis," Optics Letters, vol. 33, No. 20, Oct. 15, 2008, pp. 2356-2358. <doi:10.1364/OL.33.002356>.
Zeiss, C., "Microscopy: Cells Need the Perfect Climate. System Solutions for Live Cell Imaging under Physiological Conditions," Zeiss Product Brochure, Carl Zeiss Microscopy GmbH Co., Feb. 2008, pp. 42. <URL: http://www.zeiss.de/incubation>.
Zhang, Y., et al, "Self-learning based Fourier ptychographic microscopy," Optics Express, vol. 23, No. 14, Jul. 13, 2015, pp. 18471-18486. <doi: 10.1364/OE.23.018471>.
Zhang, Y., et al, "Photoreceptor perturbation around subretinal drusenoid deposits as revealed by adaptive optics scanning laser ophthalmoscopy," HHS Public Access, Am J Ophthalmol. Author Manuscript, Sep. 1, 2015, pp. 22. (Published in final edited form as: Am J Ophthalmol. Sep. 2014; 158(3): 584-96.e1.).
Zheng, G. "The ePetri dish, an on-chip cell imaging platform based on subpixel perspective sweeping microscopy (SPSM)," PNAS Early Edition, Published online before print Oct. 3, 2011, pp. 6. <doi:10.1073/pnas.1110681108>.
Zheng, G., "Fourier Ptychographic Imaging: A MATLAB tutorial," IOP Concise Physics, Morgan & Claypool Publication, San Rafael, CA., May 2016, pp. 96. <ISBN: 978-1-6817-4272-4 (ebook)> <doi: 10.1088/978-1-6817-4273-1>.
Zheng, G., et al, "Characterization of spatially varying aberrations for wide field-of-view microscopy," Optics Express, vol. 21, No. 13, Jul. 1, 2013, pp. 15131-15143. <doi:10.1364/OE.21.015131>.
Zheng, G., et al, "Microscopy refocusing and dark-field imaging by using a simple LED array," Optics Letters, vol. 36, No. 20, Oct. 15, 2011, pp. 3987-3989. <doi: 10.1364/OL.36.003987>.
Zheng, G., et al, "Wide-field, high-resolution Fourier ptychographic microscopy," Nature Photonics, vol. 7, Sep. 2013, Published Online Jul. 28, 2013, pp. 739-746. <doi:10.1038/NPHOTON.2013.187>.
Zheng, G., et al, "0.5 gigapixel microscopy using a flatbed scanner," Biomedical Optics Express, vol. 5, No. 1, Jan. 1, 2014, pp. 1-8. <doi: 10.1364/BOE.5.000001>.
Zheng, G., et al, "Sub-pixel resolving optofluidic microscope for on-chip cell imaging," Lab Chip, vol. 10, Sep. 29, 2010, pp. 3125-3129. <doi:10.1039/c0Lc00213e> [retrieved on Oct. 4, 2010] <URL: http://pubs.rsc.org>.
Zheng, G., et al, "Wide-field, high-resolution Fourier ptychographic microscopy," HHS Public Access, Nat. Photonics. Author Manuscript; available in PMC Sep. 19, 2014, pp. 1-16. (Published in final edited form as: Nat Photonics. Sep. 1, 2013; 7(9): 739-745. <doi:10.1038/nphoton.2013.187>).
U.S. Appl. No. 16/242,934, filed Jan. 8, 2019, Kim et al.
U.S. Appl. No. 16/252,465, filed Jan. 18, 2019, Ou et al.

U.S. Office Action dated Jun. 26, 2019 issued in U.S. Appl. No. 14/065,280.
U.S. Notice of Allowance dated Jan. 29, 2020 issued in U.S. Appl. No. 14/065,280.
U.S. Notice of Allowance dated Apr. 19, 2019 in U.S. Appl. No. 15/963,966.
U.S. Final Office Action dated Jun. 3, 2019 in U.S. Appl. No. 15/959,050.
U.S. Notice of Allowance dated Nov. 20, 2019 in U.S. Appl. No. 15/959,050.
U.S. Notice of Allowance dated Apr. 16, 2019 in U.S. Appl. No. 15/820,295.
U.S. Final Office Action dated May 30, 2019 in U.S. Appl. No. 14/658,019.
U.S. Office Action dated Jan. 9, 2020 in U.S. Appl. No. 14/658,019.
U.S. Office Action dated Mar. 8, 2019 in U.S. Appl. No. 16/171,270.
U.S. Notice of Allowance dated Aug. 12, 2019 in U.S. Appl. No. 14/960,252.
U.S. Notice of Allowance dated Sep. 17, 2019 in U.S. Appl. No. 14/960,252.
U.S. Notice of Allowance dated Jan. 6, 2020 in U.S. Appl. No. 14/960,252.
U.S. Ex Parte Quayle Action dated Aug. 8, 2019 issued in U.S. Appl. No. 16/242,934.
U.S. Notice of Allowance dated Nov. 4, 2019 issued in U.S. Appl. No. 16/242,934.
U.S. Notice of Allowance dated Feb. 18, 2020 issued in U.S. Appl. No. 16/242,934.
U.S. Office Action dated Apr. 4, 2019 in U.S. Appl. No. 16/162,271.
U.S. Notice of Allowance dated Dec. 9, 2019 in U.S. Appl. No. 16/162,271.
U.S. Final Office Action dated May 30, 2019 in U.S. Appl. No. 14/979,154.
U.S. Notice of Allowance dated Mar. 2, 2020 in U.S. Appl. No. 14/797,154.
U.S. Office Action dated Jun. 26, 2019 issued in U.S. Appl. No. 15/003,559.
U.S. Notice of Allowance dated Jan. 17, 2020 issued in U.S. Appl. No. 15/003,559.
U.S. Final Office Action dated Jun. 19, 2019 issued in U.S. Appl. No. 15/068,389.
U.S. Notice of Allowance dated Sep. 16, 2019 issued in U.S. Appl. No. 15/068,389.
U.S. Notice of Allowance dated Jan. 24, 2020 issued in U.S. Appl. No. 15/068,389.
U.S. Office Action dated Sep. 23, 2019 issued in U.S. Appl. No. 16/252,465.
U.S. Notice of Allowance dated Apr. 29, 2019 issued in U.S. Appl. No. 15/620,674.
U.S. Notice of Allowance dated Aug. 14, 2019 issued in U.S. Appl. No. 15/620,674.
U.S. Notice of Allowance dated Sep. 25, 2019 issued in U.S. Appl. No. 15/620,674.
Chinese Second Office Action dated Dec. 31, 2019 issued in CN 201580072950.8.
Chinese Second Office Action dated Nov. 12, 2019 issued in Application No. CN 201680005491.6.
Chinese First Office Action dated Apr. 19, 2019 issued in Application No. CN 201680006738.6.
Chinese Second Office Action dated Nov. 28, 2019 issued in Application No. CN 201680006738.6.
Chinese First Office Action dated Apr. 19, 2019 issued in Application No. CN 201680014898.5.
Adie, et al., "Computational adaptive optics for broadband optical interferometric tomography of biological tissue," Proc. Natl. Acad. Sci. USA 109, 7175-7180 (May 8, 2012).
Bian, et al., "Content adaptive illumination for Fourier ptychography," Optics Letters, vol. 39, Aug. 2014, pp. 1-6.
Bioucas-Dias, et al., "Total variation-based image deconvolution: a majorization-minimization approach," ICASSP (2), pp. 861-864 (May 14, 2006).
Booth, "Adaptive optical microscopy: the ongoing quest for a perfect image," Light Sci. Appl. 3, e165 (Apr. 25, 2014).

(56) References Cited

OTHER PUBLICATIONS

Chung, et al., "Computational aberration compensation by coded-aperture-based correction of aberration obtained from optical Fourier coding and blur estimation," Optica, vol. 6, May 10, 2019, pp. 647-661.
Desjardins, et al., "Angle-resolved Optical Coherence Tomography with sequential selectivity for speckle reduction" Optics Express, vol. 15, No. 10, May 14, 2007, pp. 6200-6209.
Dowski, et al., "Extended depth of field through wavefront coding," Applied Optics, vol. 34, No. 11, Apr. 10, 1995, pp. 1859-1866.
Evered, et al., "Accuracy and perceptions of virtual microscopy compared with glass slide microscopy in cervical cytology," Cytopathology, vol. 22, Feb. 2, 2010, pp. 82-87.
Fergus, et al., "Removing camera shake from a single photograph," ACM Trans. Graph. 25, 787-794 (2006).
Fienup and Miller, "Aberration correction by maximizing generalized sharpness metrics," J. Opt. Soc. Am. A 20, pp. 609-620 (Apr. 2003).
Fried, D.L.,"Anisoplanatism in adaptive optics," J. Opt. Soc. Am. vol. 72, No. 1, Jan. 1982, pp. 52-61.
Gunjala, et al., "Aberration recovery by imaging a weak diffuser," Optics Express vol. 26, No. 16, Aug. 6, 2018, pp. 21054-21068.
McConnell, et al., "A novel optical microscope for imaging large embryos and tissue volumes with sub-cellular resolution throughout," eLife 5, e18659, Sep. 23, 2016, pp. 1-15.
Muyo, et al., "Wavefront coding for athermalization of infrared imaging systems," Proc. SPIE 5612, Dec. 6, 2004, pp. 227-235.
Muyo, et al., "Infrared imaging with a wavefront-coded singlet lens," Optics Express, vol. 17, Nov. 5, 2009, pp. 21118-21123.
Ginner, et al., "Holographic line field en-face OCT with digital adaptive optics in the retina in vivo," Biomed. Opt. Express 9, 472-485 (Feb. 1, 2018).
Ginner, et al., "Noniterative digital aberration correction for cellular resolution retinal optical coherence tomography in vivo," Optica, vol. 4, Aug. 2017, pp. 924-931.
Gustafsson, M., "Nonlinear structured-illumination microscopy: wide-field fluorescence imaging with theoretically unlimited resolution," Proc. Natl. Acad. Sci. USA 102, 13081-13086 (Sep. 13, 2005).
Hofer, et al., "Improvement in retinal image quality with dynamic correction of the eye's aberrations," Opt. Express 8, May 21, 2001, pp. 631-643.
Hillmann, et al., "Aberration-free volumetric high-speed imaging of in vivo retina," Sci. Rep. 6, 35209 (Oct. 20, 2016).
Kamal, et al., "In situ retrieval and correction of aberrations in moldless lenses using Fourier ptychography," Opt. Express, vol. 26, No. 3, pp. 2708-2719 (Feb. 5, 2018).
Kuang, et al., "Digital micromirror device-based laser illumination Fourier ptychographic microscopy," Optics Express, vol. 23, Oct. 5, 2015, pp. 26999-27010.
Kubala, et al., "Reducing complexity in computational imaging systems," Optics Express, vol. 11, Sep. 8, 2003, pp. 2102-2108.
Kumar, et al., "Subaperture correlation based digital adaptive optics for full field optical coherence tomography," Optics Express, vol. 21, May 6, 2013, pp. 10850-10866.
Kundur, et al., "Blind Image Deconvolution," IEEE Signal Processing Magazine, vol. 13, No. 3, May 1996, pp. 43-64.
Levin et al., "Image and depth from a conventional camera with a coded aperture," ACM Transactions on Graphics, vol. 26, No. 3, Article 70, Jul. 2007, pp. 70-1-70-9.
Levin, et al., "Understanding blind deconvolution algorithms," IEEE Trans. Pattern Anal. Mach. Intell., vol. 33, No. 12, Dec. 2011, pp. 2354-2367.
Li, et al., "Separation of three-dimensional scattering effects in tilt-series Fourier ptychography," Ultramicroscopy 158, 1-7 (Jun. 14, 2015).
Marcos, et al., "Vision science and adaptive optics, the state of the field," Vision Research, vol. 132, Feb. 27, 2017, pp. 3-33.

Martins da Silva et al., "Photosensitivity and epilepsy: current concepts and perspectives—a narrative review," Seizure, vol. 50, Apr. 4, 2017, pp. 209-218.
Neumaier, "Solving ill-conditioned and singular linear systems: a tutorial on regularization," SIAM Rev. 40, (1998), pp. 636-666.
Pan, et al., "Subwavelength resolution Fourier ptychography with hemispherical digital condensers," Opt. Express 26, 23119-23131 (Sep. 3, 2018).
Pan, et al., "System calibration method for Fourier ptychographic microscopy," J. Biomed. Opt. 22, 096005 (Sep. 12, 2017).
Pan, et al., "Three-dimensional space optimization for near-field ptychography," Opt. Express 27, 5433-5446 (Feb. 18, 2019).
Qian, et al., "Large-scale 3D imaging of insects with natural color," Opt. Express 27, 4845-4857 (Feb. 18, 2019).
Reinig, et al., "Adaptative optics microscopy enhances image quality in deep layers of Clarity processed brains of YFP-H mice" Proc., of SPIE, vol. 9690, (Mar. 9, 2016)pp. 969008-1-969008-12. <doi:10.1117/12.2213283>.
Rha, et al., "Adaptive optics flood-illumination camera for high speed retinal imaging," Opt. Express vol. 14, May 15, 2006, pp. 4552-4569.
Shemonski, et al., "Computational high-resolution optical imaging of the living human retina," Nat. Photonics, vol. 9, Jul. 2015, pp. 440-443.
Soulez, et al., "Blind deconvolution of 3D data in wide field fluorescence microscopy" In 2012 9th IEEE International Symposium on Biomedical Imaging (ISBI) May 2, 2012, pp. 1735-1738.
Sun, et al., "Efficient positional misalignment correction method for Fourier ptychographic microscopy," Biomedical Optics Express vol. 7, No. 4, Mar. 17, 2016, pp. 1336-1350.
Sun, et al., "Resolution-enhanced Fourier ptychographic microscopy based on high-numerical-aperture illuminations," Scientific Reports, vol. 7, No. 1187, Apr. 26, 2017, pp. 1-11.
Sun, et al., "Sampling criteria for Fourier ptychographic microscopy in object space and frequency space," Optics Express vol. 24, No. 14, Jul. 11, 2016, pp. 15765-15781.
Thiébaut and Conan, "Strict a priori constraints for maximum likelihood blind deconvolution," J. Opt. Soc. Am. A, vol. 12, No. 3, Mar. 1995, pp. 485-492.
Tian and Waller, "3D intensity and phase imaging from light field measurements in an LED array microscope," Optica vol. 2, No. 2, Feb. 2015, pp. 104-111.
Tomer et al., "Advanced Clarity for rapid and high-resolution imaging of intact tissues," Nat. Protoc., vol. 9, No. 7, Jul. 2014, pp. 1682-1697.
Wade, et al., "A fast, robust pattern recognition system for low light level image registration and its application to retinal imaging," Optics Express vol. 3, No. 5, Aug. 31, 1998, pp. 190-197.
Williams, D., "Imaging Single Cells in the Living Retina," Vis. Res. 51, pp. 1379-1396 (Jul. 1, 2011).
Yaroslaysky, "Image Resampling and Building Continuous Image Models", Chapter 6, Theoretical Foundations of Digital Imaging Using MATLAB , pp. 293-342 (CRC Press, 1 edition, Nov. 26, 2012).
Yuan, et al., "Image deblurring with blurred/noisy image pairs," ACM Trans. Graph. 26, Jul. 29, 2007, pp. 1-10.
Zhou, et al., "What are Good Apertures for Defocus Deblurring?" in 2009 IEEE International Conference on Computational Photography (IEEE, Apr. 16-17, 2009), pp. 1-8.
U.S. Appl. No. 16/672,497, filed Sep. 16, 2019, Ou et al.
U.S. Notice of Allowance dated Apr. 3, 2020 in U.S. Appl. No. 16/162,271.
Chinese Second Office Action dated Mar. 19, 2020 issued in Application No. CN 201680014898.5.
U.S. Final Office Action dated May 1, 2020 issued in U.S. Appl. No. 16/252,465.
Chinese First Office Action dated Apr. 16, 2020 issued in Application No. CN 201810576437.8.
Chinese Third Office Action dated May 15, 2020 issued in Application No. CN 201680005491.6.

\* cited by examiner

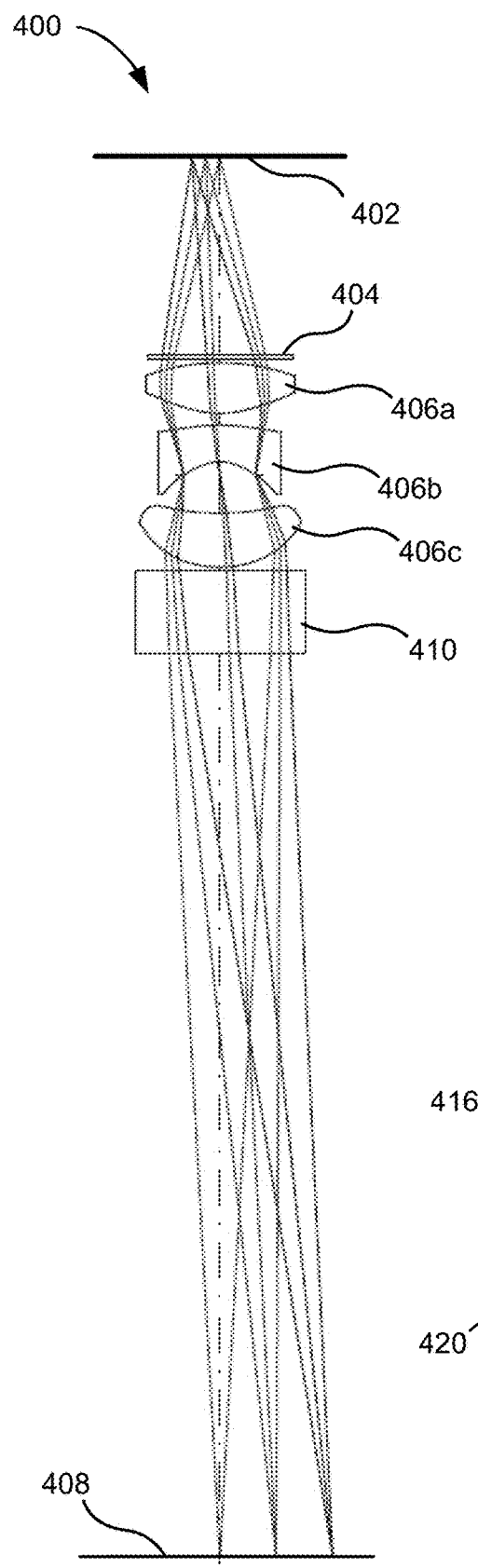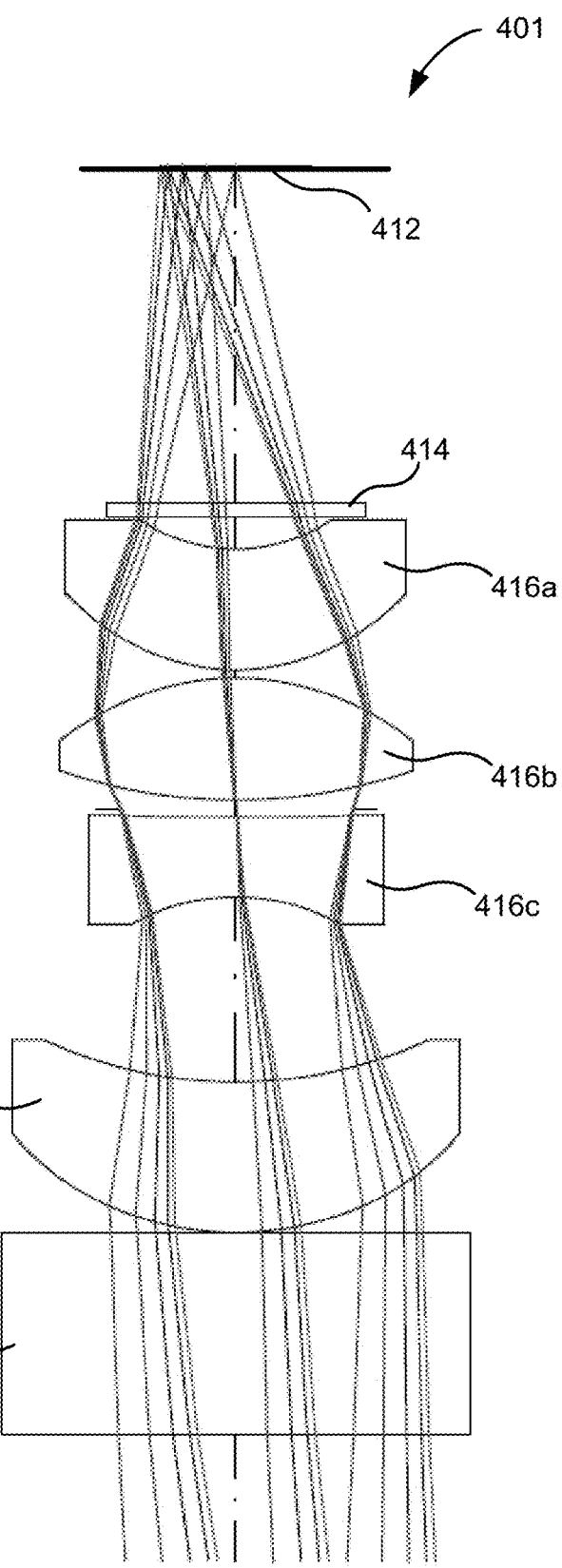
*FIG. 4A*  *FIG. 4B*

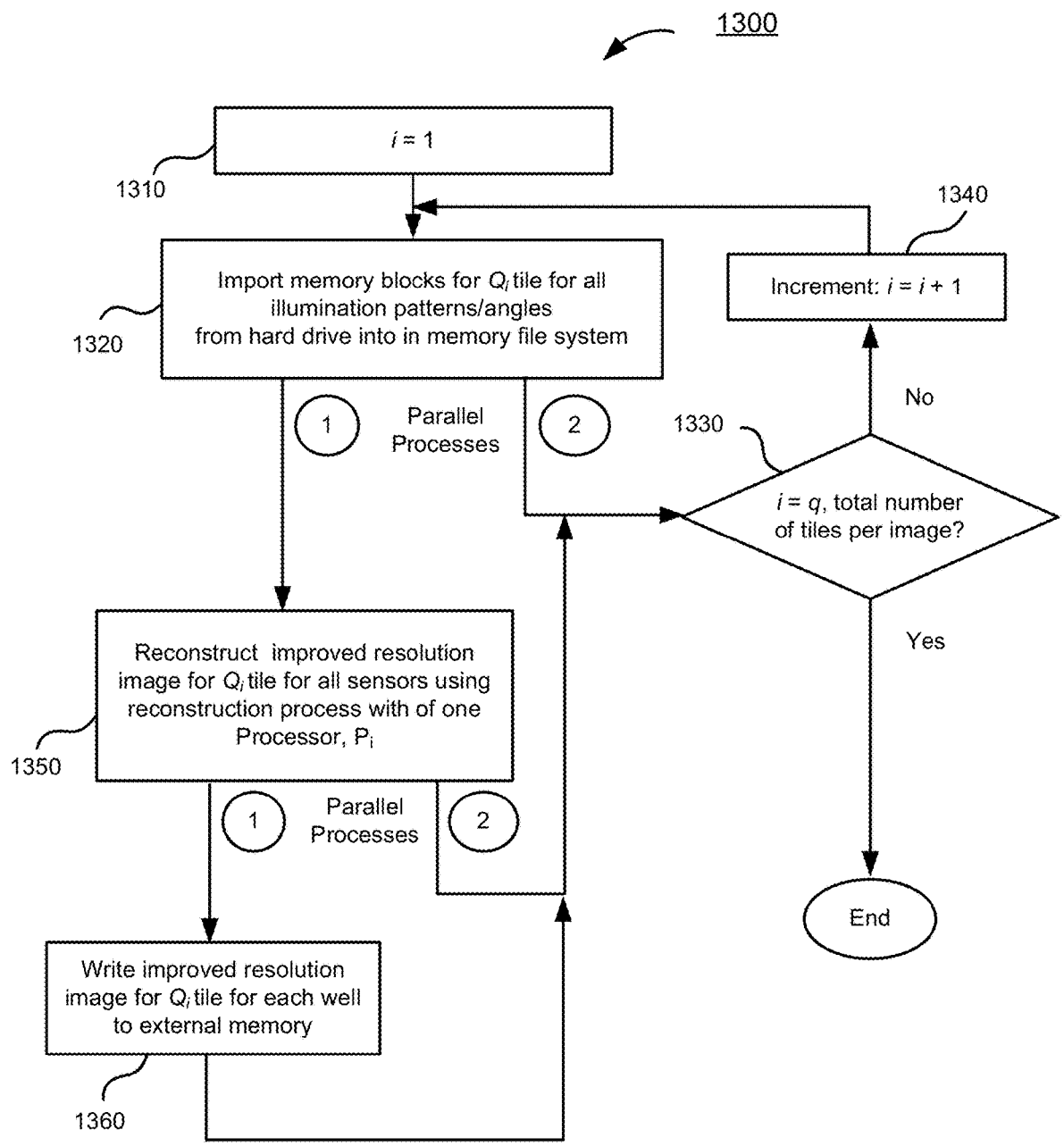
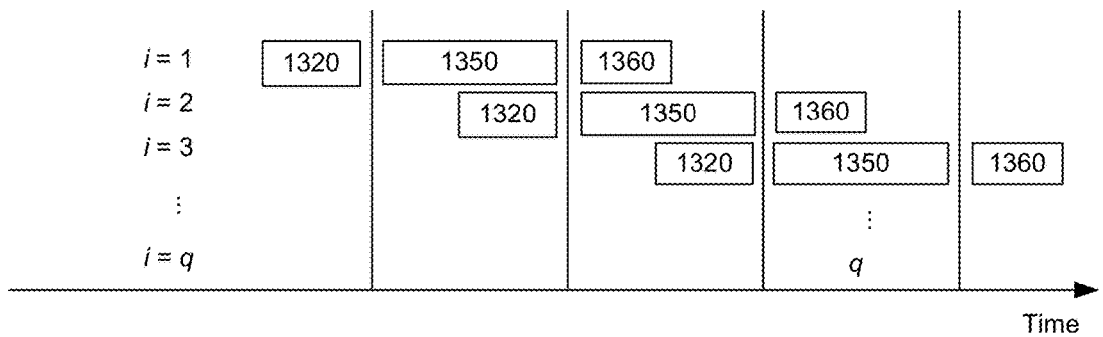
FIG. 13

Lookup Table

| s-th Illumination | T-th image sensor | n-th illumination angle |
|---|---|---|
| 4th illumination (LED 1236 in FIG. 12A) | 1st image Sensor (image sensor 1252) | 2nd Illumination angle (angle $1240_2$) |
| 4th illumination (LED 1236 in FIG. 12A) | 2nd image Sensor (image sensor 1254) | 1st Illumination angle (angle $1240_1$) |
| 4th illumination (LED 1236 in FIG. 12A) | 3rd image Sensor (image sensor 1256) | 3rd Illumination angle (angle $1240_3$) |
| 7th illumination (LED 1239 in FIG. 12B) | 1st image Sensor (image sensor 1252) | Undefined - Discarded Image |
| 7th illumination (LED 1239 in FIG. 12B) | 3rd image Sensor (image sensor 1256) | 1st Illumination angle (angle $1240_1$) |
| 7th illumination (LED 1239 in FIG. 12B) | 2nd image Sensor (image sensor 1254) | 2nd Illumination angle (angle $1241_2$) |

*FIG. 15*

PARALLEL IMAGING ACQUISITION AND RESTORATION METHODS AND SYSTEMS

CROSS-REFERENCES TO RELATED APPLICATIONS

This application claims priority to U.S. Provisional Patent Application No. 62/581,529, titled "Parallel Image Acquisition and Restoration Method for Array Level Fourier Ptychographic Imager" and filed on Nov. 3, 2017, which is hereby incorporated by reference in its entirety and for all purposes.

FIELD

Certain embodiments described herein are generally related to digital imaging, and more specifically, to methods and systems of parallel image acquisition and restoration that can be implemented, for example, in an array-level Fourier ptychographic imager.

BACKGROUND

Live cell imaging and other cell culture monitoring is widely used in bioscience experiments for a better understanding of dynamic cellular behaviors such as migration, division, differentiation, interaction with the environment, and organelle-level events. Cell culture monitoring can also provide the opportunity to detect unanticipated cell death and contamination at an early stage to rescue failing cell culture in a timely manner.

For longitudinal studies, bioscientists have traditionally resorted to building a specialized incubation and imaging chamber onto a microscope, and imaging the cultured cells directly on the microscope stage as discussed in http://www.zeiss.com/microscopy/en_us/products/microscope-components/incubation.html. This approach, however, is not only expensive, but occupies a significant amount of real estate in the lab. Furthermore, field-of-view and image resolution are coupled to the physical properties of the objective lens in the microscope. Thus field-of-view and image resolution must be traded off when using this microscope platform. Another approach to cell culture monitoring is to incorporate imaging systems within incubators. Unfortunately, these systems also employ a standard microscope. Moreover, mechanical scanning is used. As a result, it is difficult to obtain wide field of view and high resolution imaging at the same time in these systems. In addition, these systems are expensive to build and maintain and their throughput is limited by the standard microscope itself. That is, the number of resolvable pixels, characterized by the space-bandwidth product accessible through a standard microscope is typically limited to 10 megapixels. This space-bandwidth product limitation constrains the rate of image acquisition or throughput achieved by the systems.

Some on-chip microscopes have been developed with the purpose of overcoming the space-bandwidth product limit of the standard microscope. These on-chip microscopes have demonstrated successful high resolution and wide field-of-view imaging of the cell cultures from within the incubator. Examples of these on-chip microscopes can be found at G. Zheng, S. A. Lee, Y. Antebi, M. B. Elowitz, and C. Yang, "The ePetri dish, an on-chip cell imaging platform based on subpixel perspective sweeping microscopy (SPSM)," Proc. Natl. Acad. Sci. U.S.A. 108(41), 16889-16894 (2011), J. H. Jung, C. Han, S. A. Lee, J. Kim, and C. Yang, "Microfluidic-integrated laser-controlled microactuators with on-chip microscopy imaging functionality," Lab Chip 14(19), 3781-3789 (2014), and C. Han, S. Pang, D. V. Bower, P. Yiu, and C. Yang, "Wide field-of-view on-chip Talbot fluorescence microscopy for longitudinal cell culture monitoring from within the incubator," Anal. Chem. 85(4), 2356-2360 (2013). However, these on-chip microscopes have the inherent limitation that cells need to be grown on top of the image sensor. This limitation is a marked departure from the standard cell culture workflow. If culture cells or biological sample is imaged on top of the sensor chip, the surface is made with silicon-based material (usually silicon nitride), so cell culture environment changes. Even though a special layer may be coated onto the image sensor, the bottom layer of the surface is different from plastic or glass used in a standard cell culture workflow. Furthermore, the imaging sensor surface is an active layer and making heat during operation. So the cell culture environment can be affected by the temperature change related with this heat unless the system is designed for the cooling. Other lensless imaging methods, such as digital in-line holography, can work without this restriction and can provide high imaging space-bandwidth product in the bright-field mode, but the absence of optical focusing elements prevents them from having effective fluorescence imaging capability. Focusing elements are needed for effective fluorescence imaging capability since fluorescence emissions are incoherent and of low intensity, which degrades the resolution of fluorescence images without any focusing elements. Examples of digital in-line holography can be found in W. Bishara, T. W. Su, A. F. Coskun, and A. Ozcan, "Lensfree on-chip microscopy over a wide field-of-view using pixel super-resolution," Opt. Express 18(11), 11181-11191 (2010), W. Bishara, U. Sikora, O. Mudanyali, T. W. Su, O. Yaglidere, S. Luckhart, and A. Ozcan, "Holographic pixel super-resolution in portable lensless on-chip microscopy using a fiber-optic array," Lab Chip 11(7), 1276-1279 (2011), and A. Greenbaum, U. Sikora, and A. Ozcan, "Field-portable wide-field microscopy of dense samples using multi-height pixel super-resolution based lensfree imaging," Lab Chip 12(7), 1242-1245 (2012).

SUMMARY

Certain embodiments pertain to methods and systems of parallel image acquisition and restoration.

Certain aspects pertain to embodiments of imaging systems, each having an illumination system, an optical system, one or more sets of image sensors, one or more multiplexers, and an internal memory comprising an in-memory parallel system. The illumination system has an array of light sources configured to sequentially activate different subsets of the light sources to provide a plurality of illumination patterns incident a plurality of sample wells. The optical system is configured to focus light transmitted through the plurality of sample wells. Each image sensor is configured to receive light focused by the optical system from one of the sample wells and configured to acquire a plurality of images, each image acquired while illumination of one of the illumination patterns is incident the one or more sample wells. Each multiplexer is in communication with one of the sets of image sensors and configured to forward images acquired by the corresponding set of image sensors.

Certain aspects pertain to embodiments of imaging methods. Each imaging method sequentially activates different subsets of light sources in an array of light sources to sequentially provide a plurality of illumination patterns of illumination incident a plurality of sample wells. Each imaging method also acquires, by each image sensor of one or more sets of image sensors, a plurality of images where each image is acquired while illumination of one of the illumination patterns is incident the one or more sample wells. Each method also sorts, segments, and indexes on the fly the plurality of raw images incoming from each image sensor of the corresponding set of image sensors to a four-dimensional hypercube formed in the in-memory parallel system.

Certain embodiments pertain to techniques that involve digital image acquisition methods using digital imaging systems that have multiple image sensors and that are capable of storing a plurality of raw images captured simultaneously by the image sensors during each image acquisition operation. In addition or alternatively, these techniques can also involve parallel image restoration from multiple image acquisition operations. During each acquisition operation, an illumination system provides a unique pattern of illumination over all image sensors and each of the image sensors captures a raw image for each of a sequence of unique illumination angles of incidence (also referred to herein as "incidence angles"). The parallel image restoration technique uses the raw image data captured during the image acquisition operations by multiple image sensors to generate a higher resolution image. In some cases, each of the image sensors is in alignment with a corresponding set of one or more lenses.

These and other features are described in more detail below with reference to the associated drawings.

BRIEF DESCRIPTION OF THE DRAWINGS

FIG. 4A shows a diagram of a portion of an example optical arrangement including three lenses according to some implementations.

FIG. 4B shows a diagram of a portion of an example optical arrangement including four lenses according to some implementations.

FIG. 13 is a flowchart depicting an example of a cascading, parallel restoration process, according to some implementations.

FIG. 15 is a portion of a lookup table, according to embodiments.

DETAILED DESCRIPTION

Figure 1:
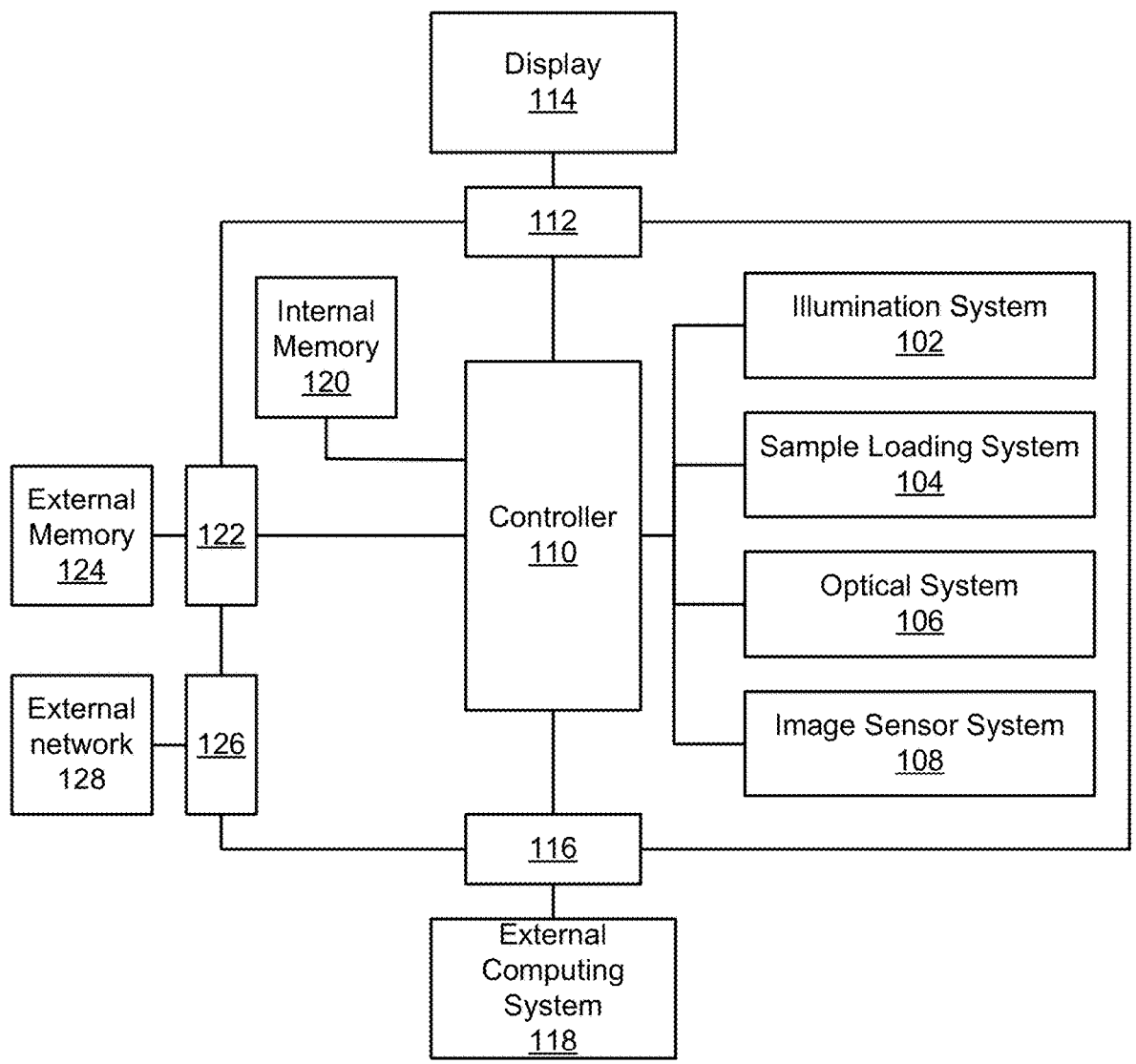
FIG. 1 shows a schematic block diagram depicting an example imaging system capable of Fourier ptychographic imaging according to certain implementations.

Different aspects are described below with reference to the accompanying drawings. The features illustrated in the drawings may not be to scale. Certain aspects pertain to parallel image acquisition and restoration methods and systems.

In the following description, numerous specific details are set forth in order to provide a thorough understanding of the presented embodiments. The disclosed embodiments may be practiced without some or these specific details. In other instances, well-known operations have not been described in detail to not unnecessarily obscure the disclosed embodiments. While the disclosed embodiments will be described in conjunction with the specific embodiments, it will be understood that it is not intended to limit the disclosed embodiments. For example, it should be understood that while certain embodiments of the parallel image acquisition and restoration techniques are described with respect to array-level Fourier ptychographic imagers, these embodiments are also applicable beyond the context of Fourier Ptychography. These techniques can be applied to any parallel digital image acquisition system architecture having multiple image sensors, that perform independent observations of the sample or samples being imaged, and over the course of the image acquisition phase provide the same or nearly the same set of illumination conditions. For example, these parallel image acquisition and restoration techniques can be beneficial to any high-throughput imaging of multiple specimens such as those located on various types of multi-well plates and with applications ranging from quality control in industrial manufacturing (e.g. food quality inspection) to biochemical studies in life sciences and pharmaceutical industries. For example, the parallel image acquisition and restoration techniques can be applied to video rate tracking of migrating cells on one or more large-area petri dishes covering multiple cameras. As another example, these techniques can be implemented with a system equipped with a mechanical scanning platform and then applied to volumetric imaging and tracking of swimming micro-organisms on individual sample wells of a multi-well plate.

I. Overview of Array-Level Fourier Ptychographic Imagers

FIG. 1 shows a block diagram of an example imaging system 100 capable of Fourier ptychographic (FP) imaging according to some implementations. Additional details of this example can be found in U.S. patent application Ser. No. 15/007,196, issued as U.S. Pat. No. 9,829,695), titled "ARRAY LEVEL FOURIER PTYCHOGRAPHIC IMAGING," and filed on Jan. 26, 2016, which is hereby incorporated by reference in its entirety and for all purposes.

At a high level, the imaging system 100 is configured or configurable to acquire images of samples at the array level; that is, to illuminate and capture images of an entire array of samples in parallel. The imaging system 100 also can include parallel processing capabilities to transform and combine raw image data frames obtained for each of the sample wells to generate a restored image for each of the sample wells at the array level. The imaging system 100 includes an illumination system 102, a sample loading system 104, an optical system 106 and an image sensor system 108. A controller 110 controls the operations of the illumination system 102 and the image sensor system 108. The controller 110 also is configured to receive the raw (or minimally pre-processed) image data from the image sensor system 108. In some implementations, the controller 110 is further configured to execute instructions on the raw image data to perform one or more processing operations such as various FP processes including aberration correction.

The illumination system 102 includes an array (or "matrix") of light sources. For example, each light source can include one or more light-emitting diodes (LEDs). The controller 110 controls the illumination of the light sources, for example, by selectively powering on or otherwise allowing only particular ones or subsets of the light sources to form various illumination patterns at particular times and for particular durations during various imaging acquisitions. The optical system 106 generally includes at least one array of lenses (referred to hereinafter as a "lens array"). Each lens array includes a plurality (or "multiplicity") of lenses. The image sensor system 108 includes an array of image sensors, for example, an array of cameras or other suitable imaging devices. In various implementations, the arrangement and total number T of lenses in each array matches the arrangement and total number of image sensors in the imaging system as well as the arrangement and total number of wells in a multi-well plate to be imaged.

The sample loading system 104 is generally configured to receive a sample array such as a conventional or commercially-available multi-well plate (also referred to as a "well plate," "microtiter plate," "microplate," or "microwell plate"). Each multi-well plate generally includes an array (typically a rectangular array) of wells arranged in a plurality of rows and a plurality of columns. In typical applications, samples are generally pipetted or otherwise deposited into the wells for imaging. In various implementations, the sample loading system 104 is more specifically configured to receive a multi-well plate inserted or otherwise loaded into the sample loading system 104 such that the wells (for example, the bottom surfaces of the wells) of the multi-well plate are positioned along a particular plane between the light sources of the illumination system 102 and the lenses of the optical system 106. The sample loading system 104 also functions to approximately align the centers of the wells of the multi-well plate with the centers of corresponding lenses of the optical system 106 (although as will become clear below, precise alignment is not required for various implementations of the imaging system described herein).

During the image acquisition phase, light generated by the illumination system 102 illuminates samples in the wells. In some imaging modes or processes, such as those for use in bright-field imaging, the light incident on each sample is scattered by the physical features of the sample as it passes through the sample. In some other imaging modes or processes, such as those for use in fluorescence imaging, the light sources are configured to generate particular wavelengths of excitation light to excite fluorophores (for example, specialized proteins) in the sample. In such fluorescence imaging, the incident excitation light imparts energy into the fluorophores, which then emit light at lower energy wavelengths. A portion of the scattered light or emitted light then passes through the transparent bottom of the well to a corresponding lens (or set of lenses) of the optical system 106. The lens(es) below each respective well generally function to focus the scattered or emitted light from the well onto a respective one of the image sensors of the image sensor system 108. Each image sensor is configured to capture the light and output a data signal including image data representative of the intensities of light received at particular locations of the image sensor (referred to herein as a "light intensity distribution," "intensity distribution," or simply as an "image" or "image frame").

The image data output by each of the image sensors is then transmitted (or "sent" or "communicated") to the controller 110. In some implementations, the controller 110 is configured to process the raw image data of each image acquisition phase to generate processed image data. For example, in some implementations the controller 110 is configured or configurable by a user to perform one or more FP image processing operations on the raw image data. As described above, to generate an FP-restored image of each well in parallel, a plurality of image acquisitions are performed using different illumination patterns. The controller 110 interprets image data from the sequence of acquired intensity images, transforms the relatively low resolution image data frames associated with each of the image acquisitions into Fourier space, combines the transformed raw image data, corrects for aberrations resulting from the lenses as well as the sample features, and generates a single high resolution image for each of the sample wells. As described above, the imaging system 100 also can be configured to perform fluorescence imaging. As such, the controller 110 can generally include functionality to interpret, process, and in some instances combine fluorescence image data for each of the sample wells in parallel.

To perform such parallel image processing, the controller 110 generally includes at least one processor (or "processing unit"). Example processors include, for example, one or more of a general purpose processor (CPU), an application-specific integrated circuit (ASIC), an programmable logic device (PLD) such as a field-programmable gate array (FPGA), or a System-on-Chip (SoC) that includes one or more of a CPU, ASIC, PLD as well as a memory and various interfaces. The controller 110 also is in communication with at least one internal memory device 120. The internal memory device 120 can include a non-volatile memory array for storing processor-executable code (or "instructions") that is retrieved by the processor to perform various functions or operations described herein for carrying out various algorithms or other operations on the image data. The internal memory device 120 also can store raw and/or processed image data (including Fourier ptychographic restored images). In some implementations, the internal memory device 120 or a separate memory device can additionally or alternatively include a volatile memory array for temporarily storing code to be executed as well as image data to be processed, stored, or displayed. In some implementations, the controller 110 itself can include volatile and in some instances also non-volatile memory.

In some implementations, the controller 110 is configured or configurable by a user to output raw image data or processed image data (for example, after FP image processing) over a communication interface 112 for display on a display 114. In some implementations, the controller 110 also can be configured or configurable by a user to output raw image data as well as processed image data (for example, after FP image processing) over a communication interface 116 to an external computing device or system 118. Indeed in some implementations, one or more of the FP imaging operations can be performed by such an external computing device 118. In some implementations, the controller 110 also can be configured or configurable by a user to output raw image data as well as processed image data (for example, after FP image processing) over a communication interface 122 for storage in an external memory device or system 124. In some implementations, the controller 110 also can be configured or configurable by a user to output raw image data as well as processed image data (for example, after FP image processing) over a network communication interface 126 for communication over an external network 128 (for example, a wired or wireless network). The network communication interface 126 also can be used to receive information such as software or firmware updates or other data for download by the controller 110. In some implementations, the imaging system 100 further includes one or more other interfaces such as, for example, various Universal Serial Bus (USB) interfaces or other communication interfaces. Such additional interfaces can be used, for example, to connect various peripherals and input/output (I/O) devices such as a wired keyboard or mouse or to connect a dongle for use in wirelessly connecting various wireless-enabled peripherals. Such additional interfaces also can include serial interfaces such as, for example, an interface to connect to a ribbon cable. It should also be appreciated that one or more of the illumination system 102 and the image sensor system 108 can be electrically coupled to communicate with the controller over one or more of a variety of suitable interfaces and cables such as, for example, USB interfaces and cables, ribbon cables, Ethernet cables, among other suitable interfaces and cables.

The data signals output by the image sensors may in some implementations be mutliplexed, serialized or otherwise combined by a multiplexer, serializer or other electrical component of the image sensor system before being communicated to the controller 110. In such implementations, the controller 110 can further include a demultiplexer, deserializer or other device or component for separating the image data from each of the image sensors so that the image frames for each of the sample wells can be processed in parallel by the controller 110.

Figure 2A:
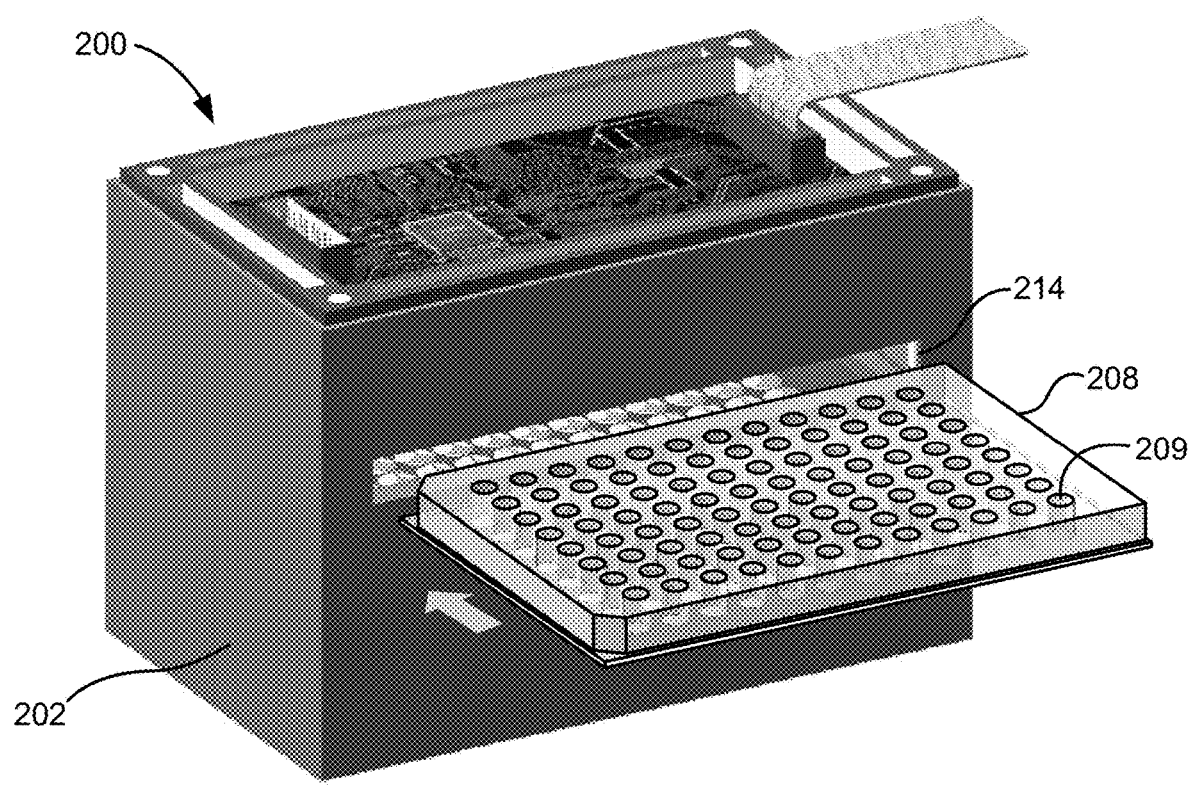
FIG. 2A shows a schematic diagram depicting an example imaging system capable of Fourier ptychographic imaging according to certain implementations.
Figure 2B:
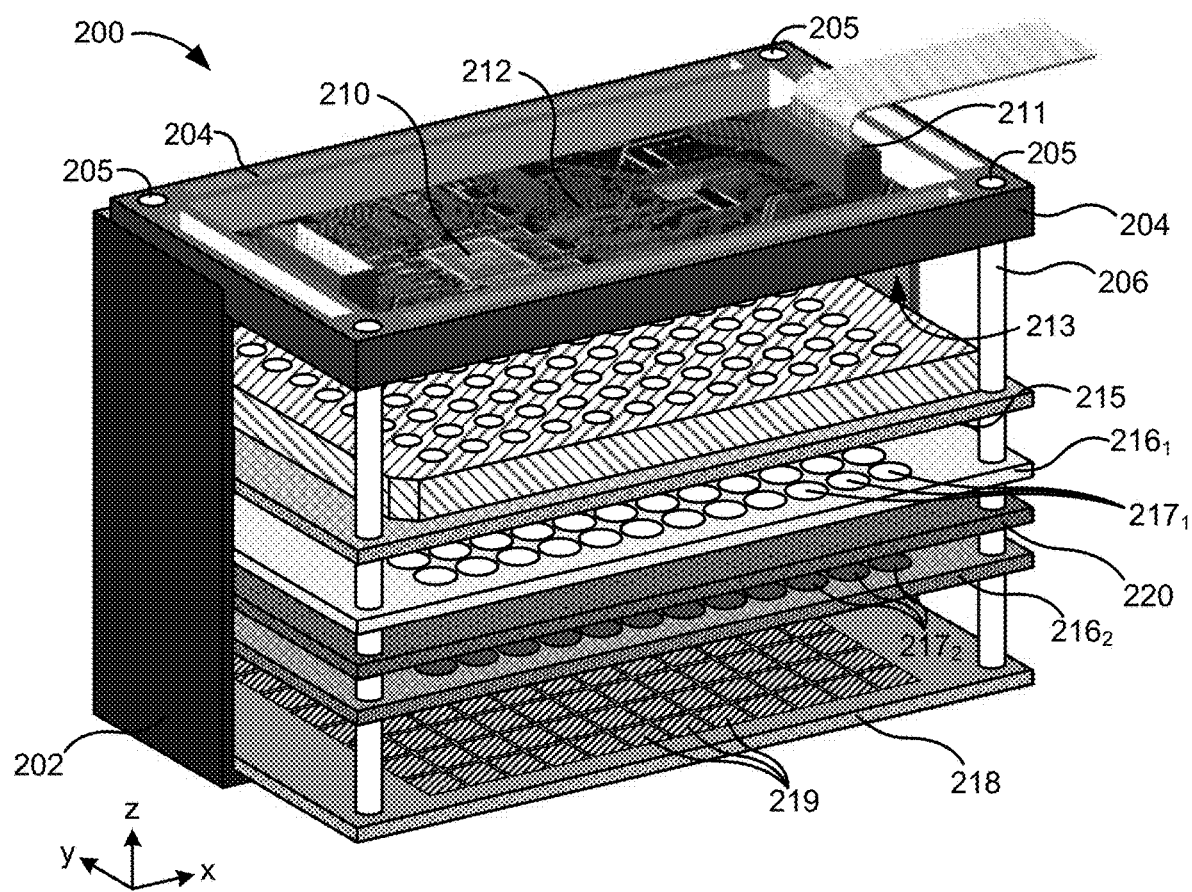
FIG. 2B shows a cross-sectional perspective view of the imaging system of FIG. 2A.

FIG. 2A shows a schematic diagram of an example imaging system 200 capable of FP imaging according to some implementations. FIG. 2B shows a cross-sectional perspective view of the imaging system 200 of FIG. 2A. The imaging system 200 of FIG. 2A is an example of a physical implementation of the imaging system 100 of FIG. 1. The imaging system 200 generally includes a housing or enclosure 202. In some implementations, the enclosure 202 is formed of a metal, metallic alloy or plastic material. In some implementations, the enclosure 202 is formed of an optically opaque material and/or painted or otherwise coated in an optically opaque layer to prevent (or "block" or "shield") ambient or other externally-generated light from illuminating the samples or the image sensors. This light shielding can be especially important in fluorescence imaging where the intensity of the emitted light is relatively much lower than that of the excitation light and decays rapidly.

In some implementations, the enclosure 202 surrounds a frame structure 204. In the illustrated implementation, the frame structure 204 provides a rigid frame from which the various components of the imaging system 200 can be supported. In some implementations, the frame structure 204 is formed of a metal, metallic alloy or plastic material. In some implementations, the frame structure 204 also is formed of an optically opaque material and/or painted or otherwise coated in an optically opaque layer. In some implementations, the enclosure 202 and the frame structure 204 are integrally formed together. In some other implementations, the enclosure 202 and the frame structure 204 are assembled together by screws, bolts, rivets, glue or other devices or materials so as to be rigidly fixed together. In the illustrated implementation, the frame structure 204 includes alignment through-holes 205 through which frame alignment rods 206 are passed and positioned. In some implementations, the frame alignment rods 206 also are formed of a metal, metallic alloy or plastic material.

In some implementations, each of the illumination system, the sample loading system, the optical system and the image sensor system are physically supported by one or more of the enclosure 202, the frame structure 204 and the frame alignment rods 206 so as to be rigidly fixed in relative position and at particular distances from one another. In some implementations, each of the illumination system, the sample loading system, the optical system and the image sensor system includes one or more substrates having corresponding through-holes. For example, the illumination system can include a circuit board or other dielectric substrate 212. The array of light sources 213 (hidden from view in FIG. 2A or 2B but indicated by an arrow as being under the circuit board 212) can be electrically and physically coupled onto or into the circuit board 212. Conductive leads of the light sources 213 can be electrically coupled with the controller 210 via conductive traces printed or otherwise deposited on a first or upper surface of the circuit board 212 while the light-emitting portions of the light sources 213 can be oriented so as to radiate light away from a second or lower surface of the circuit board 212 toward the lenses of the optical system. In the illustrated implementation, a controller 210 (for example, implementing controller 110 of FIG. 1) is mounted on the same circuit board 212 as the light sources 213. In some other implementations, the controller 210 can be mounted onto a separate circuit board that is electrically coupled with the circuit board 212 and thereby to the illumination system.

As described above, the optical system can include one or more lens arrays, for example, 1, 2, 3, 4 or more lens arrays depending on the particular application. In the illustrated implementation, the optical system includes two lens arrays $216_1$ or $216_2$ each of which includes a respective substrate into which are formed, assembled or positioned an array of lenses $217_1$ or $217_2$, respectively. The image sensor system can include a circuit board or other dielectric substrate 218. An array of image sensors 219 can be electrically and physically coupled onto or into the circuit board 218. The active light-sensitive regions of the image sensors 219 can be oriented away from a first or upper surface of the circuit board 218 toward the lenses of the optical system while the conductive leads of the image sensors 219 can be electrically coupled with the controller 210 via conductive traces printed or otherwise deposited on a second or lower surface of the circuit board 218 to a communication interface (for example, a USB interface) that is then connected with the controller 210 via a cable.

In such an arrangement, each of the frame alignment rods 206 can pass through corresponding through-holes in each of the substrates 212, 216 and 218 during assembly to align the light sources and respective ones of the lenses and images sensors along a vertical direction (for example, a z direction along a height of the imaging system 200). More specifically, the frame alignment rods 206 can ensure that each image sensor 219 is aligned with a corresponding lens in each of one or more stacked lens arrays, and that each of the lenses in each lens array are aligned with one another and with a set of one or more light sources 213. The enclosure 202 and/or frame structure 204 also can include guides, ribs, shelves or other supported mechanisms extending along inner surfaces of the enclosure or frame structure, respectively, to physically support the respective substrates 212, 216 and 218 at the proper distances from one another along the vertical z direction. Such an arrangement ensures that the light sources 213, lenses 217 and image sensors 219 are suitably positioned relative to one another to properly focus light scattered or emitted by the samples in the wells 209 onto the image sensors and, as described below, such that the angles of incidence of the light generated by the light sources can be precisely determined or otherwise known.

As described above, the sample loading system is generally configured to receive a sample array such as a conventional or commercially-available multi-well plate 208 including a rectangular array of wells 209 arranged in a plurality of rows and a plurality of columns. In the illustrated implementation, a sample array 208 can be loaded through an aperture slot 214 in the housing enclosure 202 and onto a sample platform 215 in the sample loading system. The sample platform 215 also can include through-holes into which the frame alignment rods 206 can pass to ensure that the sample platform 215 is aligned with the image sensor system, the optical system and the illumination system. Additionally, the sample platform 215 can include raised guides or ridges or other alignment mechanisms to ensure that a loaded multi-well plate 208 is properly oriented such the centers of each of the wells 209 are approximately aligned with the centers of the corresponding lenses 217 in the lens arrays 216 and with the centers of the image sensors 219. In some implementations, the sample loading system further includes a door that is coupled with the enclosure 202 or with the frame structure 204 via a sliding mechanism or a hinge mechanism enabling the door to be opened and closed with ease to insert and remove multi-well plates 208. In some implementations, the sample loading system can include a mechanical, electrical or electromechanical loading and ejecting mechanism that automatically pulls the multi-well plate 208 into the imaging system for imaging and that automatically ejects the multi-well plate when after the imaging has been performed. Such an automatic mechanism can be triggered electronically by a user via an input device (such as a keyboard or mouse), triggered by a button or touchscreen interface on the enclosure, or automatically by the controller 210 when it detects that a plate is being loaded or when it determines that an imaging operation is complete.

Figure 3A:
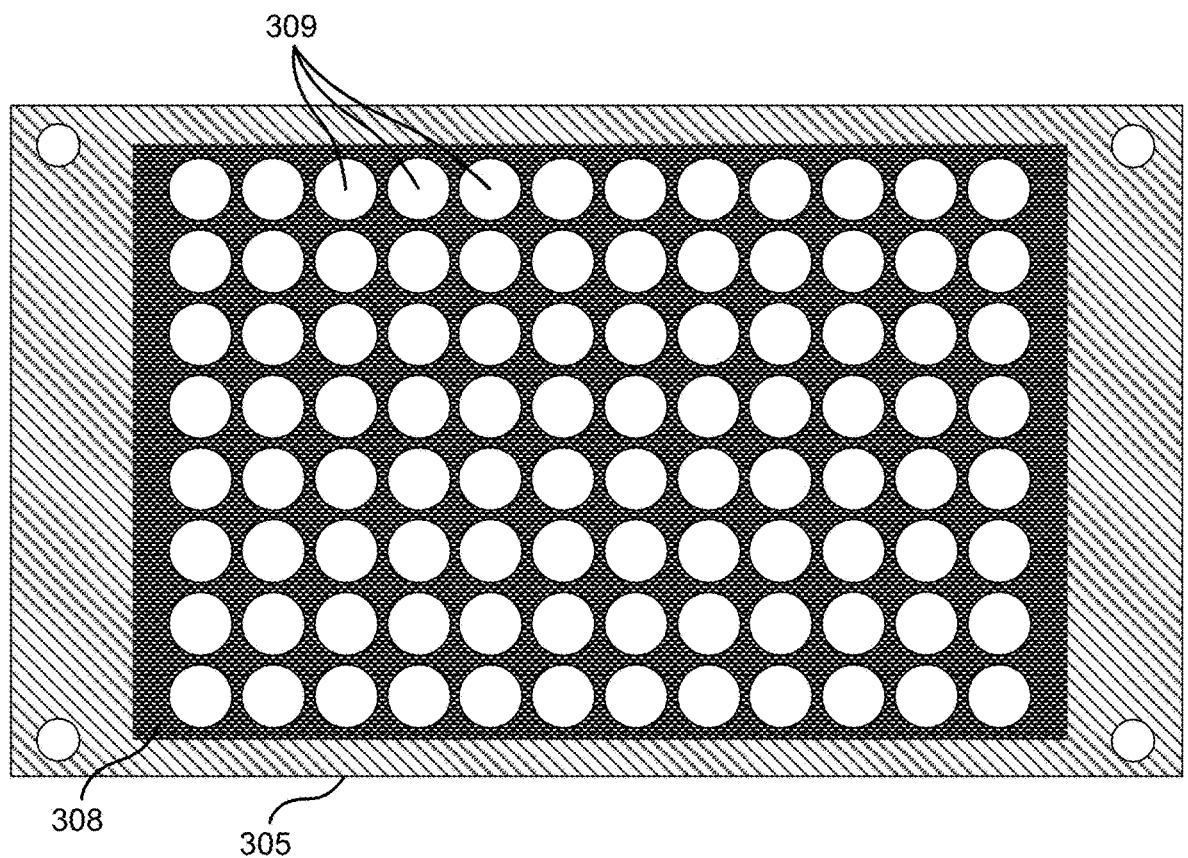
FIG. 3A shows a top view of an example sample platform having a multi-well plate positioned thereon according to some implementations.

FIG. 3A shows a top view of an example sample platform 305 having a multi-well plate 308 positioned thereon according to some implementations. The multi-well plate 308 includes a number T of sample wells arranged in a plurality of R rows and C columns. Examples of commercially-available multi-well plates include the Costar® well plates manufactured by Corning®, the CELLSTAR® 96W Microplate manufactured by Greiner, and the CytoOne® well plates. In the illustrated example, the multi-well plate includes 96 wells arranged in eight rows and twelve columns. In such an example, each of the wells can have a diameter of approximately 6 millimeters (mm). In some other implementations, the imaging system 200 can be configured to image other multi-well plate formats such as, for example, plates consisting of 6 wells, 12 wells, 96 wells, 384 wells, 1536 wells, 3456 wells or 9600 wells. In some examples, each well has a volume in the range of approximately 1 nanoliter (nL) to approximately 100 milliliters (mL), and in some more specific 96-well examples, a total volume in the range of approximately 350 microliter ($\mu$L) to approximately 400 $\mu$L, and a typical working volume in the range of approximately 25 $\mu$L to approximately 340 $\mu$L. Although each well is typically of a cylindrical shape having a circular cross-section with an open top end and a closed bottom end, other shapes can be used, for example, square or other rectangular cross-sections are available. Each well is further defined by a bottom surface on which a sample may be deposited. In some examples, the multi-well plate is formed from a plastic material, such as a thermoplastic material such as polystyrene. In some examples, the multi-well plate 308 is formed from a glass material. In some examples, portions of the multi-well plate excluding the bottom surfaces of the wells 309 can further include carbon. For example, for fluorescent biologic assays it is generally desirable that the sides of the wells 309 are black to absorb/block external/ambient light while the bottoms of wells should be clear/transparent to light in the visual wavelengths and fluorescence wavelengths of interest. The sample platform 305 can either be transparent or include a cutout portion below the multi-well plate to enable light to pass from the samples to the lenses of the optical system.

Figure 3B:
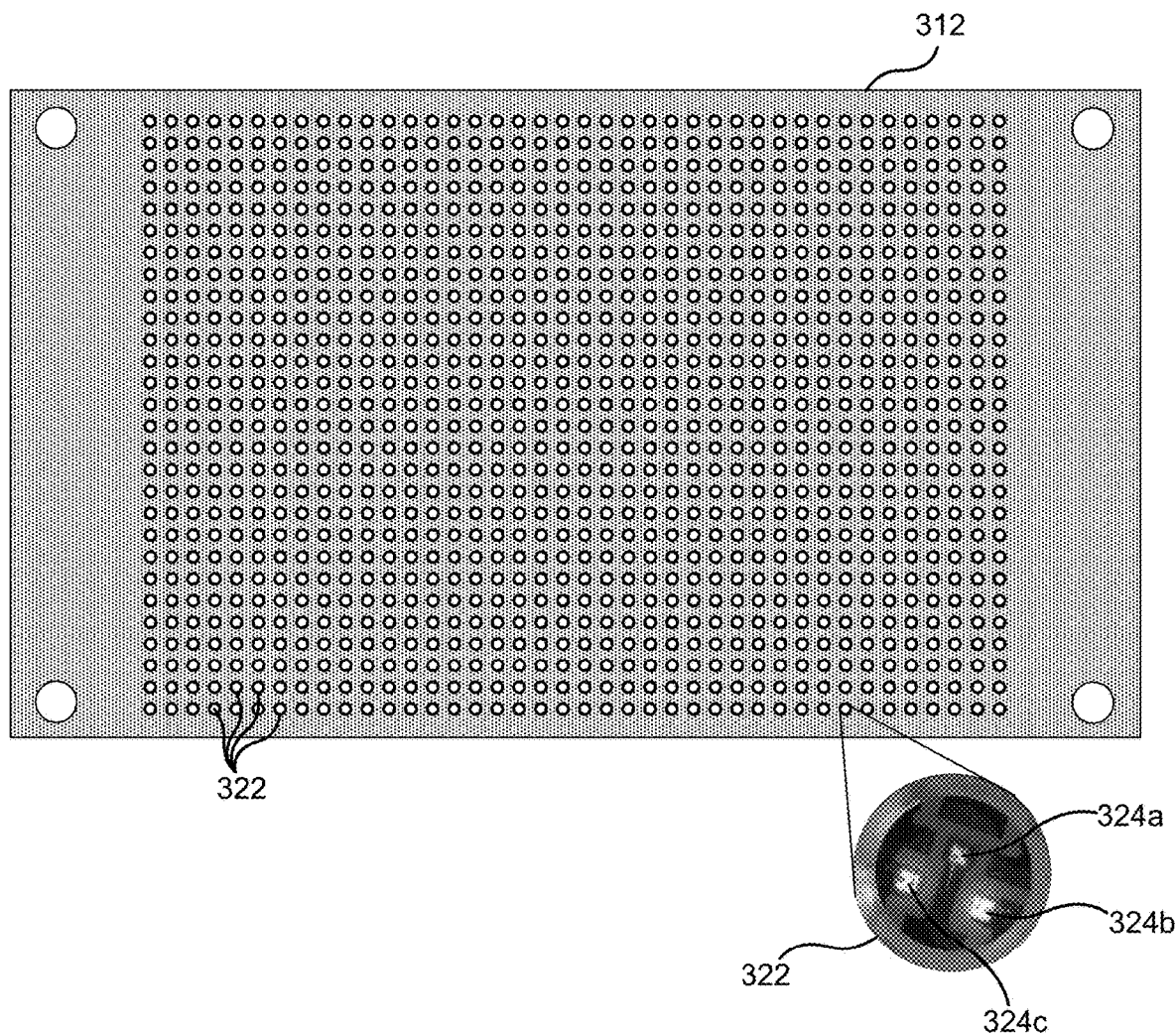
FIG. 3B shows a bottom view of an example illumination system according to some implementations.

FIG. 3B shows a bottom view of an example illumination system according to some implementations. As described above, the illumination system generally includes a printed circuit board or other dielectric substrate 312 onto or into which array of light sources 322 can be electrically and physically coupled. As described above, the light-emitting portions of the light sources 322 are oriented so as to radiate light toward the lenses of the optical system (and consequently also the samples in the wells of the well plate). As an example, the array of light sources 322 can be implemented with an LED matrix. Each light source 322 can include one or more LEDs. For example, in some implementations, each light source 322 includes a set of three or more LEDs including a red LED, a green LED and a blue LED. In some other implementations, such as that illustrated in FIG. 3B, each light source 322 includes a single LED, and more specifically, a single RGB (Red, Blue, Green) LED including a red sub-LED 324a, a green sub-LED 324b and a blue sub-LED 324c. In other words, each RGB LED actually has 3 semiconductor light sources; one red, one blue and one green. Whether implemented as a set of three distinct red, green and blue LEDs or as a single RGB LED, each light source 322 can be capable of producing any visible color of light by varying the intensities of the red, green and blue light (for example, in response to particular voltage signals provided by the controller). Additionally or alternatively, each light source 322 also can include an LED for generating light in non-visible parts of the spectrum, such as infrared light or ultraviolet light.

In some implementations, each light source 322 occupies a footprint of less than 1 mm by 1 mm. In implementations configured to image 96-well plates, the center to center distance (or "pitch") between each well can by 9 mm while the center to center distance between each light source 322 can be 3 mm. This means that there will be room for three light sources between the centers of adjacent neighboring wells. This arrangement and ratio of LEDs to wells ensures that multiple light sources 322 can illuminate the samples— each at a different angle of incidence. In some example implementations, the number L of distinct light sources 322 that are desired to ensure a sufficient number n of different angles of incidence are obtained for each well can be found according to equation 1 below.

$$L = \left[(m*R) + 2\left(\frac{(\sqrt{n}-1)}{2} - \frac{m-1}{2}\right)\right] * \left[(m*C) + 2\left(\frac{(\sqrt{n}-1)}{2} - \frac{m-1}{2}\right)\right]$$ (Equation 1)

where n is the desired number of angles of incidence and m is a number representative of a scaling factor indicative of a ratio of the density of light sources to the density of wells.

In the illustrated 96-well implementation, where the number of rows R of wells is 8 and the number C of columns of wells is 12, and taking n to be 49 and m to be 3, the number L of light sources 322 is 1120 (for example, 1120 RGB LEDs arranged in 28 rows and 40 columns). In some implementation, the illumination system can further include side-mounted light sources (for example, high power LEDs, not shown) for use in increasing the intensities of the excitation signals for fluorescence imaging to, in turn, increase the intensities of the emission signals emitted by the fluorophores within the samples.

Figure 3C:
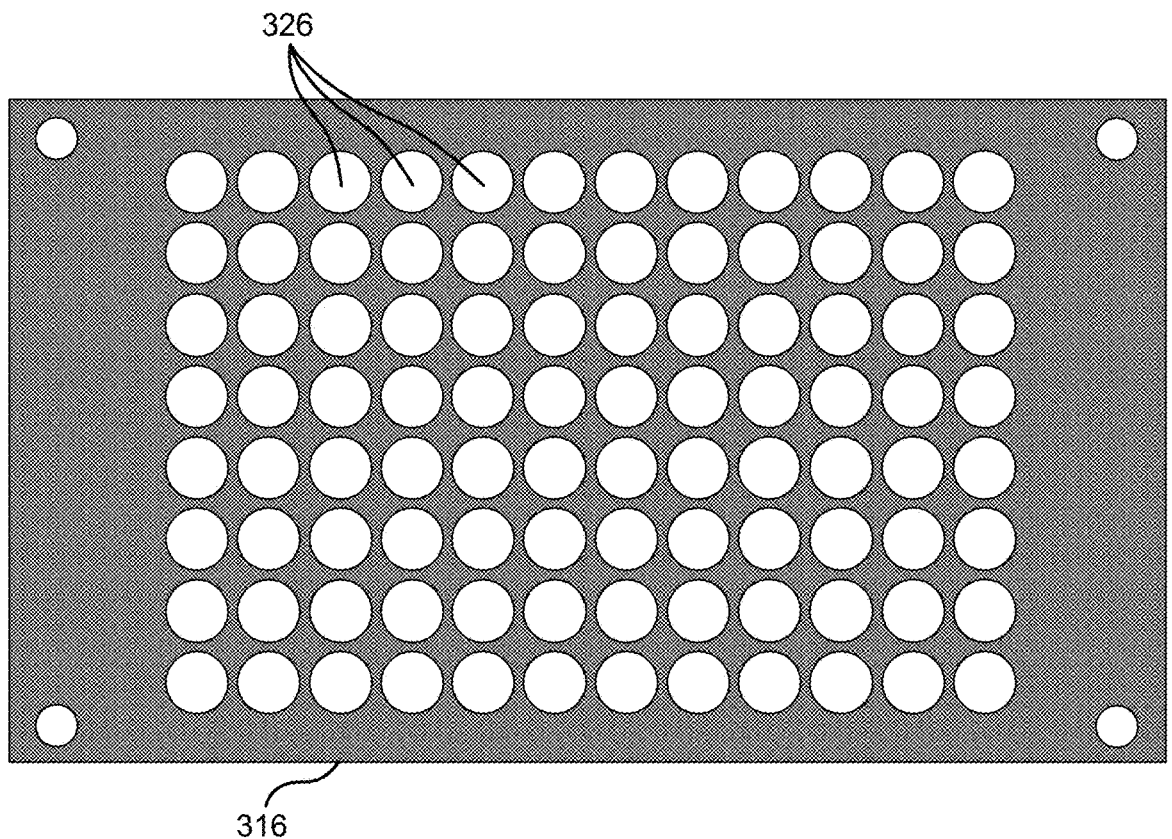
FIG. 3C shows a top view of an example lens array according to some implementations.

FIG. 3C shows a top view of an example lens array 316 according to some implementations. Like the lens arrays of FIG. 2B, the lens array of FIG. 3C includes a substrate including an array of lenses 326. As described above, the optical system includes at least one lens array 316, and in various implementations, at least two (for example, 2, 3, 4 or more) lens arrays in a vertically-aligned (or "stacked") arrangement. As described above, in multi-lens-array implementations, each of the lenses 326 in each lens array 316 is in vertical alignment with a corresponding one of the lenses 326 in each of the other lens arrays 316. The number of lens arrays 316 and the types of the lenses 326 in each of the lens arrays can be optimized for particular applications. Generally, each of the lenses 326 within a given lens array 316 will be identical to all the other lenses within the array, and different than all of the other lenses in the other lens arrays. In some implementations or applications, the combined set of lens aligned and otherwise associated with each well can have a numerical aperture (NA) in the range of approximately 0.05 to approximately 0.6.

FIG. 4A shows a diagram of a portion of an example optical arrangement 400 including three lenses according to some implementations. Generally, the arrangement 400 represents the lenses as aligned and positioned for one well of a multi-well plate. Thus, each of the wells of the multi-well plate would include an identical arrangement 400, with each of the elements of each arrangement being provided at the array level with like elements. In the illustrated representation, the top line 402 of the arrangement 400 represents the location of the sample within the well (on or above the inner bottom surface of the well) while element 404 represents the bottom of the well (between the inner bottom surface of the well and the exterior bottom surface of the well plate). Element 406a represents a first lens element of a first lens array, element 406b represents a second lens element of a second lens array, and element 406c represents a third lens element of a third lens array. The set of lens 406a, 406b and 406c are configured to focus light onto an active surface of a corresponding image sensor 408. The lines passing through the various lenses and other elements in FIG. 4A represent light rays originating from different regions of the sample. In the illustrated implementation, the optical arrangement 400 further includes a portion of an optical filter 410, for example, for use in fluorescence imaging applications to filter light at excitation signal wavelengths. As described above, the optical filter can in various implementation generally be positioned anywhere between the multi-well plate and the imaging system, including between various ones of the lens arrays.

FIG. 4B shows an enlarged view of a diagram of a portion of an example optical arrangement 401 including four lenses according to some implementations. The arrangement 410 is similar to the arrangement 400 shown in FIG. 4A, for example, having a top line 412 representing the location of the sample and an element 414 representing the bottom of the well. However, in the implementation of FIG. 4B, the optical arrangement 410 includes four lenses: element 416a representing a first lens element of a first lens array, element 416b representing a second lens element of a second lens array, element 416c representing a third lens element of a third lens array and element 416d representing a fourth lens element of a fourth lens array. The set of lens 416a, 416b, 416c and 416d are configured to focus light onto an active surface of a corresponding image sensor (not shown). In the illustrated implementation, the optical arrangement 401 also includes a portion of an optical filter 420, for example, for use in fluorescence imaging applications to filter light at excitation signal wavelengths.

Again, the number and types of the lens arrays and corresponding lenses can generally be dependent on the application. As an example, in an implementation in which the imaging system can be used in Green Fluorescent Protein (GFP) imaging, an optical arrangement such as that shown in FIG. 4B is well-suited, for example, providing better results than a three-lens-array arrangement such as that shown in FIG. 4A. Generally, the lens characteristics of each lens may be particularly designed for different wavelengths.

Referring back to FIG. 3C, in some implementations, each lens array 316 is formed of one integral piece of material. For example, the lens array 316 can be formed through an injection molding or three-dimensional (3D) printing process. Traditionally, such lenses would not have sufficiently low geometric aberrations to enable high resolution imaging of a relatively wide field of view at the scale need to image a large number of wells simultaneously in parallel. However, the use of multiple lens arrays, and thus multiple lenses for each well, can at least partially negate the effects of geometrical aberrations. Generally, the more lenses that are used for each well, the more geometrical aberrations in those lenses can be canceled out. Additionally, FP techniques as described herein can be used to further correct for any aberrations or to remove other image artifacts enabling the restoration of a high resolution image.

In implementations designed for fluorescence imaging applications, the optical system also includes an optical filter 220 located between the bottom surface of the multi-well plate 208 and the image sensor system. The optical filter 220 blocks excitation light from the illumination system (as well as any other light not emitted by the fluorophores in the samples within the multi-well plate) from striking the image sensors 219 of the image sensor system. Continuing the example above, for GFP imaging, the optical filter should be a green filter, that is, a filter passing wavelengths of light in a green portion of the visible spectrum. The excitation signal light should be higher energy light, and in particular applications, blue light. This is because the green fluorescent proteins absorb light in the blue portion of the spectrum and emit light in the green portion of the spectrum. The green filter then enables the emitted light to pass through to the image sensors while blocking the excitation light. In some implementations, the excitation light also can be turned off immediately before acquiring the image data.

In some implementations or applications, the range of wavelengths of the bright field illumination for the FP imaging fall within the passband of the optical filter 220 so that the optical filter passes light from the light sources 322 that passes through the samples in the wells. In such instances, the image sensors can acquire a sequence of uniquely illuminated bright field images while leaving the filter 220 in place. Continuing with the example above, bright field FP imaging of the GFP samples can be performed with green light. In some other instances, the range of wavelengths of the bright field illumination from the light sources 322 do not fall within the passband of the optical filter 220. In other words, in instances in which it is necessary or desirable to keep the optical filter within the imaging system during the FP imaging, the bright field FP imaging should be performed using light of the same or similar color as the filter used in the fluorescent imaging, else the filter should be removed during the FP image acquisition phase. In some implementations, the optical filter can be readily removable and/or replaceable with one or more different optical filters capable of filtering and passing different wavelengths of light. For example, the optical filter 220 can be inserted into another aperture slot in the enclosure 202. In such implementations, the bright field FPM imaging can be performed with light of a different color or with white light.

In some implementations, the optical filter is fabricated from a glass or plastic material and is in the shape of a rectangular solid having a width (along the x axis) and a length (along a y axis) sufficiently large to provide filtering for all of the light scattered or emitted by the samples and incident on the lenses of the optical system. In single-channel fluorescence imaging applications, a single band or low pass filter can be used; for multi-channel fluorescence imaging applications, a multi band filter can be used. As described above, because the optical filter 220 does not affect the path of the light, the optical filter 220 can be positioned anywhere between the bottom surface of the multi-well plate 208 and the image sensors 209 of the image sensor system.

Figure 3D:
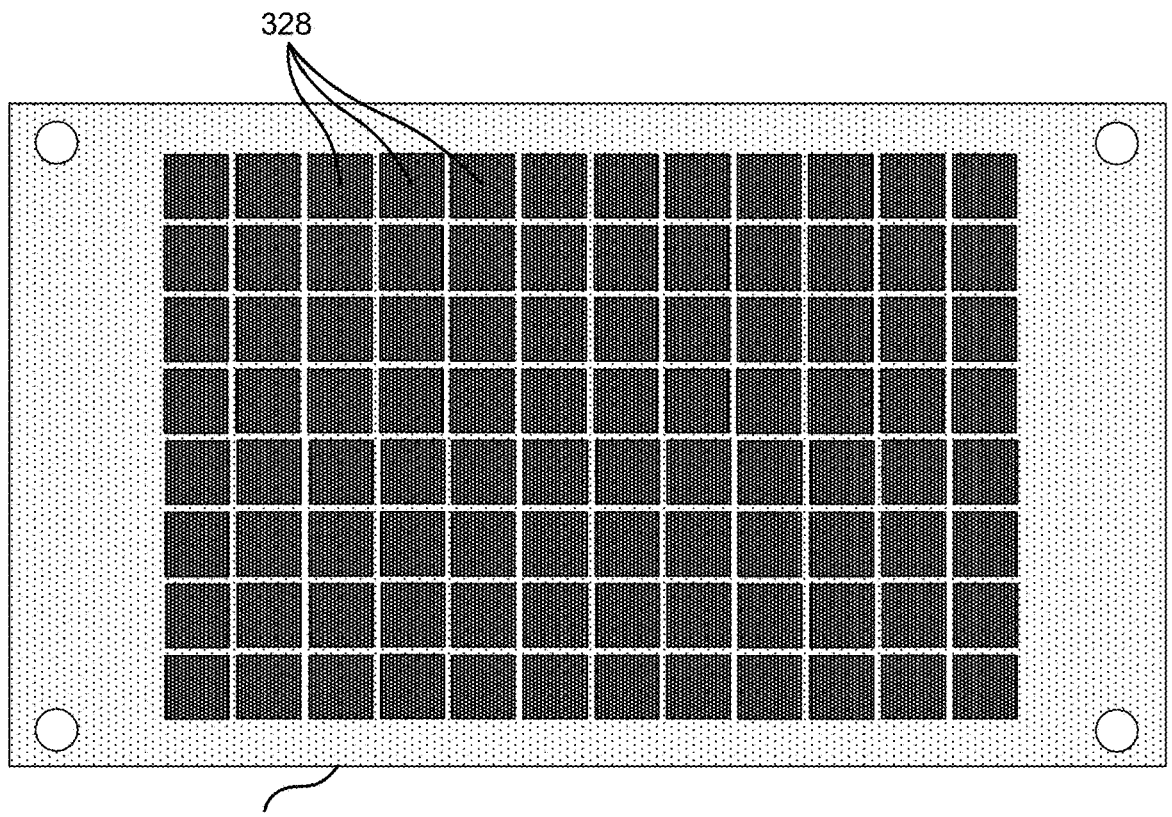
FIG. 3D shows a top view of an example image sensor system according to some implementations.

FIG. 3D shows a top view of an example image sensor system according to some implementations. Like the image sensor system of FIG. 2B, the image sensor system of FIG. 3D includes a circuit board or other dielectric substrate 318 onto which an array of T image sensors 328 arranged in R rows and C columns can be electrically and physically coupled. In some implementations, each of the image sensors 328 has a field of view (FOV) of the respective sample well in the range of 0.5 mm to 6 mm in diameter, and in one specification example implementation, an FOV of 1 mm diameter. In some implementations, each of the image sensors 328 also is capable of capturing raw images at a spatial resolution of 0.5 µm to 5 µm (prior to subsequent FP processing). As described above, the active light-sensitive regions of the image sensors 328 can be oriented away from a first or upper surface of the circuit board 318 toward the lenses of the optical system while the conductive leads of the image sensors 328 can be electrically coupled with the controller 210 via conductive traces printed or otherwise deposited on a second or lower surface of the circuit board 318 and via a communication interface (for example, a Universal Serial Bus (USB) interface) that is connected with the controller 210. In some implementations, each of the image sensors is an active-pixel sensor (APS) device such as CMOS-based APS cameras.

In some implementations, the raw image data captured by each of the image sensors is transferred to the controller 210 through a high speed data transfer channel (for example, at a data rate greater than 5 Gb/s). In some implementations, the image sensor system further includes a liquid cooling system that circulates cooling liquid around the surfaces surrounding the image sensors.

A) Fourier Ptychographic Imaging Methods

As described above, the imaging systems 100 and 200 are capable of FP image acquisition of each and all of the sample wells of an entire multi-well plate in parallel. In particular implementations, the imaging systems 100 and 200 also are capable of fluorescence image acquisition of each and all of the sample wells of an entire multi-well plate in parallel. An image acquisition (sample) time refers to a time during the exposure duration of each of the image sensors during which each of the image sensors measures a light intensity distribution to capture an intensity image for a respective well of the multi-well plate. The FP imaging process typically comprises a raw image acquisition (data collection) phase and an FP restoration phase. During the FP image acquisition phase, the controller causes the illumination system to turn on particular subsets or patterns of the light sources. For example, the FP image acquisition phase can include a plurality of imaging operations (sometimes referred to herein as "scans"). Each of the imaging operations includes a respective image acquisition by each of the image sensors in the image sensor system. Each of the imaging operations is associated with a different pattern of illumination of the light sources. Throughout the course of the entire FP image acquisition phase, each of the image sensors in the array of image sensors acquires s intensity bright field images (corresponding to s imaging operations) while the light sources of the illumination system provide plane wave illumination of each of the wells from n different (unique) respective illumination angles of incidence. During each imaging operation, each image sensor acquires an image based on a particular illumination pattern of the light sources. Generally, the number s of imaging operations can be equal to the number n of unique illumination incident angles desired for each well. In this way, assuming a fixed value of n, the number of imaging operations is independent of the number T of wells in the multi-well plate.

Figure 5:
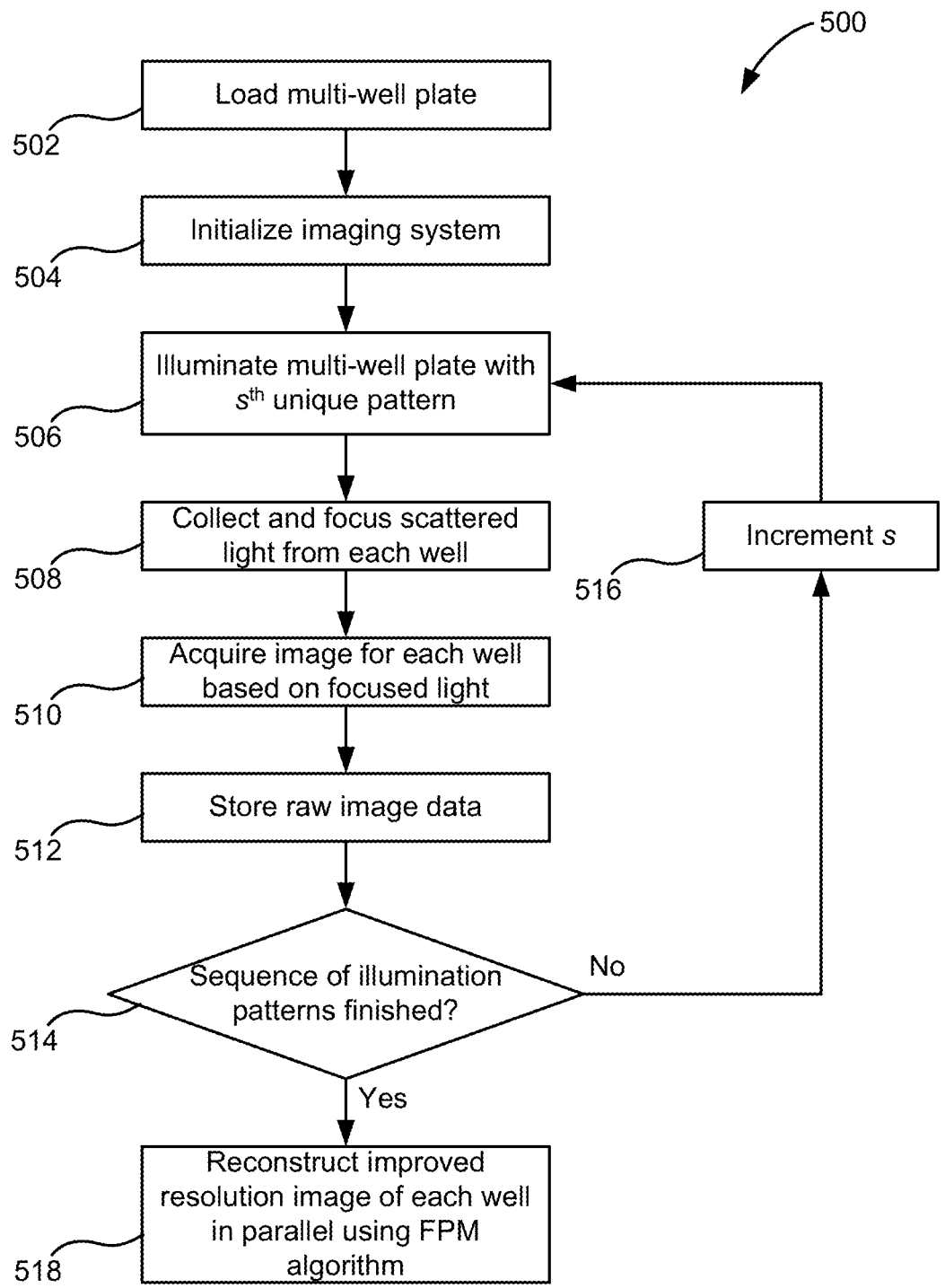
FIG. 5 shows a flowchart illustrating an example Fourier ptychographic imaging process for imaging a multi-well plate according to some implementations.

FIG. 5 shows a flowchart illustrating an example FP imaging process 500 for imaging a multi-well plate according to some implementations. For example, the process 500 can be performed using the systems, devices and arrangements described above with respect to FIGS. 1-4. In some implementations, the controller 110 is configured perform one or more operations of the FP imaging process 500. In some implementations, the FP process 500 begins in operation 502 with loading a multi-well plate into the imaging system. In operation 504, the controller initializes the illumination system and the image sensor system. Initializing the illumination system in operation 504 can include retrieving illumination pattern information from a non-volatile memory and loading the retrieved illumination pattern information into a volatile memory for subsequent use in performing a series of sequential imaging operations. Initializing the image sensor system in operation 504 can include powering on or otherwise preparing the image sensors to receive light and to generate image data. In some implementations, initializing the illumination system and the image sensor system in operation 504 also can include a calibration operation to determine the actual values of the angles of incidence that will illuminate each of the wells.

After initialization, the controller performs an $s^{th}$ imaging operation (where s is an integer between 1 and n, inclusive, and where n is the number of angles of incidence). As described above, during each imaging operations, the controller causes the illumination system to produce a unique pattern of illumination and causes the image sensor system to capture/acquire an image for each of the wells. In some implementations, each imaging operation can be performed or conceptualized as a sequence of sub-operations. For example, each imaging operation can include a sequence of sub-operations 506, 508, 510 (and in some cases 512). In block 506, the controller causes the illumination system to illuminate the multi-well plate with an $s^{th}$ unique illumination pattern.

Figure 6A:
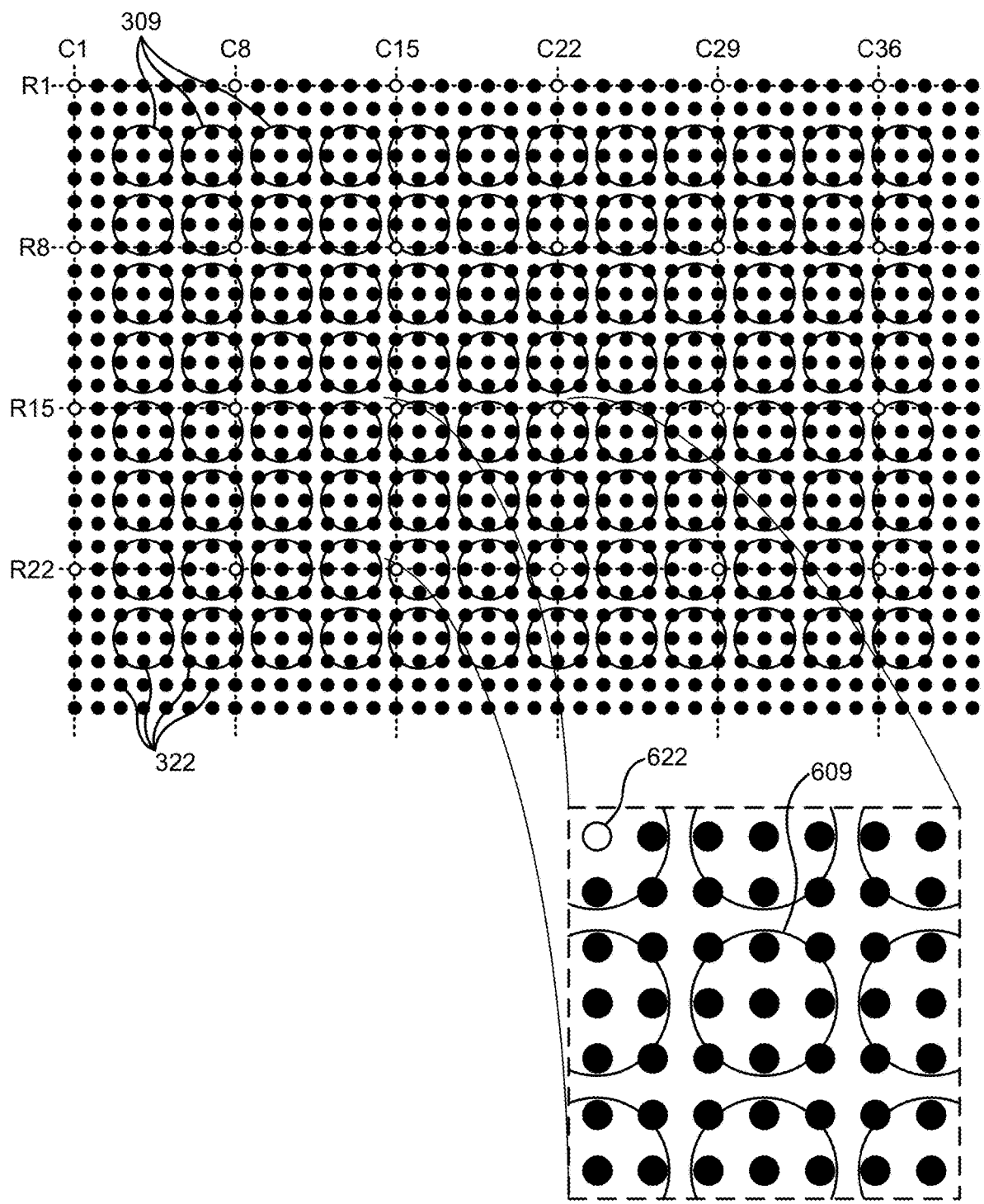
FIG. 6A shows a diagram of an example arrangement of light sources and wells illuminated according to a first illumination pattern during a first scan according to some implementations.

FIG. 6A shows a diagram of an example arrangement of light sources 322 and wells 309 illuminated according to a first illumination pattern during a first imaging operation according to some implementations. In the illustrated implementation, the first illumination pattern is configured or otherwise suited for a 96-well plate. As shown, while each well 309 can be illuminated by multiple respective ones of the light sources 322, in the illustrated implementation, only the light sources 322 positioned at the intersections of the $1^{st}$, $8^{th}$, $15^{th}$ and $22^{nd}$ rows and the $1^{st}$, $8^{th}$, $15^{th}$, $22^{nd}$, $29^{th}$ and $36^{th}$ columns are illuminated in the first illumination pattern during the first imaging operation. As such only 24 of the light sources 322 are turned on during the first imaging operation in the illustrated 96-well implementation (these light sources are shown as white circles while the light sources that are not on are shown as all black). As a consequence, in the illustrated implementation, only one of the light sources that can illuminate a particular well actually illuminates the well in each imaging operation. For example, FIG. 6A also shows an enlarged close-up view of a portion of the arrangement showing only those light sources 322 (49 in the illustrated implementation) that can illuminate a given well 609. As shown, only one of the possible light sources 622 actually illuminates the well during each imaging operation. In some implementations, the illumination pattern changes sequentially in a raster-like pattern as the imaging operations continue throughout the series of image acquisitions during the image acquisition phase.

Figure 6B:
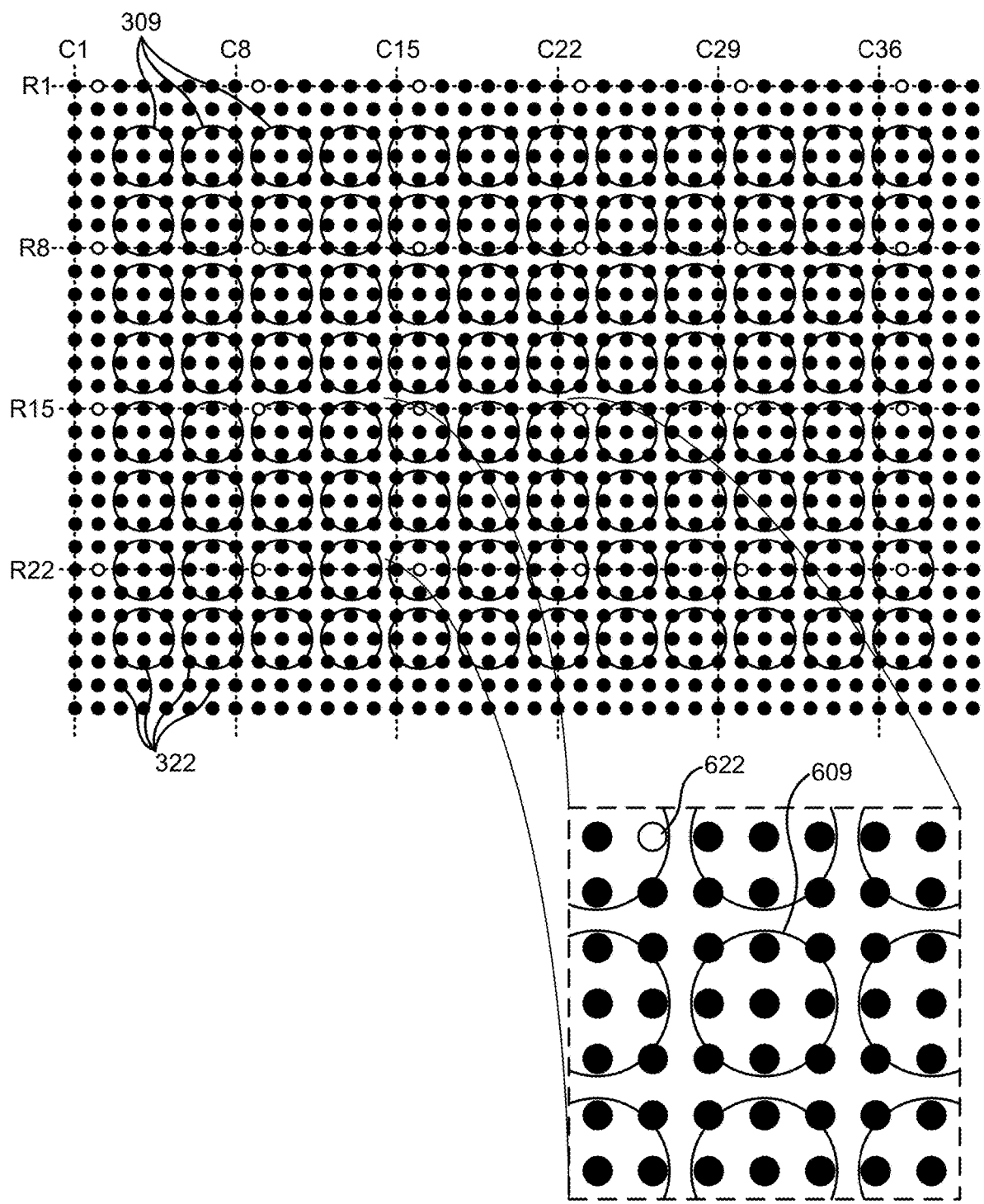
FIG. 6B shows the arrangement of FIG. 6A illuminated according to a $2^{nd}$ illumination pattern during a $2^{nd}$ scan.
Figure 6C:
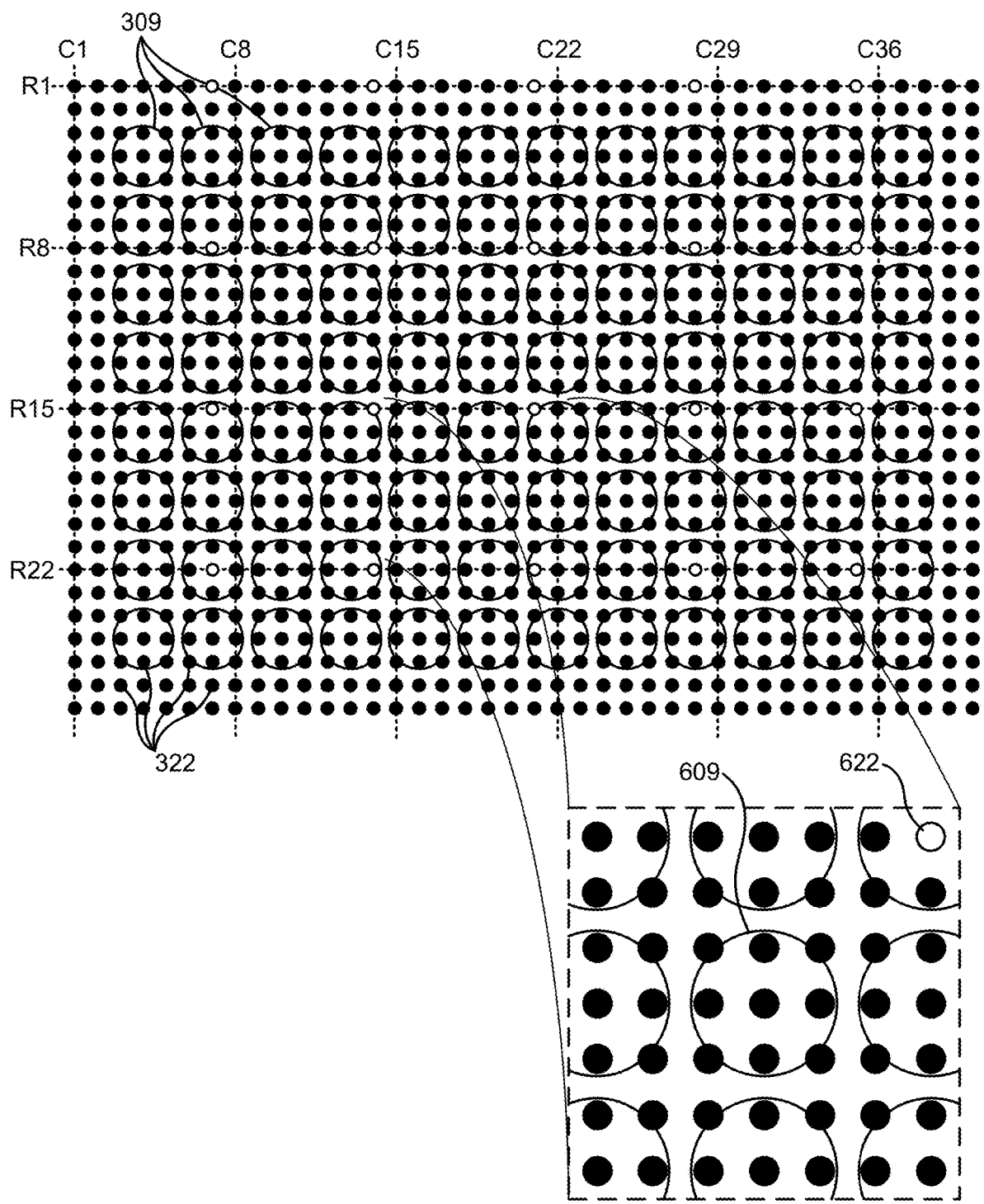
FIG. 6C shows the arrangement of FIG. 6A illuminated according to a $7^{th}$ illumination pattern during a $7^{th}$ scan.
Figure 6D:
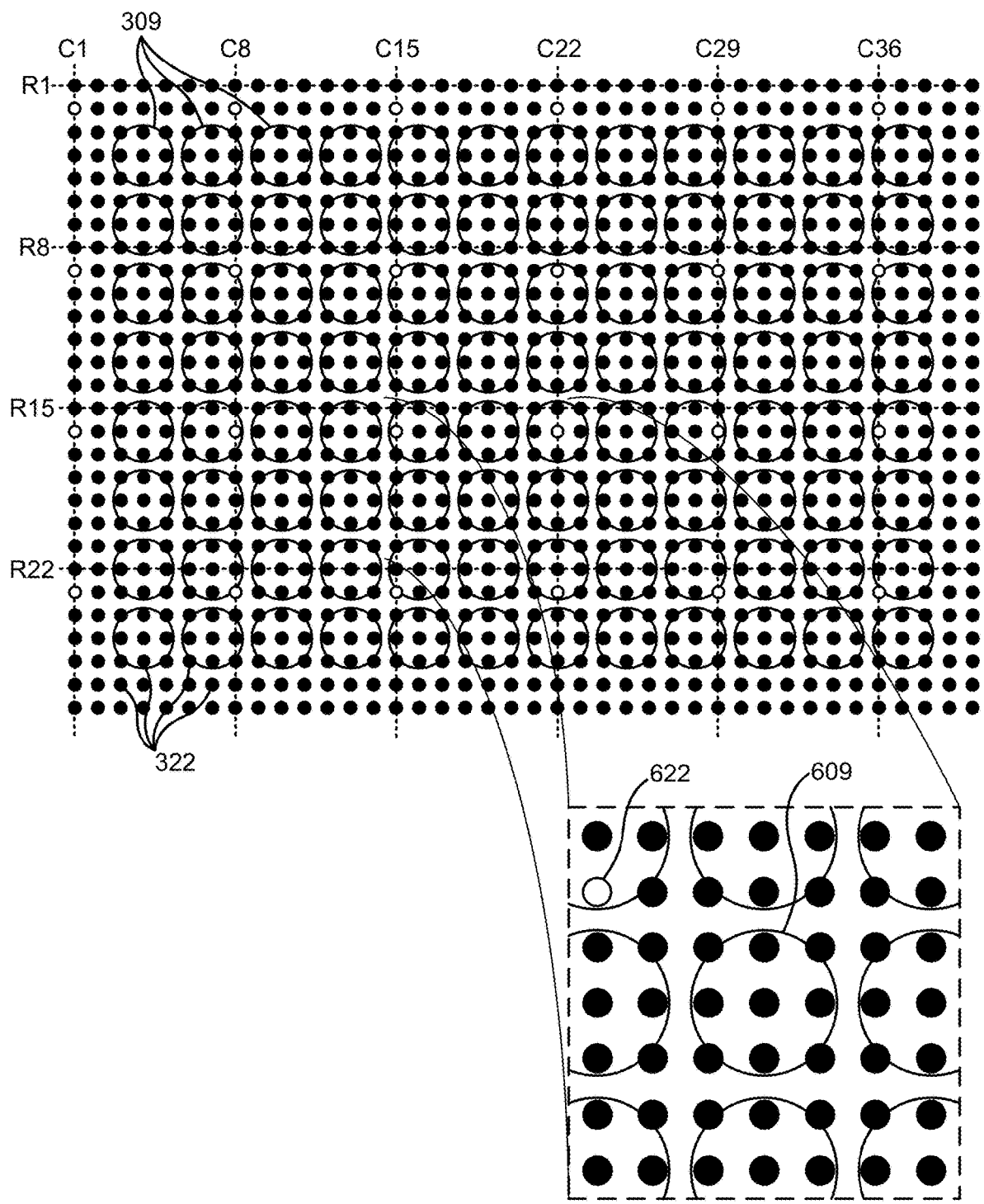
FIG. 6D shows the arrangement of FIG. 6A illuminated according to an $8^{th}$ illumination pattern during a $8^{th}$ scan.
Figure 6E:
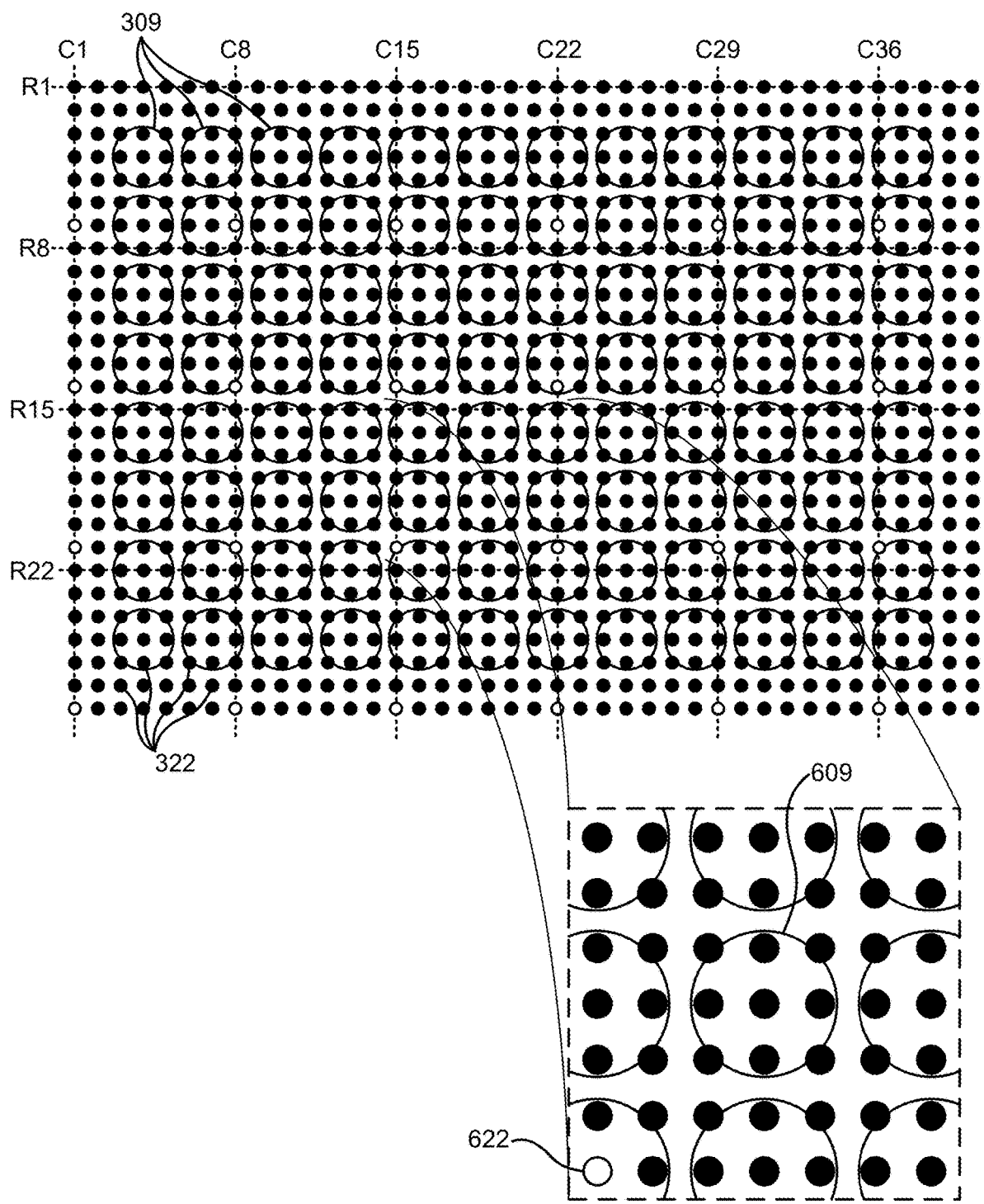
FIG. 6E shows the arrangement of FIG. 6A illuminated according to a $42^{nd}$ illumination pattern during a $42^{nd}$ scan.
Figure 6F:
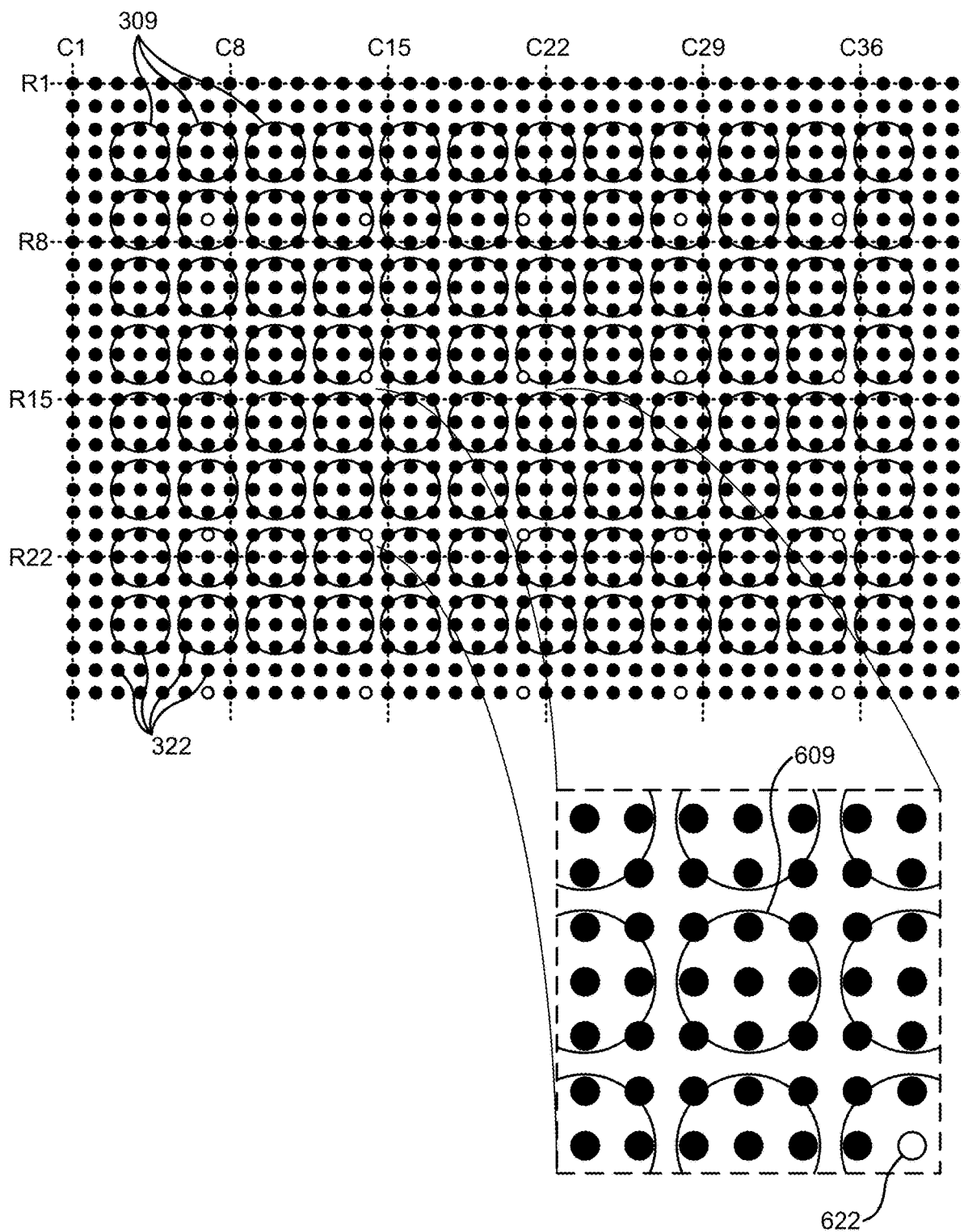
FIG. 6F shows the arrangement of FIG. 6A illuminated according to a $49^{th}$ illumination pattern during a $49^{th}$ scan.

For example, FIG. 6B shows the arrangement of FIG. 6A illuminated according to a second illumination pattern during a second imaging operation. In the second illumination pattern, only the light sources 322 positioned at the intersections of the $1^{st}$, $8^{th}$, $15^{th}$ and $22^{nd}$ rows and the $2^{nd}$, $9^{th}$, $16^{th}$, $23^{rd}$ and $30^{th}$ columns are illuminated. In such an implementation, the illumination pattern shifts by one column to the right during each successive imaging operation until the $7^{th}$ column is illuminated, at which point the illumination pattern shifts down to the next row and back to the first column for the next imaging operation. The process then repeats until the $7^{th}$ column of the $7^{th}$ row is reached in the $n^{th}$ ($49^{th}$) imaging operation. By way of illustration, FIG. 6C shows the arrangement of FIG. 6A illuminated according to a $7^{th}$ illumination pattern during a $7^{th}$ imaging operation. In the $7^{th}$ illumination pattern, only the light sources 322 positioned at the intersections of the $1^{st}$, $8^{th}$, $15^{th}$ and $22^{nd}$ rows and the $7^{th}$, $14^{th}$, $21^{st}$, $28^{th}$ and $35^{th}$ columns are illuminated. FIG. 6D shows the arrangement of FIG. 6A illuminated according to an $8^{th}$ illumination pattern during an $8^{th}$ imaging operation. In the $8^{th}$ illumination pattern, only the light sources 322 positioned at the intersections of the $2^{nd}$, $9^{th}$, $16^{th}$ and $23^{rd}$ rows and the $1^{st}$, $8^{th}$, $15^{th}$, $22^{nd}$, $29^{th}$ and $36^{th}$ columns are illuminated. FIG. 6E shows the arrangement of FIG. 6A illuminated according to a $42^{nd}$ illumination pattern during a $42^{nd}$ imaging operation. In the $42^{nd}$ illumination pattern, only the light sources 322 positioned at the intersections of the $7^{th}$, $14^{th}$ and $21^{st}$ rows and the $1^{st}$, $8^{th}$, $15^{th}$, $22^{nd}$, $29^{th}$ and $36^{th}$ columns are illuminated. Finally, FIG. 6F shows the arrangement of FIG. 6A illuminated according to a $49^{th}$ illumination pattern during a $49^{th}$ imaging operation. In the $49^{th}$ illumination pattern, only the light sources 322 positioned at the intersections of the $7^{th}$, $14^{th}$ and $21^{st}$ rows and the $7^{th}$, $14^{th}$, $21^{st}$, $28^{th}$ and $35^{th}$ columns are illuminated.

The lenses of the optical system receive (or "collect") light scattered by or otherwise issuing from the respective samples during each imaging operation and focus the received light onto the image sensors of the image sensor system. Although the reception and focusing of the light during each imaging operation is generally performed by passive elements (the lenses of the optical system), this portion of the path of the light is still referred to as operation 508. In operation 510, each of the image sensors receives light focused by a corresponding lens (or set of lenses) of the optical system acquires image data based on the focused light. In operation 512, the image data may be stored in one or both of a volatile memory quickly accessible by a processor of the controller or a non-volatile memory for longer term storage. As described above, the image data represents an intensity distribution obtained during an exposure time of the imaging operation (the image data acquired by a particular image sensor during a particular imaging operation is referred to as an "image frame" or simply an "image"). In some implementations, each of the imaging operations takes less than approximately 1 ms, enabling all n imaging operations for an entire multi-well plate to be completed in less than 1 second.

In some implementations, a multiplexing approach can be used to further decrease the total imaging operation time—the time required to obtain image data for n incidence angles. In one multiplexing embodiment, multiple light sources around each well can be turned on at the same time in a unique pattern during the capture of each raw image of each well. Using a multiplexing process, intensity data associated with each illumination angle can be separated from the raw image captured. In this way, fewer than n imaging operations are required for each of the wells. An example of a multiplexing process can be found in U.S. patent application Ser. No. 14/960,252 titled "MULTIPLEXED FOURIER PTYCHOGRAPHY IMAGING SYSTEMS AND METHODS" filed on Dec. 4, 2015, which is hereby incorporated by reference in its entirety.

In operation 514, a processor (for example, of the controller) determines whether all n of the imaging operations have been completed. If there are remaining imaging operations to be completed, s is incrementally updated in operation 516 so that the next imaging operation (the $(s+1)^{th}$) imaging operation is then performed using the next (the $(s+1)^{th}$) illumination pattern. When all of the imaging operations are complete, a processor (for example, of the controller) performs a parallel recovery process to construct (or "generate") an improved (higher) resolution image of each sample in parallel in operation 518. During the FP restoration phase, the n intensity images for each sample well are iteratively combined in the Fourier domain to generate higher-resolution image data. At each iteration, a filter is applied in the Fourier domain for a particular plane wave incidence angle, an inverse Fourier transform is applied to generate a lower resolution image, the intensity of the lower resolution image is replaced with an intensity measurement, a Fourier transform is applied, and the corresponding region in Fourier space is updated. Generally, the recovery process includes a phase retrieval technique that uses angular diversity to recover complex sample images. The recovery process alternates enforcement of known image data acquired in the spatial domain and a fixed constraint in the Fourier domain. This phase retrieval recovery can be implemented using, for example, an alternating projections procedure, a convex reformulation of the problem, or any non-convex variant in-between. Instead of needing to translate a sample laterally by mechanical means, the recovery process varies the spectrum constraint in the Fourier domain to expand the Fourier passband beyond that of a single captured image to recover a higher-resolution sample image.

Figure 7:
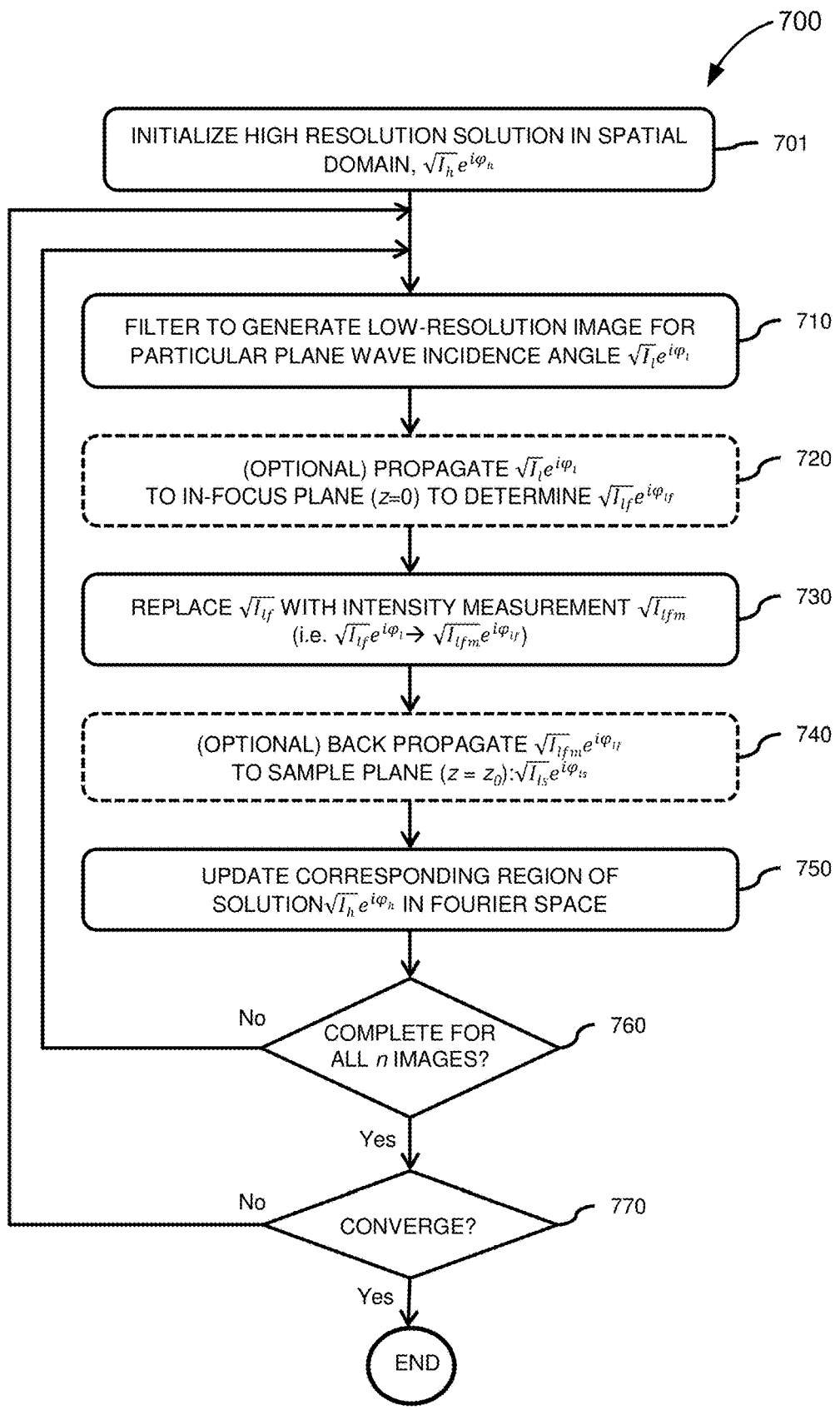
FIG. 7 shows a flowchart of an example Fourier ptychographic recovery process according to some implementations.

Two examples of FP restoration processes are discussed in detail with respect to FIGS. 7 and 8 below. In some implementations, the controller then causes a display to display the restored images for each of the wells. FIG. 7 shows a flowchart of an example FP recovery process 700 according to some implementations. In some implementations, the controller 110 is configured perform one or more operations of the FP recovery process 700. Using this FP restoration process, an improved resolution image of each of the samples in each of the sample wells is restored from n low-resolution intensity distribution measurements obtained for each sample, $I_{lm}$ ($k_x^i$, $k_y^i$) (indexed by their illumination wavevector, $k_x^i$, $k_y^i$, with i=1, 2 . . . n), such as the n raw intensity images acquired during operations 506, 508 and 510 of the process 500 illustrated in and described with reference to FIG. 5.

In some implementations, the FP recovery process 700 begins in operation 701 with initializing a high-resolution image solution $\sqrt{I_h}e^{i\varphi_h}$ in the spatial domain. A Fourier transform is applied to obtain an initialized Fourier transformed image $\tilde{I}_h$. In some implementations, the initial high-resolution solution is determined based on the assumption that the sample is located at an out-of-focus plane $z=z_0$. In some other implementations, the initial solution is determined using a random complex matrix (for both intensity and phase). In some implementations, the initial solution is determined using an interpolation of the low-resolution intensity measurement with a random phase. In some implementations, an example of an initial solution uses $\varphi=0$ and uses $I_h$ interpolated from any low-resolution image of the sample area. In some implementations, an example of an initial solution uses a constant value. Regardless, the Fourier transform of the initial solution can be a broad spectrum in the Fourier domain.

In the iterative operations 710, 720, 730, 740, 750, 760 and 770 described below, the high-resolution image of each sample is restored by iteratively combining low-resolution intensity measurements in Fourier space. In some implementations, operations 720 and 740 may be performed if the sample is out-of-focus by the amount of $z_0$.

At 710, the processor performs low-pass filtering of the high-resolution image $\sqrt{I_h}e^{i\varphi_h}$ in the Fourier domain to generate a low-resolution image $\sqrt{I_l}e^{i\varphi_l}$ for a particular plane wave incidence angle ($\theta_x^i$, $\theta_y^i$) with a wave vector ($k_x^i$, $k_y^i$). The Fourier transform of the high-resolution image is $\tilde{I}_h$ and the Fourier transform of the low-resolution image for a particular plane wave incidence angle is $\tilde{I}_l$. In the Fourier domain, the recovery process (also called the "reconstruction process") filters a low-pass region from the spectrum $\tilde{I}_h$ of the high-resolution image $\sqrt{I_h}e^{i\varphi_h}$. The low-pass region is a circular aperture with a radius of NA*$k_0$, where $k_0$ equals $2\pi/\lambda$ (the wave number in vacuum), given by the coherent transfer function of the first objective lens of the IRI system. In Fourier space, the location of the region corresponds to the illumination angle during the current iteration. For an oblique plane wave incidence with a wave vector ($k_x^i$, $k_y^i$), the region is centered about a position ($-k_x^i$, $-k_y^i$) in the Fourier domain of $\sqrt{I_h}e^{i\varphi_h}$.

At optional operation 720, using the processor, the low-resolution image, $\sqrt{I_l}e^{i\varphi_l}$ is propagated in the Fourier domain to the in-focus plane at z=0 to determine the low-resolution image at the focused position: $\sqrt{I_{lf}}e^{i\varphi_{lf}}$. In one embodiment, operation 720 is performed by Fourier transforming the low-resolution image $\sqrt{I_l}e^{i\varphi_l}$, multiplying by a phase factor in the Fourier domain, and inverse Fourier transforming to obtain $\sqrt{I_{lf}}e^{i\varphi_{lf}}$. In another embodiment, operation 720 is performed by the mathematically equivalent operation of convolving the low-resolution image $\sqrt{I_l}e^{i\varphi_l}$ with the point-spread-function for the defocus. In another embodiment, operation 720 is performed as an optional sub-operation of operation 710 by multiplying $\tilde{I}_l$ by a phase factor in the Fourier domain before performing the inverse Fourier transform to produce $\sqrt{I_{lf}}e^{i\varphi_{lf}}$. Optional operation 720 generally need not be included if the sample is located at the in-focus plane (z=0).

At operation 730, using the processor, the computed amplitude component $\sqrt{I_{lf}}$ of the low-resolution image at the in-focus plane, $\sqrt{I_{lf}}e^{i\varphi_{lf}}$, is replaced with the square root of the low-resolution intensity measurement $\sqrt{I_{lfm}}$ measured by the light detector of the IRI system. This forms an updated low resolution target: $\sqrt{I_{lfm}}e^{i\varphi_{lf}}$.

At optional operation 740, using the processor, the updated low-resolution image $\sqrt{I_{lfm}}e^{i\varphi_{lf}}$ may be back-propagated to the sample plane ($z=z_0$) to determine $\sqrt{I_{ls}}e^{i\varphi_{ls}}$. Optional operation 740 need not be included if the sample is located at the in-focus plane, that is, where $z_0=0$. In one embodiment, operation 740 is performed by taking the Fourier transform of the updated low-resolution image $\sqrt{I_{lfm}}e^{i\varphi_{lf}}$ and multiplying in the Fourier space by a phase factor, and then inverse Fourier transforming it. In another embodiment, operation 740 is performed by convolving the updated low-resolution image $\sqrt{I_{lfm}}e^{i\varphi_{lf}}$ with the point-spread-function of the defocus. In another embodiment, operation 740 is performed as a sub-operation of operation 750 by multiplying by a phase factor after performing the Fourier transform onto the updated target image.

At operation 750, using the processor, a Fourier transform is applied to the updated target image propagated to the sample plane: $\sqrt{I_{ls}}e^{i\varphi_{ls}}$, and this data is updated in the corresponding region of high-resolution solution $\sqrt{I_h}e^{i\varphi_h}$ in the Fourier space corresponding to the corresponding to the incidence wave vector ($k_x^i$, $k_y^i$). At operation 760, the processor determines whether operations 710 through 760 have been completed for all n uniquely illuminated low resolution intensity images. If operations 710 through 760 have not been completed for all the images, operations 710 through 760 are repeated for the next image.

At operation 770, the processor determines whether the high-resolution solution has converged. In one example, the processor determines whether the high-resolution solution converged to a self-consistent solution. In one case, the processor compares the previous high-resolution solution of the previous iteration or initial guess to the present high-resolution solution, and if the difference is less than a certain value, the solution is determined to have converged to a self-consistent solution. If the processor determines that the solution has not converged at operation 770, then operations 710 through 760 are repeated. In one embodiment, operations 710 through 760 are repeated once. In other embodiments, operations 710 through 760 are repeated twice or more. If the solution has converged, the processor transforms the converged solution in Fourier space to the spatial domain to recover the improved resolution image $\sqrt{I_h}e^{i\varphi_h}$ and the FP recovery process ends.

Figure 8:
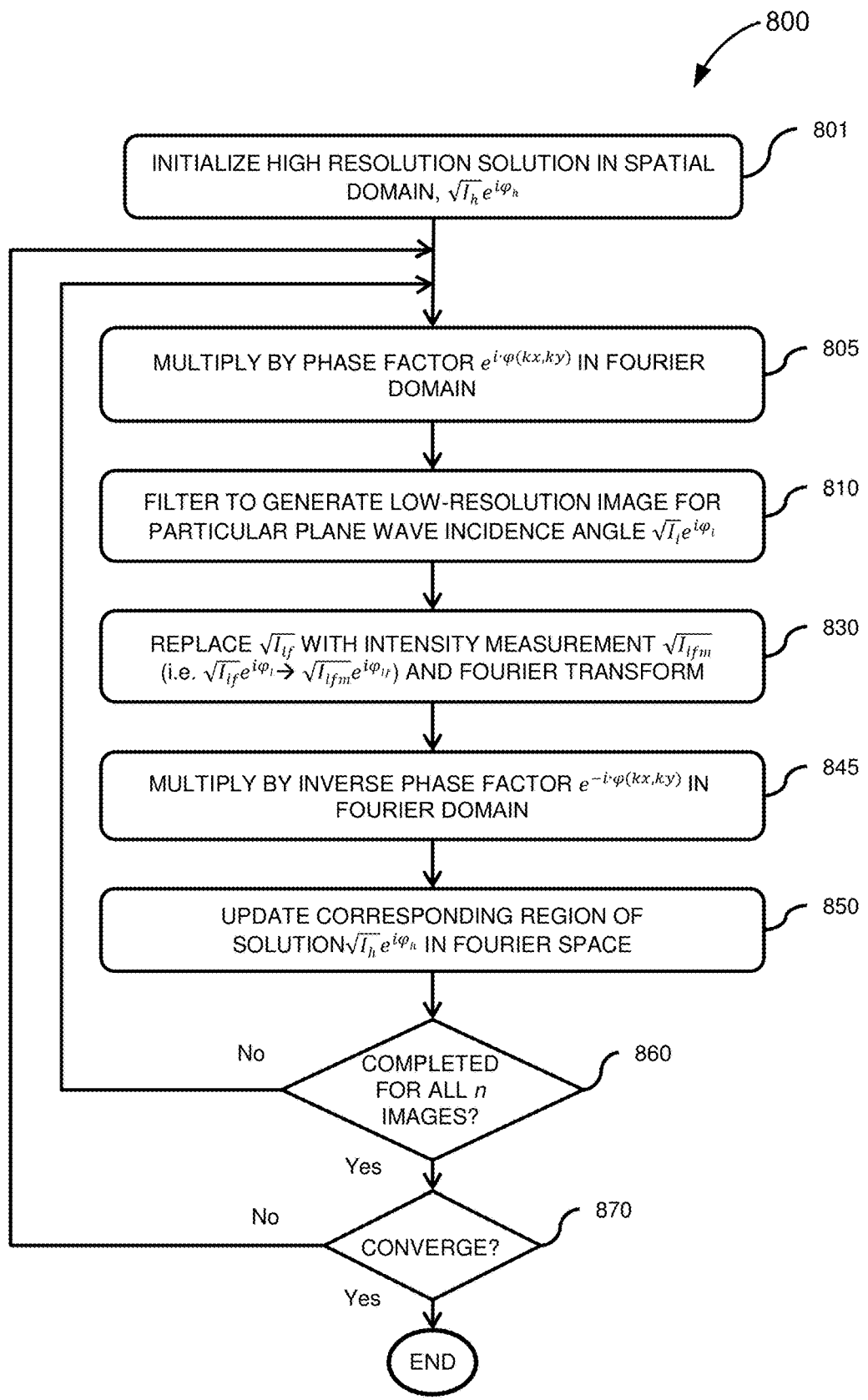
FIG. 8 shows a flowchart of another example Fourier ptychographic recovery process according to some implementations.

FIG. 8 shows a flowchart of another example FP recovery process 800 (also referred to as an "algorithm") according to some implementations. In some implementations, the controller 110 is configured perform one or more operations of the FP recovery process 800. Using this FP restoration process, an improved resolution image of each of the samples in each of the sample wells is restored from n low-resolution intensity distribution measurements obtained for each sample, $I_{lm}$ ($k_x^i$, $k_y^i$) (indexed by their illumination wavevector, $k_x^i$, $k_y^i$, with i=1, 2 ... n), such as the n raw intensity images acquired during operations 506, 508 and 510 of the process 500 illustrated in and described with reference to FIG. 5.

In this example, the FP recovery process includes digital wavefront correction. The FP recovery process incorporates digital wavefront compensation in the two multiplication operations 805 and 845. Specifically, operation 805 models the connection between the actual sample profile and the captured intensity data (with includes aberrations) through multiplication with a pupil function: $e^{i\cdot\varphi(k_x, k_y)}$ by the processor. Operation 845 inverts such a connection to achieve an aberration-free restored image. Sample defocus is essentially equivalent to introducing a defocus phase factor to the pupil plane (i.e., a defocus aberration):

$$e^{i\cdot\varphi(k_x,k_y)} = e^{i\sqrt{(2\pi/\lambda)^2 - k_x^2 - k_y^2} \cdot z_0}, k_x^2 + k_y^2 < (NA\cdot 2\pi/\lambda)^2 \quad \text{(Equation 2)}$$

where $k_x$ and $k_y$ are the wavenumbers at the pupil plane, $z_0$ is the defocus distance, and NA is the numerical aperture of the first objective.

In some implementations, the FP recovery process 800 begins in operation 801 with initializing a high-resolution image solution $\sqrt{I_h}e^{i\varphi_h}$ in the spatial domain. A Fourier transform is applied to obtain an initialized Fourier transformed image $\tilde{I}_h$. In some implementations, the initial high-resolution solution is determined based on the assumption that the sample is located at an out-of-focus plane z=$z_0$. In some other implementations, the initial solution is determined using a random complex matrix (for both intensity and phase). In some implementations, the initial solution is determined using an interpolation of the low-resolution intensity measurement with a random phase. In some implementations, an example of an initial solution uses $\varphi$=0 and uses $I_h$ interpolated from any low-resolution image of the sample area. In some implementations, an example of an initial solution uses a constant value. Regardless, the Fourier transform of the initial solution can be a broad spectrum in the Fourier domain.

In the iterative operations of 805, 810, 830, 845, 850, 860, and 870, the high-resolution image of the sample is computationally restored by iteratively combining low-resolution intensity measurements in Fourier space.

In operation 805, the processor multiplies by a phase factor $e^{i\cdot\varphi(k_x,k_y)}$ in Fourier domain. In operation 810, the processor performs low-pass filtering of the high-resolution image $\sqrt{I_h}e^{i\varphi_h}$ in the Fourier domain to generate a low-resolution image $\sqrt{I_l}e^{i\varphi_l}$ for a particular plane wave incidence angle ($\theta_x^i$, $\theta_y^i$) with a wave vector ($k_x^i$, $k_y^i$). The Fourier transform of the high-resolution image is $\tilde{I}_h$ and the Fourier transform of the low-resolution image for a particular plane wave incidence angle is $\tilde{I}_l$. In the Fourier domain, the process filters a low-pass region from the spectrum $\tilde{I}_h$ of the high-resolution image $\sqrt{I_h}e^{i\varphi_h}$. This region is a circular aperture with a radius of NA*$k_0$, where $k_0$ equals $2\pi/\lambda$ (the wave number in vacuum), given by the coherent transfer function of the first objective lens. In Fourier space, the location of the region corresponds to the incidence angle. For an oblique plane wave incidence with a wave vector ($k_x^i$, $k_y^i$), the region is centered about a position ($-k_x^i$, $-k_y^i$) in the Fourier domain of $\sqrt{I_h}e^{i\varphi_h}$.

In operation 830, using the processor, the computed amplitude component $\sqrt{I_{lf}}$ of the low-resolution image at the in-focus plane, $\sqrt{I_{lf}}e^{i\varphi_{lf}}$, is replaced with the square root of the low-resolution intensity measurement $\sqrt{I_{lfm}}$ measured by the light detector of the IRI system. This forms an updated low resolution target: $\sqrt{I_{lfm}}e^{i\varphi_{lf}}$. In operation 845, the processor multiplies by an inverse phase factor $e^{-i\cdot\varphi(k_x,k_y)}$ in Fourier domain. At operation 850, a Fourier transform is applied to the updated target image propagated to the sample plane: $\sqrt{I_{ls}}e^{i\varphi_{ls}}$, and this data is updated in the corresponding region of high-resolution solution $\sqrt{I_h}e^{i\varphi_h}$ in the Fourier space corresponding to the corresponding to the incidence wave vector ($k_x^i$, $k_y^i$) In operation 860, the processor determines whether operations 805 through 850 have been completed for all n uniquely illuminated low resolution intensity images. If operations 805 through 850 have not been completed for all for all n uniquely illuminated low resolution intensity images, operations 805 through 850 are repeated for the next image.

In operation 870, the processor determines whether the high-resolution solution has converged. In one example, the processor determines whether the high-resolution solution has converged to a self-consistent solution. In one case, the processor compares the previous high-resolution solution of the previous iteration or initial guess to the present high-resolution solution, and if the difference is less than a certain value, the solution has converged to a self-consistent solution. If processor determines that the solution has not converged, then operations 805 through 870 are repeated. In one embodiment, operations 805 through 870 are repeated once. In other embodiments, operations 805 through 870 are repeated twice or more. If the solution has converged, the processor transforms the converged solution in Fourier space to the spatial domain to recover the high-resolution image $\sqrt{I_h}e^{i\varphi_h}$ and the FP recovery process ends.

Additional details of example FP restoration processes can be found in Zheng, Guoan, Horstmeyer, Roarke, and Yang, Changhuei, "Wide-field, high-resolution Fourier ptychographic microscopy," Nature Photonics vol. 7, pp. 739-745 (2013) and in U.S. patent application Ser. No. 14/065,280, titled "Fourier Ptychographic Imaging Systems, Devices, and Methods" and filed on Oct. 28, 2013, both of which are hereby incorporated by reference herein in their entireties and for all purposes.

Additional details of example FP restoration processes can be found in Zheng, Guoan, Horstmeyer, Roarke, and Yang, Changhuei, "Wide-field, high-resolution Fourier ptychographic microscopy," Nature Photonics vol. 7, pp. 739-745 (2013) and in U.S. patent application Ser. No. 14/065,280, titled "Fourier Ptychographic Imaging Systems, Devices, and Methods" and filed on Oct. 28, 2013, both of which are hereby incorporated by reference herein in their entireties and for all purposes.

Another example of an array-level Fourier ptychographic imager is described in U.S. patent application Ser. No. 115/007,159, titled "MULTI-WELL FOURIER PTYCHOGRAPHIC AND FLUORESCENCE IMAGING" and filed on Jul. 28, 2016, which is hereby incorporated by reference in its entirety.

II. Parallel Imaging Acquisition and Restoration Systems and Methods

Digital imaging systems with multiple image sensors, such as the array-level Fourier ptychographic imagers discussed in Section I above, acquire and process raw image data on a massive scale. The massive scale of the image data can create technical challenges in processing times and memory allocation. In particular, the data access pattern of image acquisition and image restoration is very different. While a whole area of image is acquired for each image sensor (also referred to herein as a "camera") during one acquisition operation, restoration is most efficient in a segment of the area for all acquisition operations. Trying to meet both targets at once will either result in excessive memory usage (which can overload the system resources), or cause long latency due to excessive read/write operations on the hard drive. These issues tend to escalate as the number of cameras increases.

Certain parallel imaging acquisition and restoration techniques described herein may address these and other technical challenges brought forward by this massive scale of image data coming from a plurality of image sensors by employing: (i) parallel image acquisition, and/or (ii) parallel, cascading image restoration techniques, which can boosts the incoming image data throughput from multiple image sensors. The parallel image acquisition involves parallel and asynchronous control of multiple hardware components, e.g., illumination system and image sensors, using a multi-processor architecture of a controller. The parallel image acquisition includes an in-memory data storage strategy that sorts, segments, and indexes the incoming image frames from multiple images sensors. In some cases, these operations are implemented "on the fly" and an in-memory parallel file system is created in internal memory that houses a four-dimensional hypercube that is pre-segmented into chunks. The parallel image acquisition also includes a data serialization strategy that arranges the segmented image data in a chunked layout in memory such as external memory (e.g., a hard drive) for fast read/write in the image restoration phase. The parallel, cascading image restoration techniques involve a high-throughput image restoration strategy to asynchronously upload and process the segmented tile images, and download the restored images to memory to reduce idling time of the processors (e.g., graphical processing units (GPUs)). The parallel, cascading image restoration techniques involve simultaneously processing a set of segmented images from multiple image sensors with an identical set of incidence angles.

A. Parallel Imaging Acquisition and/or Restoration Systems

Certain embodiments pertain to digital imaging systems designed for parallel image acquisition and/or parallel restoration of higher resolution images. These digital imaging systems control substantially asynchronously and in parallel multiple hardware components (e.g. an illumination system, an image sensor system, internal memory, and/or external memory) by using a controller with a multi-processor architecture. An example of such a digital imaging system is depicted in a block diagram shown in FIG. 9.

Figure 9:
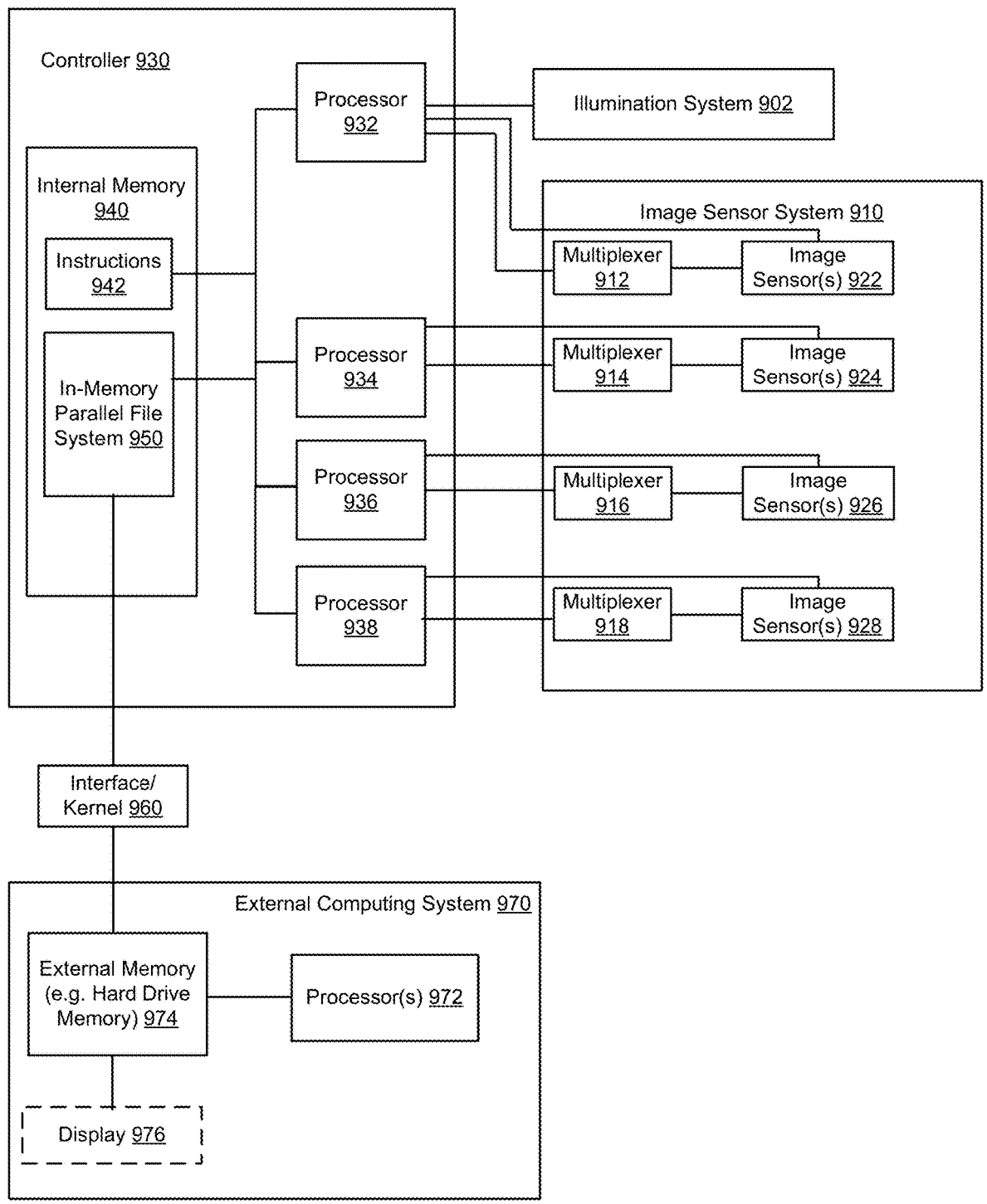
FIG. 9 shows a schematic block diagram depicting an example imaging system for parallel image acquisition and/or parallel restoration, according to certain implementations.

As shown, FIG. 9 depicts an imaging system 900 having an illumination system 902, an image sensor system 910, a controller 930 with a multi-processor architecture, an interface or kernel 960, and an external computing system 970 in communication with the controller 930 through the interface or kernel 960. The imaging system 900 is configured to implement parallel image acquisition and/or parallel restoration of higher resolution images. The image sensor system 910 includes a plurality of multiplexers 912, 914, 916, and 918 and a plurality of sets of one or more image sensors 922, 924, 926, and 928. As shown, each set of image sensors is in communication with one of the multiplexers. The controller 930 has a multi-processor architecture including a plurality of processors 932, 934, 936, and 938. Each of the processors 932, 934, 936, and 938 is in communication with one of the multiplexers 912, 914, 916, and 918 respectively to be able to receive raw image data. Each of the processors 932, 934, 936, and 938 is also in communication with one of the sets of image sensor(s) 922, 924, 926, and 928 respectively to be able to send control signals. The first processor 932 is also in communication with the illumination system 902 to be able to send control signals. The internal memory 940 includes instructions 942 that can be executed by the processors 932, 934, 936, and 938 to asynchronously and in parallel control certain hardware components of the imaging system 900. The processors 932, 934, 936, and 938 are in communication with the instructions 942 of the internal memory 940 to be able to execute the instructions 942, for example, to asynchronously and in parallel control the illumination system 902 and/or the image sensor system 910. A specialized in-memory parallel file system 950 has been created in the internal memory 940 that houses a four-dimensional hypercube image data structure. Examples of hypercube image data structures are depicted pictorially in FIGS. 11, 12A, and 12B.

In some cases, the substantially asynchronous control of the illumination system 902 and/or the image sensor system 910 helps to reduce the time latency that can be caused by the data transfer between the image sensors 922, 924, 926, and 928 and the in-memory file system 950. On a first level, individual image sensors stream the captured image frames independently of each other and the multiplexers 912, 914, 916, and 918 buffer the incoming streams asynchronously. On a second level, individual processors 932, 934, 936, and 938 accept the data transfer from the corresponding multiplexers 912, 914, 916, and 918 independently. One process does not block other processes for a given illumination pattern. On a third level, individual processors 932, 934, 936, and 938 save the data into the corresponding space in the hypercube of the in-memory parallel file system 950, and do not interfere with each other. In short, the data transfer latency is hidden during the image acquisition phase because the image capture from the image sensors does not block the multiplexer, which in turn does not block the data saving process in the memory. The only synchronization effect that happens during acquisition is when there is a change of illumination pattern initiated by the master processor 932 to the illumination system 902.

In FIG. 9, the processors 932, 934, 936, and 938 are in communication with the specialized in-memory parallel file system 950. The external computing system 970 includes an external memory (e.g., hard drive) 974, a set of one or more processors 972 in communication with the external memory 974, and an optional (denoted by dashed lines) display 976 in communication with the external memory 974. The processors 932, 934, 936, and 938 implement an in-memory parallel data storage strategy that sorts, segments, and indexes the incoming image frames from the image sensor system 910 into a four-dimensional hypercube image data structure of the in-memory parallel file system 950 created in internal memory 940. The memory blocks of the four-dimensional hypercube data structure are stored to the external memory 974 according to a data serialization strategy that arranges segmented image data in a chunked layout on the external memory 974 for fast read/write in the restoration phase. The one or more processors 972 execute instructions on the external memory 974 to implement a high-throughput image restoration strategy to asynchronously upload from the in-memory parallel file system 950, process the tile images, and download segmented images (tile images) to the in-memory parallel file system 950 to reduce the idling time of the one or more processors 972. The one or more processors 972 capable of parallel processing execute instructions on the external memory 974 to implement a parallel image restoration strategy to simultaneously process a set of segmented raw tile images captured by the sets of image sensors 922, 924, 926, and 928 to restore and save resolution enhanced images.

In another embodiment, the imaging system 900 may omit the interface/kernel 960 and the external computing system 970 and the functions of the one or more processors 972, external memory 974, and interface/kernel 960 are integrated into the controller 930. In this example, the functions of the one or more processors 972 are performed in parallel by the processors 932, 934, 936, and 938 and the image data is stored in the internal memory 940 of the controller 930 or in another memory of the controller 930.

Figure 10:
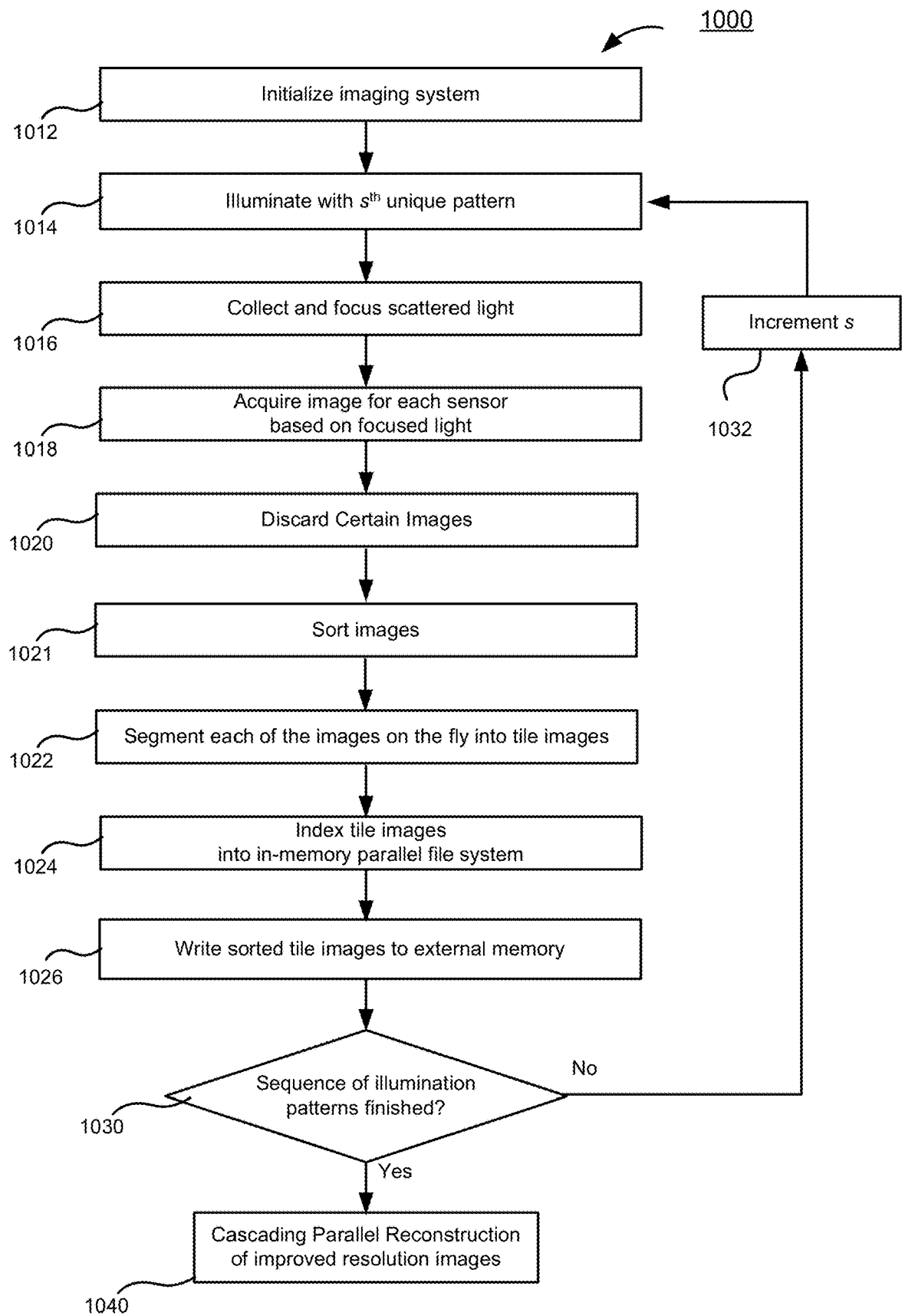
FIG. 10 depicts a flowchart illustrating an example parallel image acquisition and/or parallel restoration method, according to some implementations.

The imaging system 900 can implement the image acquisition phase and/or the restoration phase of the method depicted in the flowchart shown in FIG. 10, which is described in detail in Section II(B). At a high level, in image acquisition phase, the first or "master" processor 932 or of the controller 930 sends control signals (sometimes referred to herein as "trigger signals") to the illumination system 902 to provide illumination, e.g., plane wave illumination, using a sequence of unique illumination patterns. The master processor 932 also sends control signals to the second processor 934, the third processor 936, and the fourth processor 938 to initiate an image acquisition operation by sending control signals to the corresponding second set of images sensors 924, third set of image sensors 926, and fourth set of image sensors 928 to capture raw images. In this example, the first processor 932 is assigned to the first set of image sensors 922 and initiates an image acquisition operation by sending control signals to the first set of image sensors 924 to capture raw images. In another example, the first processor 932 is not assigned a set of image sensors.

During each image acquisition operation of the image acquisition phase, all the sets of image sensors 922, 924, 926, and 928 capture raw images simultaneously based on the control signals from the controller 930. In one aspect, one or more sample wells are illuminated and imaged during each acquisition operation. Over the course of the image acquisition phase, a sequence of unique illumination patterns is implemented and a sequence of raw images is captured by each image sensor, each image based on a corresponding illumination pattern. In one example, each of the raw images captured by each image sensor is based on a different angle of illumination incident the sample(s) being imaged. In this case, over the course of the image acquisition phrase, each image sensor captures a sequence of raw images corresponding to a plurality of unique incidence angles. The multiplexers 912, 914, 916, and 918 forward the raw images to the corresponding processors 932, 934, 936, and 938 of the controller 930. During the image acquisition phase, the processors 932, 934, 936, and 938, in parallel, sort, segment, and index in a four-dimensional hypercube data structure in the in-memory parallel file system 950 created in the internal memory 940. The four-dimensional hypercube data structure can then be arranged and stored according to a data serialization strategy that arranges the segmented image data in a chunked layout on the external memory 974 of the external computing system 970 for fast read/writes in the restoration phase.

The one or more processors 972 of the external computing system 970 have parallel processing capability and are configured or configurable according to a high throughput image restoration strategy. During the restoration phase, the one or more processors 972 asynchronously upload blocks of the of the segmented four-dimensional hypercube from the hard drive 974, process the tile images to generate restored images, and download the restored images to the hard drive 974, to reduce the idling time of the one or more processors 972. To keep the graphical processor(s) 972 running the computationally intensive image restoration operation without idling, the upload/download operations overlap with the restoration operation in time as shown in FIG. 13. This further reduces the total time for image restoration. The one or more processors 972 are configured or configurable to combine the tile images for each sensor captured during illumination by the sequence of illumination patterns into a restored tile image for each tile and then combine the tile images for each image sensor to generate a restored image for each image sensor during the restoration operation.

The imaging system 900 harnesses the fact that the illumination system 902 provides a unique illumination pattern at each acquisition operation such that illumination is shared by multiple imaging sensors at the same time while each image sensor captures image data independently. The imaging system 900 can then employ image acquisition and data transfer in a massively parallel manner during the image acquisition phase. Similarly, the image recovery process can be performed in parallel since all image sensors receive illumination based on the same illumination patterns. Thus, the imaging system 900 does not require sequential image acquisition (e.g., well-by-well illumination and image acquisition) or sequential restoration.

In certain implementations, the imaging system 900 is configured or configurable to be used to image multiple samples contained in a plurality of sample wells of a multi-well plate (e.g. 6-well plate, 12-well plate, 24-well plate, 48-well plate, 96-well plate, 384-well plate, or 1536-well plate). In some multi-well plate implementations, each well is aligned with a lens and each lens is aligned with an image sensor such as with the array-level Fourier ptychography imager 200 shown in FIG. 2B. In this example, each restored image is of one well of the multi-well plate 208 loaded into the array-level Fourier ptychographic imager 200.

The illumination system 902 is configured or configurable to illuminate the sample(s) being imaged with a sequence of unique illumination patterns during an image acquisition phase. That is, the illumination system 902 sequentially illuminates the one or more sample wells with one illumination pattern during each image acquisition operation (also sometimes referred to herein as a "scan") of the acquisition process. The processor 932 sends control signals to the illumination system 902 and the processors 932, 934, 936 and 938 send control signals to the sets of image sensors 922, 924, 926, and 928 to synchronize these hardware components such that all of the sets of image sensors 922, 924, 926, and 928 capture images simultaneously while the illumination system 902 provides illumination based on a unique illumination pattern at each image acquisition operation.

The illumination system 902 includes an array of light sources. For example, each light source can include one or more light-emitting diodes (LEDs). The controller 930 controls the illumination of the light sources, for example, by selectively powering on or otherwise allowing only particular ones or subsets of the light sources to form various illumination patterns at particular times and for particular durations during different imaging acquisition operations of the acquisition process. During each image acquisition operation, the sets of image sensors 922, 924, 926 and 928 acquire images simultaneously. A plurality of image acquisition operations are performed over the course of an entire image acquisition phase using different illumination patterns. In one multi-well plate example, each of the sample wells is illuminated at the same plurality of incidence angles by the time the image acquisition phase is complete.

In one embodiment, the illumination system 902 includes a printed circuit board or other dielectric substrate onto or into which an array of light sources can be electrically and physically coupled. An example of such a substrate is the substrate 312 with an array of light sources 322 shown in and described with respect to FIG. 3B. In this example, the number of light sources 322 is 1120 (28 rows and 40 columns). FIGS. 6A-6E depicts examples of illumination patterns for the array of light sources shown in FIG. 3B. Other examples of illumination patterns that can be used are described in Section I.

In one aspect, each light source of the array of light sources includes a single RGB (Red, Blue, Green) LED including a red sub-LED, a green sub-LED and a blue sub-LED. In other words, each RGB LED actually has three (3) semiconductor sub-light sources: one red, one blue and one green. An example of a such as light source is the light source 322 in FIG. 3B with a single RGB (Red, Blue, Green) LED having a red sub-LED 324a, a green sub-LED 324b and a blue sub-LED 324c. Additionally or alternatively, each light source also can include an LED for generating light in non-visible parts of the spectrum, such as infrared light or ultraviolet light. In some implementations, the illumination system 902 can further include side-mounted light sources (for example, high power LEDs, not shown) for use in increasing the intensities of the excitation signals for fluorescence imaging to, in turn, increase the intensities of the emission signals emitted by the fluorophores within the samples.

The image sensor system 910 includes a plurality of sets of image sensors 922, 924, 926, and 928, each set having one or more image sensors. The image sensors may be cameras such as CMOS image sensor chips or other suitable imaging sensors. The data signals output by the image sensors are multiplexed before being communicated to the controller 930. The image sensor system 910 includes a plurality of multiplexers 912, 914, 916, and 918 and a plurality of sets of image sensors 922, 924, 926, and 928. The multiplexers 912, 914, 916, and 918 are in communication with the processors 932, 934, 936, and 938 respectively. Each of the multiplexers 912, 914, 916, and 918 can separate images from the incoming image data frames and selectively forward to the corresponding processor for parallel sorting, segmenting, and indexing. The first multiplexer 912 is in communication with the first set of one or more image sensors 922 and with the first processor 932 to be able to receive an input signal with raw image data from the first set of image sensors 922 and select and sequentially forward individually raw images from the image sensors 922 to the first processor 932. The second multiplexer 914 is in communication with the second set of one or more image sensors 924 and with the second processor 934 to be able to receive an input signal with raw image data from the second set of image sensors 924 and select and sequentially forward individually the raw images from the image sensors 924 to the second processor 934. The third multiplexer 916 is in communication with the third set of one or more image sensors 926 and with the third processor 936 to be able to receive an input signal with raw image data from the third set of image sensors 926 and select and sequentially forward individually the raw images from the image sensors 926 to the third processor 936. The fourth multiplexer 918 is in communication with the fourth set of one or more image sensors 928 and with the fourth processor 938 to be able to receive an input signal with raw image data from the fourth set of image sensors 928 and select and sequentially forward individually the raw images from the image sensors 928 to the fourth processor 938. Alternatively, the image sensor system 910 or the controller 930 may include a demultiplexer, deserializer, or other device or component for separating the image data from each of the image sensors so that the image frames for each of the sample wells can be processed in parallel by the processors 932, 934, 936, 930 of the controller 930.

Each of the sets of image sensors 922, 924, 926, and 928 has g image sensors. Although the illustrated example shows for processors and multiplexers, it would be understood that there may be fewer or more of these components. The ratio of the number of image sensors to the number of processors and running processes generally corresponds to the number and multiplexing requirements of the multiplexers. For example, if there are ninety six (96) image sensors and four processors, there must be at least four 24-to-1 multiplexers. In this case, each of the sets of image sensors 922, 924, 926, 928 has 24 image sensors (g=24) and the corresponding multiplexers 912, 914, 916, and 918 are each 24-to-1 multiplexers capable of separating and sequentially forwarding images from 24 image sensors to the corresponding processor. With respect to other embodiments, the multiplexer ratio can be varied to optimize the overall data throughput within the allowable bandwidth of the interface 960. For example, if the bandwidth of the interface 960 is doubled, the multiplexer ration can be reduced by half which reduces acquisition time by at most half.

The controller 930 is in parallel and asynchronous control of the sets of image sensors 922, 924, 926 and 928 and the illumination system 902. The sets of image sensors 922, 924, 926 and 928 are simultaneously controlled by processors 932, 934, 936, and 938 respectively. Each set of image sensors is controlled by signals from an individual processor. During the image acquisition phase, the first or "master" processor 932 supervises the illumination system 902 by sending control signals (sometimes referred to herein as "trigger signals") for implementing the sequence of illumination patterns during the image acquisition phase. The first processor 932 also sends control signals to the second processor 934, the third processor 936, and the fourth processor 938 to initiate image acquisition operations. The second processor 934 sends control signals to the second set of image sensors 924 to capture raw images. The third processor 936 sends control signals to the third set of image sensors 926 to capture raw images. The fourth processor 938 sends control signals to the four set of image sensors 928 to capture raw images. The first processor 932 is assigned to the first set of image sensors 922 and sends control signals to the first set of image sensors 924 to capture raw images. During the image acquisition process, the processors 932, 934, 936, and 938 also execute instructions 942 to perform an in-memory parallel data storage strategy to sort, segment and index the incoming image frames from the sets of image sensors 922, 924, 926 and 928. In short, the number of idling image sensors and processors will be minimized based on the operations of the image acquisition process.

Although not shown, the image sensor system 910 also includes an optical system with one or more optical elements for collecting light from the illuminated sample or samples being imaged and propagating the collected light to the image sensor system 910. Some examples of optical elements that may be included in the optical system include, e.g., a lens, a filter, a beam splitter, a reflective element, etc. In some cases, the imaging system 900 is configured to illuminate the sample(s) and collect light transmitted through the sample(s) by collection optical elements in a through-transmission mode. In other cases, the imaging system 900 is configured to illuminate the sample(s) and collect light reflected from the surface of the sample(s) by collection elements in an epi-illumination mode.

In certain implementations, the optical system includes at least one array of lenses (sometimes referred to herein as a "lens array"). Each lens array element includes one or more lenses. In a multi-well plate implementation, the arrangement and the total number of elements in each array matches the arrangement and total number of image sensors in the image sensor system 910 as well as the arrangement and total number of wells in a multi-well plate to be imaged.

To perform parallel image processing, the controller 930 has a multi-processor architecture including a plurality of processors 932, 934, 936, and 938. The one or more processors 972 of the external computing system 970 also have parallel processing capabilities. Some examples of processors that can be implemented include a general purpose processor (CPU), an application-specific integrated circuit (ASIC), an programmable logic device (PLD) such as a field-programmable gate array (FPGA), or a System-on-Chip (SoC) that includes one or more of a CPU, ASIC, PLD as well as a memory and various interfaces.

Each of the processors 932, 934, 936, and 938 is in communication with the internal memory 940 to be able to execute instructions 942 for controlling the illumination system 902 and the image sensor system 910. For example, the controller 930 may control the illumination of light sources, for example, by selectively powering on or otherwise allowing only particular ones or subsets of the light sources of the illumination system 902 to form various illumination patterns at particular times and for particular durations during image acquisition operations. As another example, the controller 930 may control the image acquisition of the sets of image sensors 922, 924, 926, and 928 by activating all the image sensors simultaneously and for a particular exposure time during the duration of each illumination pattern. The first processor 932 is in communication with the first set of image sensors 922 and with the illumination system 902 to be able to send control signals to both systems. The first processor 932 is configured or configurable to execute the instructions 942 on the internal memory 940 to send the control signals to the first set of image sensors 922 and control signals to the illumination system 902 to synchronize the exposure time of the image sensors during the illumination of each illumination pattern. The second processor 934 is in communication with the second set of image sensors 924 to be able to send control signals to synchronize the exposure time of the image sensors during the illumination of each illumination pattern. The third processor 936 is in communication with the third set of image sensors 926 to be able to send control signals to synchronize the exposure time of the image sensors during the illumination of each illumination pattern. The fourth processor 938 is in communication with the fourth set of image sensors 928 to be able to send control signals to synchronize the exposure time of the image sensors during the illumination of each illumination pattern.

The internal memory 940 of the controller 930 includes a non-volatile memory array for storing instructions 942, which is processor-executable code. The instructions 942 can be executed by the processors 932, 934, 936, and 938 to perform various functions or operations of the controller 930 for carrying out various operations on the image data. The internal memory 930 also can store raw and/or processed image data (including restored images). In some implementations, the internal memory 940 or a separate memory device can additionally or alternatively include a volatile memory array for temporarily storing code to be executed as well as image data to be processed, stored, or displayed. In some implementations, the controller 110 itself can include volatile and in some instances also non-volatile memory.

During operation, the processors 932, 934, 936, and 938 execute instructions 942 stored in internal memory 940 to perform asynchronous and parallel control of certain hardware components of the imaging system 900 such as the illumination system 902 and the image sensor system 910 and to perform various other functions of the imaging system 900. In addition or alternatively, the one or more processors 972 may executes instructions stored in internal memory on the external computing system 970 to perform various functions of the imaging system 900 such as image restoration. The instructions may include, for example: 1) instructions for controlling the activation of one or more light sources of the illumination system 902 to cause particular illumination patterns during an image acquisition phase; 2) instructions for controlling the exposure duration of each image sensor in the sets 922, 924, 926, and 928; 3) instructions for sorting, segmenting, and indexing the incoming image frames, for example, "on the fly," 4) instructions for arranging the segmented image data in a chunked layout on the external memory such as a hard drive 5) instructions for asynchronously uploading, processing, and downloading segmented images, 6) instructions for restoration of improved resolution images. In addition, the instructions 942 may include instructions for controlling other hardware components such as the multiplexers 912, 914, 916, and 918.

The processors 932, 934, 936, and 938 are configured or configurable to receive in parallel the raw (or minimally pre-processed) image data from the image sensor system 910 and execute instructions to perform, in parallel, one or more processing operations (e.g., sorting, segmenting, and indexing) on the image data. For example, the controller 930 may execute instructions to perform operations of the parallel image acquisition and restoration method shown in FIG. 10.

The processors 932, 934, 936, and 938 are in communication with the specialized in-memory parallel file system 950 to be able to receive and store image data. The external computing system 970 includes an external memory (e.g., hard drive) 974 and a set of one or more processors 972 capable of parallel processing. The specialized in-memory parallel file system 950 is in communication with the external memory 974 of the external computing system 970 to store the four-dimensional hypercube data structure to the external memory 974.

The one or more processors 972 are also configured or configurable to receive image data from the memory blocks of the hypercube stored in the external memory 974 and execute instructions to perform one or more processing operations of the parallel image acquisition and restoration method shown in FIG. 10. For example, the one or more processors 972 may perform cascading parallel restoration of improved resolution images of the samples in the sample wells using the tile images. The external computing system 970 is also shown to include an optional (denoted by dashed lines) display 976 in communication with the external memory 974.

In certain implementations, each of the processors 932, 934, 936, and 938 sorts, segments, and indexes each incoming image from the image sensors "on the fly" i.e. as the incoming images are received during the image acquisition phase. In these "on the fly" implementations, the incoming images are segmented as they are received during the image acquisition phase rather than being first saved to memory and then segmented later. If the images were first saved and segmented later, the image sensor system 910 and the one or more processors 972 would be idling at times during processing, which could limit the overall restored image throughput. In one case, an "on-the-fly" implementation has been shown to reduce processing time by tenfold as compared with reorganizing (i.e. reading, segmenting, and writing) the raw data from/to the external memory 974 such as a hard drive.

To implement sorting, segmenting, indexing "on-the-fly," the imaging system 900 uses an in-memory parallel data storage strategy accessible by all the running processes. In this case, an in-memory parallel file system 950 is created in the internal memory 940. The in-memory parallel file system 950 houses a four-dimensional image data "hypercube" with dimensions of "number of illumination patterns" times "number of image sensors" times "image height" times "image width." The hypercube is pre-segmented into chunks (sometimes referred to herein as "memory blocks") of dimensions 1×number of image sensors×number of tiles in a first direction×number of times in a second direction (e.g. 1×number of image sensors×128×128).

Figure 11:
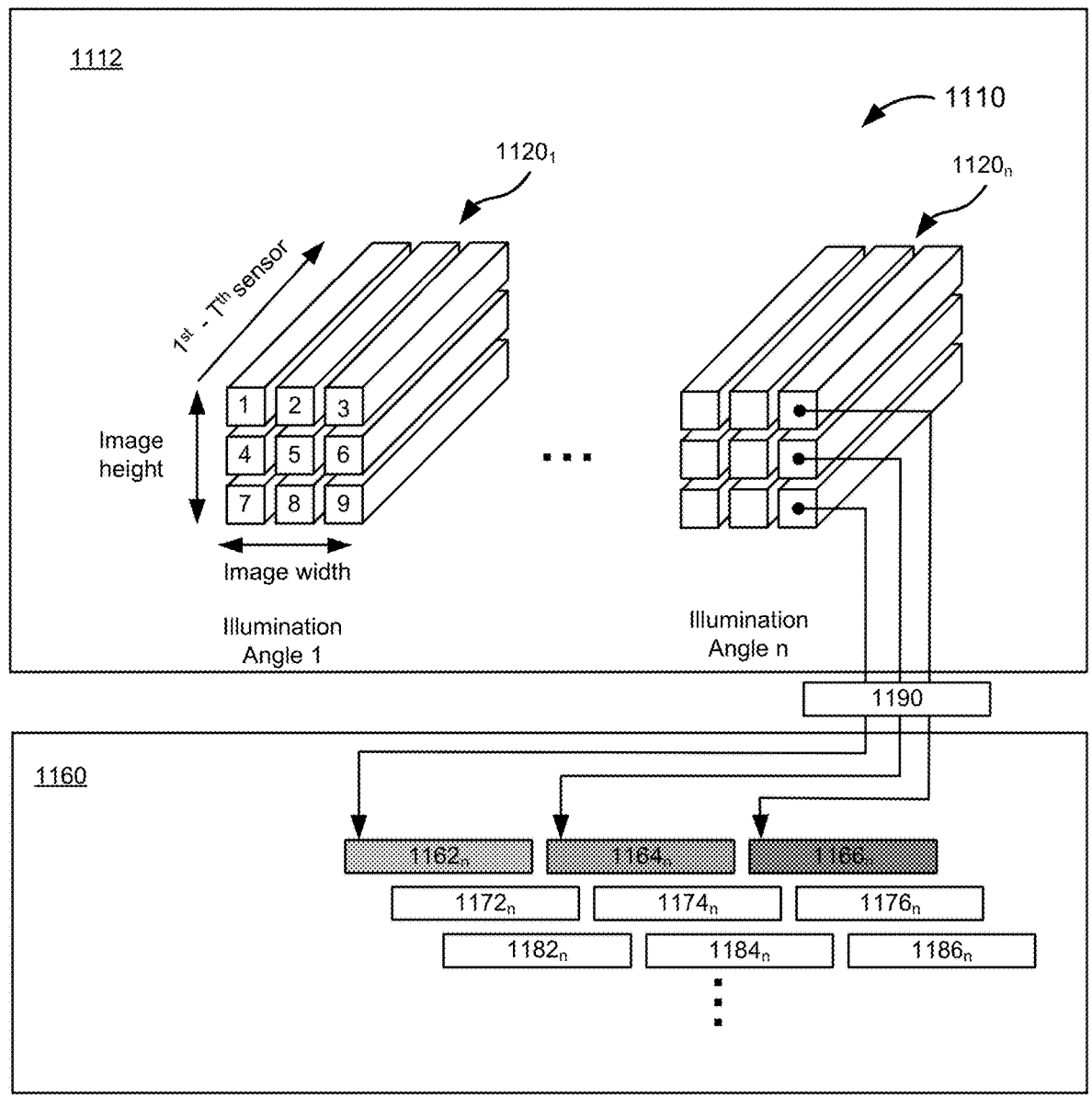
FIG. 11 depicts an example of an in-memory parallel file system with a four-dimensional hypercube, interface, and an external memory of an imaging system, according to some implementations.

FIG. 11 depicts an example of a four-dimensional hypercube 1110 that can be implemented by the imaging system 900, according to certain embodiments. In these embodiments, each image captured by each image sensor has been segmented into nine tile images. The illustrated four-dimensional hypercube 1110 has dimensions of n illumination patterns×T sensors×3 tile images×3 tile images. The four-dimensional hypercube 1110 includes n three-dimensional data structures $1120_1 \ldots 1120_n$, where n is the number of illumination patterns used during the image acquisition phase. Each of the three-dimensional structures $1120_1 \ldots 1120_n$ includes nine memory blocks. Each of the memory blocks is associated with a corresponding one of the nine tile images (1-9) segmented from each image. Each memory block includes the tile images for one tile of each image captured all the sets of image sensors 922, 924, 926, and 928. Although the hypercube 1110 is shown as including nine blocks corresponding to nine segmented tile images of each captured image, more or fewer tile images and corresponding blocks can be used.

In some "on the fly" implementations, for each unique illumination pattern, the incoming image data of all the sets of image sensors 922, 924, 926 and 928 are simultaneously sorted, segmented, and indexed online by the in-memory parallel file system 950. In the tile sorting operation, each of the images from a particular illumination pattern and image sensor are mapped to an illumination angle. In the segmentation operation, each of the images are divided into tile images, generally of equivalent dimensions. In the tile indexing operation, the tile images are placed in the proper location of the hypercube. The individual chunks of the hypercube are then written to the external memory 974 (e.g., a hard drive) in a linear layout, which facilitates the tile image loading and restoration in the restoration phase.

In certain implementations, image sorting involves using a lookup table that can be stored in memory. The lookup table maps the $s^{th}$ illumination pattern for the $T^{th}$ image sensor to the $n^{th}$ illumination angle. The image sorting operation involves using the lookup table to map the (s, T) to the (n) for each incoming image frame from the sets of image sensors 922, 924, 926 and 928. An example of a lookup table is shown in FIG. 15.

In certain implementations, segmentation involves arranging each of the images received from the sets of image sensors 922, 924, 926 and 928 into a tile arrangement, typically of equally sized tiles. For example, for segmentation arrangement of three rows and three columns (i.e. 9 partitions/tiles), each of the images received from the sets of image sensors 922, 924, 926 and 928 will be segmented into nine tiles.

In certain implementations, tile indexing involves assigning each tile image with a unique index coordinate value which uniquely identifies the location in the hypercube as well as uniquely identifies the corresponding block on the external memory. Following the above example, if a tile image is (i) from the $j^{th}$ column of the image; (ii) from the $i^{th}$ row of the image, (iii) captured by the $T^{th}$ image sensor; and (iv) illuminated by the $n^{th}$ illumination angle, the tile image will be assigned a unique index (n, T, i, j). The unique index (n, T, i, j) pictorially corresponds to the four-dimensional coordinates in a hypercube (such as in the hypercube 1110 shown in FIG. 11) and uniquely identifies the corresponding block in the external memory 974.

FIG. 11 is an illustration of components of a parallel image acquisition and restoration imaging system 1100, according to certain embodiments. The imaging system 1100 includes an in-memory parallel file system 1112 with a four-dimensional hypercube 1110, an interface 1190, and an external memory 1160. The parallel image acquisition and restoration imaging system 1100 also includes an illumination system 1230 (shown in FIGS. 12A and 12B) and an image sensors system 1250 (shown in FIGS. 12A and 12B). The system components are similar to system components described with respect to the imaging system 100 shown in FIG. 9. For example, the in-memory parallel file system 1112 is similar to the in-memory parallel file system 950, the interface 1190 is similar to the interface 960, and the external memory 1160 is similar to the external memory 974. In FIG. 11, the four-dimensional hypercube 1110 includes n three-dimensional data structures 1120$_1$ . . . 1120$_n$, where n is the number of illumination patterns used during the image acquisition phase. Each of the three-dimensional structures 1120$_1$ . . . 1120$_n$ includes nine memory blocks. Each of the memory blocks (1-9) is associated with a corresponding one of the nine tile images segmented from each image. For example, the $n^{th}$ three-dimensional structure 1120$_n$ includes a memory block 1162$_n$ corresponding to the $9^{th}$ tile, a memory block 1164$_n$ corresponding to the $6^{th}$ tile, a memory block 1166$_n$ corresponding to the $3^{rd}$ tile, a memory block 1172$_n$ corresponding to the $8^{th}$ tile, a memory block 1174$_n$ corresponding to the $5^{th}$ tile, a memory block 1176$_n$ corresponding to the $2^{nd}$ tile, a memory block 1182$_n$ corresponding to the $7^{th}$ tile, a memory block 1184$_n$ corresponding to the $4^{th}$ tile, and a memory block 1184$_n$ corresponding to the $1^{st}$ tile. In an "on the fly" implementation, the image system 900 also sorts, segments, and indexes the incoming images from the image sensors as they are forwarded by the multiplexers. The tile images are indexed in the in-memory parallel file system 950.

Figure 12A:
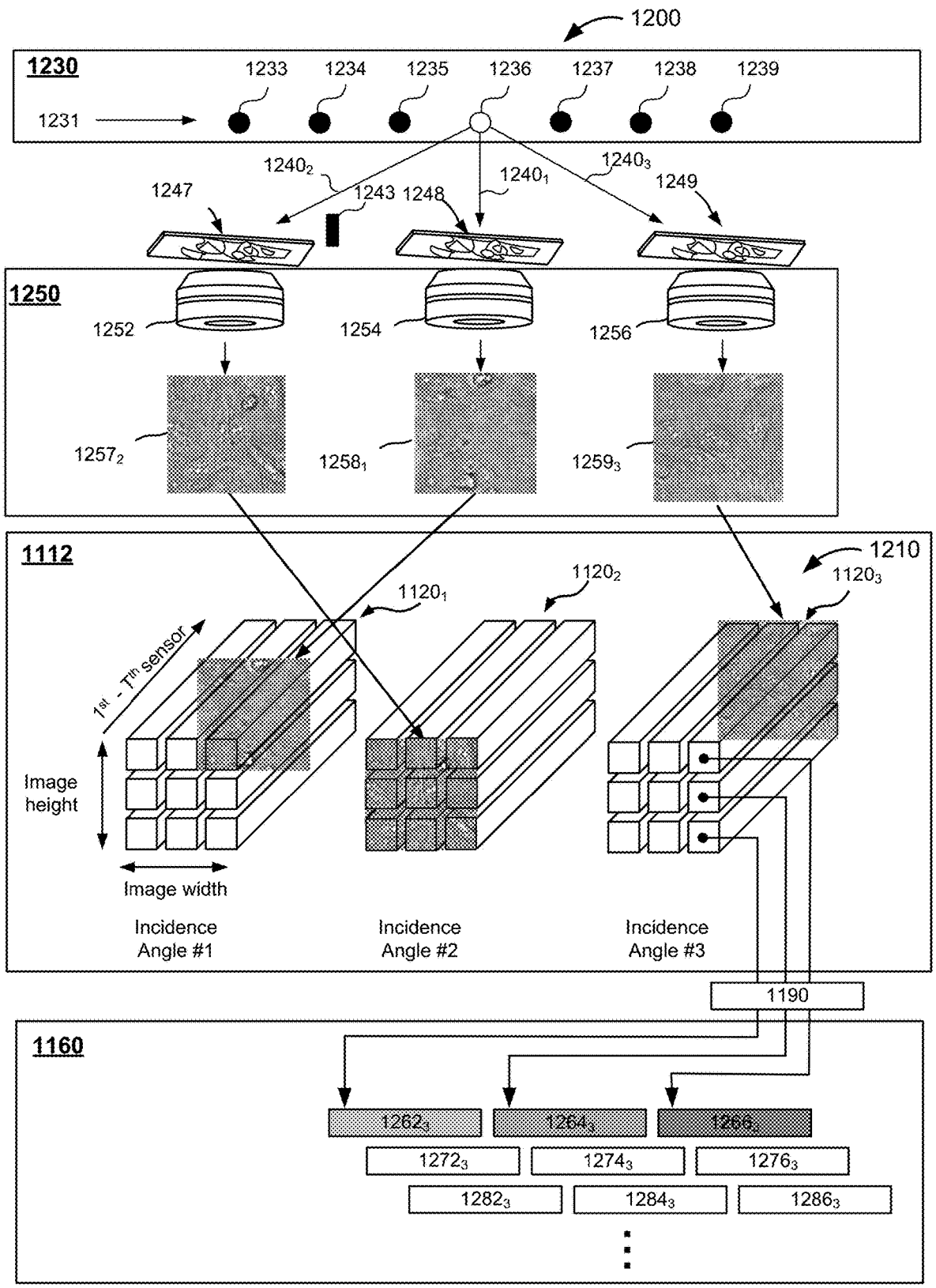
FIG. 12A depicts a schematic diagram of components of an imaging system during one image acquisition operation implementing a first illumination pattern, according to some implementations.
Figure 12B:
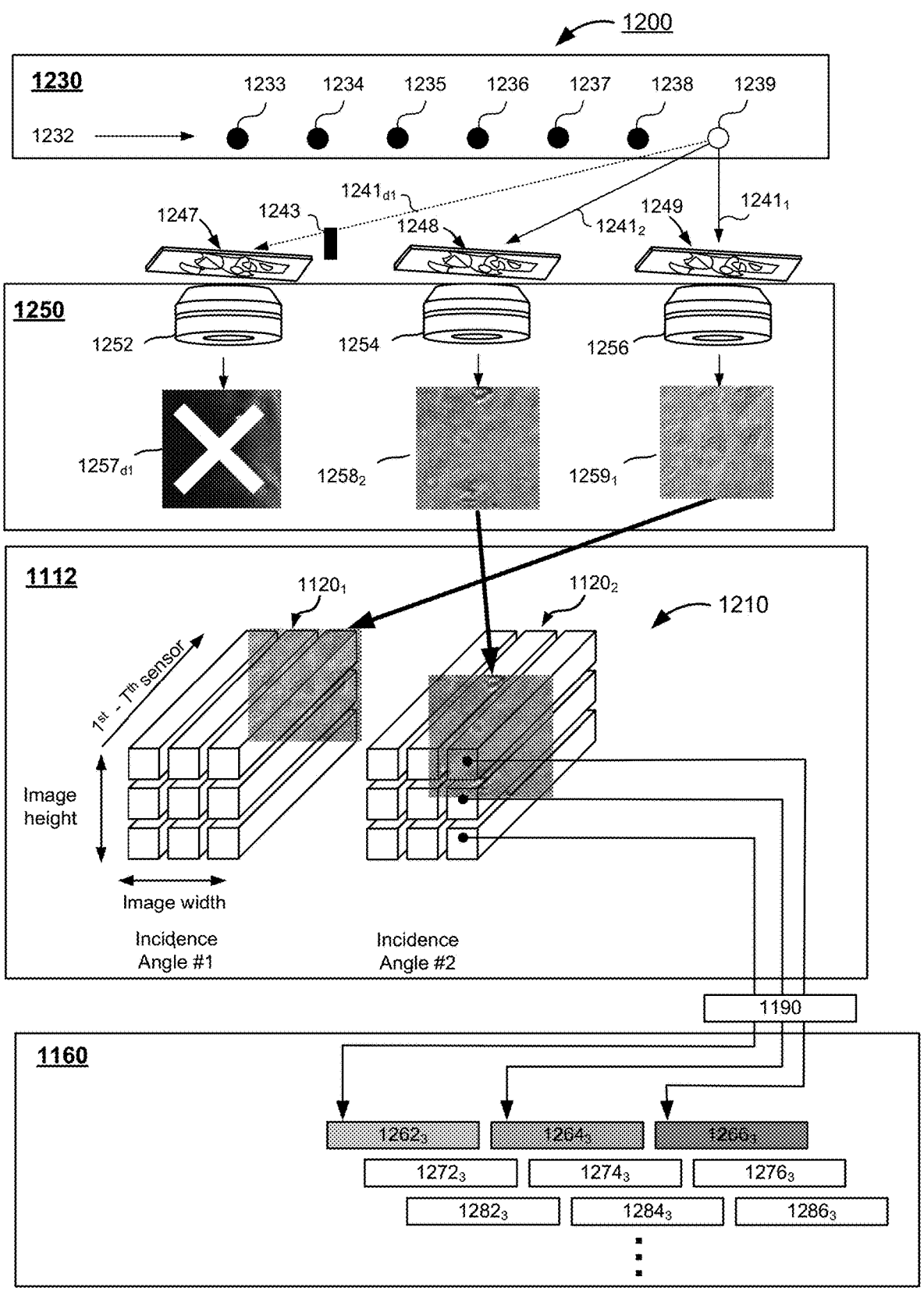
FIG. 12B depicts a schematic diagram of components of the imaging system of FIG. 12A during another image acquisition operation implementing a second illumination pattern, according to some implementations.

FIGS. 12A and 12B depicts the parallel image acquisition and restoration imaging system 1100 of FIG. 11 during two image acquisition operations with "on the fly" sorting, segmenting, and indexing operations based on two unique illumination patterns, according to certain aspects. The imaging system 1100 includes an illumination system 1230, an imaging sensor system 1250, an in-memory parallel file system 1112 with a four-dimensional hypercube 1110, an interface 1190, and an external memory 1160. The parallel image acquisition and restoration imaging system 1100 also includes an illumination system 1230 with a two-dimensional array of light sources in the form of LEDs. For the purposes of illustration, six LEDs 1233, 1234, 1235, 1236, 1237, 1238, and 1239 in a linear arrangement are shown. It would be understood that the array of light sources may include a larger number of LEDs and that the LEDs are arranged in two dimensions. The parallel image acquisition and restoration imaging system 1100 also includes three sample wells of a well-plate containing samples 1247, 1248, and 1249. The image sensor system 1250 includes a first image sensor 1252, a second image sensor 1254, and a third image sensor 1256, each image sensor aligned with one of the sample wells of the multi-well plate. The four-dimensional hypercube 1110 includes n three-dimensional data structures 1120$_1$ . . . 1120$_n$, where n is the number of illumination patterns used during the image acquisition phase. Each of the three-dimensional structures 1120$_1$ . . . 1120$_n$ includes nine memory blocks. Each of the memory blocks (1-9) is associated with a corresponding one of the nine tile images segmented from each image. For example, the $n^{th}$ three-dimensional structure 1120$_n$ includes a memory block 1162$_n$ corresponding to the $9^{th}$ tile, a memory block 1164$_n$ corresponding to the $6^{th}$ tile, a memory block 1166$_n$ corresponding to the $3^{rd}$ tile, a memory block 1172$_n$ corresponding to the $8^{th}$ tile, a memory block 1174$_n$ corresponding to the $5^{th}$ tile, a memory block 1176$_n$ corresponding to the $2^{nd}$ tile, a memory block 1182$_n$ corresponding to the $7^{th}$ tile, a memory block 1184$_n$ corresponding to the $4^{th}$ tile, and a memory block 1184$_n$ corresponding to the $1^{th}$ tile. In this implementation, the image system 900 segments "on the fly" each of the incoming images from the image sensors, as forwarded by the multiplexers, into nine tile images. The imaging system 900 also sorts the images and indexes the tile images in the in-memory parallel file system. The parallel image acquisition and restoration imaging system 1100 also includes a wall 1243 between two wells of the multi-well plate.

In FIG. 12A, only the center LED 1236 is turned on in the illumination system 1230. The LED 1236 provides substantially planar illumination incident the slide with the sample 1247 at a second incident angle 1240$_2$, provides substantially planar illumination incident the slide with the sample 1248 at a first incident angle 12401, which is normal to the slide with the sample 1248, and substantially planar illumination incident the slide with the sample 1249 at a third incident angle 1240$_3$. The second image sensor 1254 captures an image 1258$_1$ with a normal illumination at the first incident angle 12401, whereas the first and third image sensors 1247 and 1249 receive oblique illumination at a second incident angle 1240$_2$ and a third incident angle 1240$_3$ respectively. The first image sensor 1252 captures an image 1257$_2$ and the third image sensor 1256 captures an image 1259$_3$. The processors of the imaging system 1200 automatically segments the images 1257$_2$, 1258$_1$, and 1259$_3$ "on the fly" as they are received from the image sensors 1252, 1254, and 1256 and the in-memory parallel file system 1112 identifies the corresponding subset in the hypercube 1210, indexes the tile images accordingly, and then temporarily stores the tile images in the hypercube 1210. The memory blocks are stored to the external memory 1160. The image 1258$_1$ with a normal illumination at the first incident angle 12401 is automatically segmented into nine tile images and stored in the $1^{st}$ three-dimensional data structure 1120$_1$ at the location associated with the second sensor 1254. The image 1257$_2$ with oblique illumination at the second incident angle 1240$_2$ is automatically segmented into nine tile images and stored in the $2^{nd}$ three-dimensional data structure 1120$_2$ at the location associated with the first sensor 1252. The image 1259$_3$ with oblique illumination at the third incident angle 1240$_3$ is automatically segmented into nine tile images and stored in the $3^{rd}$ three-dimensional data structure 1120$_3$ at the location associated with the third sensor 1256.

In FIG. 12B, only the right-most LED 1239 is turned on in the illumination system 1230. In this illustration, the LED 1239 provides substantially planar illumination incident the slide with the sample 1247 at a fourth incident angle 1241$_{d1}$, provides substantially planar illumination incident the slide with the sample 1248 at the second incident angle 1240$_2$, and provides substantially planar illumination incident the slide with the sample 1249 at a first incident angle 12401, which is normal to the sample 1249. The second image sensor 1254 captures an image 1258$_2$ based on the oblique illumination at the second incident angle 1240$_2$. The third image sensor 1256 receives normal illumination at the first incident angle 12401. The second image sensor 1254 captures an image 1258$_2$ with a second incidence angle 1240$_2$ and the third image sensor 1256 captures an image 1259$_1$ with a first incidence angle 12401. In this case, the image 1257$_{d1}$ captured by the first image sensor is rejection due to the obstruction of the wall 1243. The processors of the imaging system 1200 automatically segments the images 1258$_2$, and 1259$_1$ "on the fly" as they are received from the image sensors 1254 and 1256 and the in-memory parallel file system 1112 identifies the corresponding region in the hypercube 1210, indexes the tile images accordingly, and then temporarily stores the tile images in the hypercube 1210. The memory blocks are stored to the external memory 1160. As shown, the image 1259$_1$ with a normal illumination at the first incident angle 12401 is automatically segmented into nine tile images and stored in the 1$^{st}$ three-dimensional data structure 1120$_1$ at the location associated with the third sensor 1256.

The image 1259$_1$ with a normal illumination at the first incident angle 12401 is automatically segmented into nine tile images and stored in the 1$^{st}$ three-dimensional data structure 1120$_1$ at the location associated with the third sensor 1256. The image 1258$_2$ with oblique illumination at the second incident angle 1240$_2$ is automatically segmented into nine tile images and stored in the 2$^{nd}$ three-dimensional data structure 1120$_2$ at the location associated with the second sensor 1254. The image 1257$_{d1}$ is discarded and not used due to the obstruction of the wall 1243 of the multi-well plate providing incomplete or obscured data. In this implementation, rejection of such data online saves precious data bandwidth of the interface 1190.

Returning to FIG. 9, the in-memory parallel file system 1112 is also used in the image restoration phase. As the segmented image data has already been efficiently stored in the external memory 974 in a chunked layout, the one or more processors 972 can directly import segmented image data from the external memory 974. This time the in-memory parallel file system 950 directly links the segments of the hypercube to the corresponding chunks in the external memory 974, avoiding loading the entire set of image to the memory.

The reverse is also true for saving the restored set of images to the external memory 974. The resultant chunk of restored image of dimensions (e.g., number of image sensors×256×256) is saved in the corresponding chunk of the data cube (of dimensions "number of image sensors" times image height times image width), which is also managed by the in-memory parallel file system 974. Both image loading and saving operations can be performed asynchronously during the image restoration operations, thus minimizing the processor idling time in data transfer.

Enabled by the data alignment of the image chunks and the identical illumination pattern across all sets of image sensors 922, 924, 926 and 928, multiple tile images can be restored by the one or more processors 972 in a massively parallel manner. A chunk of time image segments for all sets of image sensors 922, 924, 926 and 928 can be processed simultaneously as they possess an identical set of illumination conditions. This improves computation efficiency substantially because one image chunk only requires one set of function calls and data read/write instead of for all image sensors (e.g., 96 for 96 image sensors), reducing the processing overhead.

In one implementation, the imaging system 900 uses a Fourier ptychographic recovery process (also referred to as "Fourier ptychographic reconstruction process") to generate a restored image of each well of a multi-well plate, in parallel, where the multi-well plate is illuminated by different illumination patterns. Example of a Fourier ptychographic construction process described with respect to FIGS. 7 and 8. The controller 930 interprets image data from the sequence of acquired intensity images, transforms the relatively low resolution image data frames associated with each of the image acquisition operations into Fourier space, combines the transformed raw image data, corrects for aberrations, and generates a single high resolution image for each of the sample wells. In one example, the imaging system 900 also can be configured to perform fluorescence imaging. As such, the controller 900 can generally include functionality to interpret, process, and in some instances combine fluorescence image data for each of the sample wells in parallel.

In some implementations, the controller 930 also can be configured or configurable by a user to output raw image data as well as processed image data over a communication interface 960 to an external computing system 970. The external computing system 970 can be configured or configurable by a user to output raw image data or processed image data over a communication interface for display on a display 976.

In some implementations, the imaging system 900 further includes one or more other interfaces such as, for example, various Universal Serial Bus (USB) interfaces or other communication interfaces. Such additional interfaces can be used, for example, to connect various peripherals and input/output (I/O) devices such as a wired keyboard or mouse or to connect a dongle for use in wirelessly connecting various wireless-enabled peripherals. Such additional interfaces also can include serial interfaces such as, for example, an interface to connect to a ribbon cable. It should also be appreciated that one or more of the illumination system 902 and the image sensor system 910 can be electrically coupled to communicate with the controller 930 over one or more of a variety of suitable interfaces and cables such as, for example, USB interfaces and cables, ribbon cables, Ethernet cables, among other suitable interfaces and cables. In one embodiment, the imaging system 900 also includes a network communication interface that can be used to receive information such as software or firmware updates or other data for download by the controller 930.

In one embodiment, the imaging system 900 also includes a sample loading system generally configured to receive a sample array such as a commercially-available multi-well plate. The sample loading system is more specifically configured to receive a sample array inserted or otherwise loaded into the sample loading system such that the wells (for example, the bottom surfaces of the wells) of the multi-well plate are positioned along a particular plane between the light sources of the illumination system 902 and the lenses of the optical system. The sample loading system also functions to approximately align the centers of the wells of the multi-well plate with the centers of corresponding lenses of the optical system. An example of a suitable sample loading system is the sample loading system 104 described with respect to FIG. 1.

B. Parallel Imaging Acquisition and/or Restoration Methods

Certain embodiments pertain to methods that employ parallel image acquisition and/or parallel image restoration techniques. The parallel image acquisition technique can be implemented by an imaging system that has multiple image sensors that can capture images simultaneously, a multi-processor architecture with parallel processing capability, and multiplexing capability. Some examples of imaging systems that can implement this acquisition technique include, for example, the imaging system 100, the imaging system 200, the imaging system 900, and the imaging system 1200. During each acquisition operation, a unique illumination pattern is employed. In one implementation, the image sensors acquire images that are based on illumination from the same set of incidence angles over the course of the image acquisition phase, each image taken by each image sensor based on one incidence angle. In some cases, these methods sort, segment, and index "on the fly" incoming images as they are acquired by the image sensors. In addition or alternatively, these methods may include a cascading, parallel restoration technique for combining image data acquired by the image sensors to generate improved resolution images.

FIG. 10 shows a flowchart 1000 illustrating an imaging process for parallel image acquisition and/or parallel image restoration, according to implementations. The imaging process can be performed using an imaging system that includes an illumination system with an array of light sources, multiple image sensors that can capture images simultaneously, and a multi-processor architecture with parallel processing capability. Some examples of imaging systems that can perform the imaging process are the imaging system 100, the imaging system 200, the imaging system 900, and the imaging system 1200. The imaging process can be used, for example, to image samples in a multi-well plate. For the purposes of illustration, many of the operations of the imaging process will be described below as being controlled by a controller, although it would be understood that another computing system can be used to control the functions of the imaging system.

The illustrated imaging process includes an image acquisition phase that includes operations 1012, 1014, 1016, 1020, 1022, 1024, 1026, 1030, and 1032 and a restoration phase that includes operation 1040 that involves a cascading, parallel restoration of improved resolution images process. The cascading, parallel restoration of improved resolution images process operation 1040 includes a sequence of sub-operations depicted in a flowchart 1300 shown in FIG. 13. An example of the sub-operations is pictorially illustrated in FIG. 14.

At operation 1012, the controller initializes the illumination system, the image sensor system, and/or other components of the imaging system. Initializes the illumination system can include, for example, powering on or otherwise preparing the illumination system. For example, initializing the illumination system can include retrieving information regarding illumination patterns from a non-volatile memory and loading the retrieved illumination pattern information into a volatile memory for subsequent use in performing a series of sequential image acquisition operations during the image acquisition phase. Initializing the image sensor system can include powering on or otherwise preparing the image sensors to receive light and to generate image data. In a multi-well implementation, initializing the illumination system and the image sensor system also may include a calibration operation to determine the actual values of the angles of incidence that will illuminate each of the wells. An example of a calibration operation is described in Section I.

After initializing the imaging system, the controller iterates s times through operations 1014, 1016, 1018, 1020, 1022, 1024, and 1026, where s is an integer from 1 to n, and n is the number of illumination patterns. In some cases, n is also the number of incidence angles. During the $s^{th}$ iteration, the controller causes the illumination system to produce a $s^{th}$ unique pattern of illumination (1014). Although operations 1014, 1016, and 1018 are shown in sequence form in the flowchart, these operations occur simultaneously.

At operation 1014, the controller causes the illumination system to provide illumination based on the $s^{th}$ illumination pattern by activating one or more light sources in an array of light sources. In one implementation, a master processor of the plurality of processors of the controller supervises the illumination system by sending control signals to the illumination system. In a multi-well plate implementation, some of the activated light sources may each illuminate multiple sample wells simultaneously. Examples of six illumination patterns for a two-dimensional array of 1120 light sources used in a multi-well implementation is depicted in FIGS. 6A-6E. The activation sequences for illuminating the light sources in these six illumination patterns are described in Section I. FIG. 12A and FIG. 12B show an example of a portion other illumination patterns 1231 and 1232.

At operation 1016, the one or more lenses of the optical system receive (sometimes referred to herein as "collect") light scattered by or otherwise issuing from the respective sample(s) during each imaging operation and focus the received light onto the image sensors of the image sensor system. Although the receiving and focusing of the light during each imaging operation is generally performed by passive elements (the lenses of the optical system), this portion of the path of the light is still referred to as operation 1016. In a multi-well implementation, each sample well is aligned to one or more lenses of the optical system and aligned to an image sensor.

At operation 1018, the plurality of processors of the controller cause each of the image sensors of the image sensor system to capture/acquire an image simultaneously while the illumination system provides illumination based on the $s^{th}$ illumination pattern. In the implementation with a master processor, the master processor sends control signals to the other processors of the controller to perform image acquisition. Each of the processors of the controllers that are assigned to image sensors send control signals to the corresponding set of image sensors to initiate simultaneous acquisition. In this operation, each of the image sensors receives light focused by one or more lens of the optical system and acquires image data based on the focused light. In some implementations, the controller has parallel and asynchronous control of the image sensors of the image sensor system with the implementation of its plurality of computer processors capable of parallel processing. In some cases, the asynchronous control of the illumination system and/or the image sensor system may help to reduce the time latency that can be caused by the data transfer between the image sensors and the in-memory file system that has been created in internal memory of the imaging system. An example of asynchronous control of the illumination system 902 and the image sensor system 910 of imaging system 900 is described above with reference to FIG. 9.

Also at operation 1018, a plurality of multiplexers, each multiplexer in communication with one processor and one set of image sensors, forwards in parallel the incoming image frames from the corresponding set of image sensors to the corresponding processor. Each of the plurality of processors is configured to receive, in parallel with the other processors, image data acquired by the corresponding set of image sensors and separated and forwarded by the corresponding multiplexer.

In some imaging modes or processes, such as those for use in bright-field imaging, the illumination incident on each sample is scattered by the physical features of the sample as it passes through the sample. In some other imaging modes or processes, such as those for use in fluorescence imaging, the light sources are configured to generate particular wavelengths of excitation light to excite fluorophores (for example, specialized proteins) in the sample. In such fluorescence imaging, the incident excitation light imparts energy into the fluorophores, which then emit light at lower energy wavelengths. A portion of the scattered light or emitted light then passes through to one or more lenses of the optical system, which generally function to focus the scattered or emitted light onto one or more image sensors of the image sensor system. Each image sensor is configured to capture the light and output a data signal including image data representative of the intensities of light received at particular locations of the sensing surface of the image sensor.

At operation 1020, the controller causes the determination of whether to discard any of the images acquired at operation 1018 and if determines to do so, the controller discards the image(s). For example, the controller may determine discard an image if there was an obstruction such as, for example, the wall 1243 in FIGS. 12B and 12B that obscured the image. As another example, the controller may determine to discard an image if the image is of low quality, e.g., based on determining that its maximum intensity is below a lower threshold value or is above an upper threshold value. As another example, the controller may determine to discard an image if the angle of incidence is above an upper threshold value.

The plurality of processors of the controller implement an in-memory parallel data storage strategy to sort at operation 1021, segment at operation 1022, and index at operation 1024 the incoming image frames from the image sensors into a four-dimensional hypercube image data structure. Although shown in the order of sort operation, segment operation, and index operation, other orders may be used. In "on the fly" implementations, all three operations are performed "on the fly" as incoming images are received.

The hypercube image data structure is housed in the in-memory parallel file system created in internal memory. The four-dimensional image data "hypercube" has dimensions of "number of illumination patterns" times "number of image sensors" times "image height" times "image width." The hypercube is pre-segmented into chunks (sometimes referred to herein as "memory blocks") of dimensions 1×number of image sensors×number of tiles in a first direction×number of times in a second direction (e.g. 1×number of image sensors×128×128). Examples of hypercube image data structures are described with reference to FIGS. 11, 12A, and 12B. The memory blocks of the four-dimensional hypercube data structure are stored to the external memory according to a data serialization strategy that arranges segmented image data in a chunked layout on the external memory for fast read/write in the restoration phase operation 1040.

At operation 1021, the plurality of processors cause the images to be sorted, in parallel. Each processor sorts incoming images from the corresponding set of image sensors. The image sorting sub-operation involves using a lookup table stored in memory. The lookup table maps the $s^{th}$ illumination pattern for the $T^{th}$ image sensor to the $n^{th}$ illumination angle. Each processor uses the lookup table to map the (s, T) to the (n) for each image frame from the corresponding set of image sensors.

A pictorial depiction of the sorting, segmenting, and indexing operations performed "on the fly" is shown in FIGS. 12A and 12B. FIG. 15 is an example of a portion of a lookup table for 6 images and two illumination patterns, according to embodiments. The illustrated example refers to the illuminated LEDs, illumination angles of incidence, and image sensors shown in FIGS. 12A and 12B.

At operation 1022, the plurality of processors of the controller cause the segmentation of the images captured/acquired by the image sensors at operation 1018 and not discarded at operation 1020. In the segmentation operation, each of the images is divided into tile images. The segmentation operation involves arranging each of the images into a tile arrangement. The number of tiles used for each image is usually determined by calculating the ratio of the total imaging area, to the largest tile size that can fit the internal memory of the graphical processor. In one example, for segmentation arrangement of three rows and three columns (i.e. 9 partitions/tiles), each of the images will be segmented into nine tiles. Other numbers of tile images can be used such as, for example, 4, 16, and 25.

At operation 1024, the plurality of processors of the controller cause the tile images to be indexed, in parallel, into the four-dimensional hypercube housed in the in-memory parallel file system in internal memory of the controller. In the tile indexing operation, the tile images are placed in the proper location of the hypercube. Each processor indexes incoming images from the corresponding set of image sensors. The tile image indexing sub-operation involves assigning each tile image with a unique index coordinate value which uniquely identifies the location in the hypercube as well as uniquely identifies the corresponding block on the external memory. For example, if a tile image is: (i) from the $j^{th}$ column of the image; (ii) from the $i^{th}$ row of the image, (iii) captured by the $T^{th}$ image sensor; and (iv) illuminated by the $n^{th}$ illumination angle, the tile image will be assigned a unique index (n, T, i, j). The unique index (n, T, i, j) pictorially corresponds to the four-dimensional coordinates in a hypercube (such as in the hypercube 1110 shown in FIG. 11) and uniquely identifies the corresponding block in the external memory. At the indexing sub-operation, each processor stores each tile image from the corresponding set of image sensors in the hypercube and assigns it a unique index value which identifies the location in the hypercube as well as the corresponding block in external memory. A pictorial depiction of the sorting and indexing operation is shown in FIGS. 12A and 12B.

At operation 1026, the plurality of processors of the controller cause the tile images to be written to external memory based in the index value assigned in operation 1024. Based on the indexing, the individual chunks of the hypercube are written to the external memory (e.g., a hard drive) in a linear layout, which facilitates the tile image loading and restoration in the restoration phase. Alternatively, operation 1026 can be done after operation 1030 and before operation 1040.

In certain implementations, the sorting operation 1021, segmenting operation 1022, and indexing operation 1024 are implemented "on the fly" by the processors, in parallel, as the incoming image frames are received from the corresponding set of image sensors through the corresponding multiplexer. In this implementation, an in-memory parallel file system is created in internal memory that houses a four-dimensional hypercube that is pre-segmented into chunks. In certain implementations, each of the processors sorts, segments, and indexes each incoming image from the corresponding set of image sensors "on the fly" i.e. as the incoming images are received during the image acquisition phase. In these "on the fly" implementations, the incoming images are segmented as they are received during the image acquisition phase rather than being first saved to memory and then segmented later. If the images were first saved and segmented later, the image sensor system and the one or more processors would be idling at times during processing, which could limit the overall restored image throughput. An example of an "on the fly" process is shown in FIGS. 12A and 12B.

At operation 1030, a processor (for example, a master processor) of the controller determines whether images have been acquired for a sequence of illumination patterns. If there are remaining illumination patterns to be completed, s is incremented (s=s+1) at operation 1032 and the next illumination pattern is used at operation 1014.

At operation 1040, the one or more processors capable of parallel processing (e.g., of an external computing system) execute instructions on the external memory to implement a high-throughput image restoration strategy to asynchronously upload from the in-memory parallel file system, process the tile images to generate higher resolution tile images, and download the higher resolution tile images to the in-memory parallel file system. This high-throughput image restoration strategy may reduce the idling time of the one or more processors. As the segmented image data has already been efficiently stored in the external memory in a chunked layout, the one or more processors can directly import segmented image data from the external memory. This time the in-memory parallel file system directly links the segments of the hypercube to the corresponding chunks in the external memory, which may avoid the need to load the entire set of images to the memory. The reverse is also true for saving the restored set of images to the external memory. The resultant chunk of restored image of dimensions is saved in the corresponding chunk of the hypercube, which is also managed by the in-memory parallel file system. Both image loading and saving operations can be performed asynchronously during the image restoration operations, thus minimizing the processor idling time in data transfer.

Enabled by the data alignment of the image chunks and the identical illumination pattern across all sets of image sensors, multiple tile images can be restored by the one or more processors in a massively parallel manner. A chunk of time image segments for all sets of image sensors can be processed simultaneously as they possess an identical set of illumination conditions. This improves computation efficiency substantially because one image chunk only requires one set of function calls and data read/write instead of for all image sensors, reducing the processing overhead.

An example of sub-operations that may be implemented in the restoration operation 1040 is shown in FIG. 13. FIG. 13 includes a flowchart depicting a parallel, cascading image restoration process, according to embodiments. The cascading image restoration process involves a high-throughput image restoration strategy to asynchronously upload, process the segmented tile images, and download the restored images to memory to reduce idling time of the processors (e.g., graphical processing units (GPUs)). FIG. 13 also includes a diagram at the bottom showing a timeline of the three-stage pipeline of the parallel processes during parallel, cascading image restoration process.

At operation 1310, i initialized to 1. At operation 1320, each of the memory blocks (all sensors and all illumination angles/patterns) for the $Q_i$ tile is read from the external memory into the in-memory parallel file system of one processor, $P_i$, of a plurality of processors (e.g., graphical processing unit (GPU)). At the end of operation 1320, two parallel processes are initiated: operation 1330 and operation 1350.

At operation 1330, a master processor determines whether i=q, where q is the total number of tiles per image. That is, the master processor determines whether restoration has been performed on all the tiles. If the master processor determines that i=q, then restoration has been performed on all the tiles and the process ends. If the master processor determines that i<q, then restoration has not been performed on all the tiles and the process increments i (i=i+1) at operation 1340 and returns to operation 1320.

At operation 1350, the processor, $P_i$, causes the restoration of an improved resolution image for the $Q_i$ tile for all the image sensors. At the end of operation 1350, two parallel processes are initiated: operation 1360 and operation 1330. Examples of restoration processes that can be used to restore an improved resolution image for the $Q_i$ tile for all image sensors based on illumination, e.g., plane wave illumination, provided sequentially at a plurality of incidence angles are described with reference to the flowcharts in FIGS. 7 and 8.

The same parallel file system is also utilized in the image restoration operation 1350. As the segmented image data has already been efficiently stored in the external memory (e.g., hard drive) in a chunked layout of the external memory at the bottom of FIGS. 12A and 12B, the processor, $P_i$, can directly import segmented image data from the external memory. This time the in-memory file system directly links the segments of the hypercube to the corresponding chunks in the external memory, which may avoid loading the entire set of image to the memory.

Figure 14:
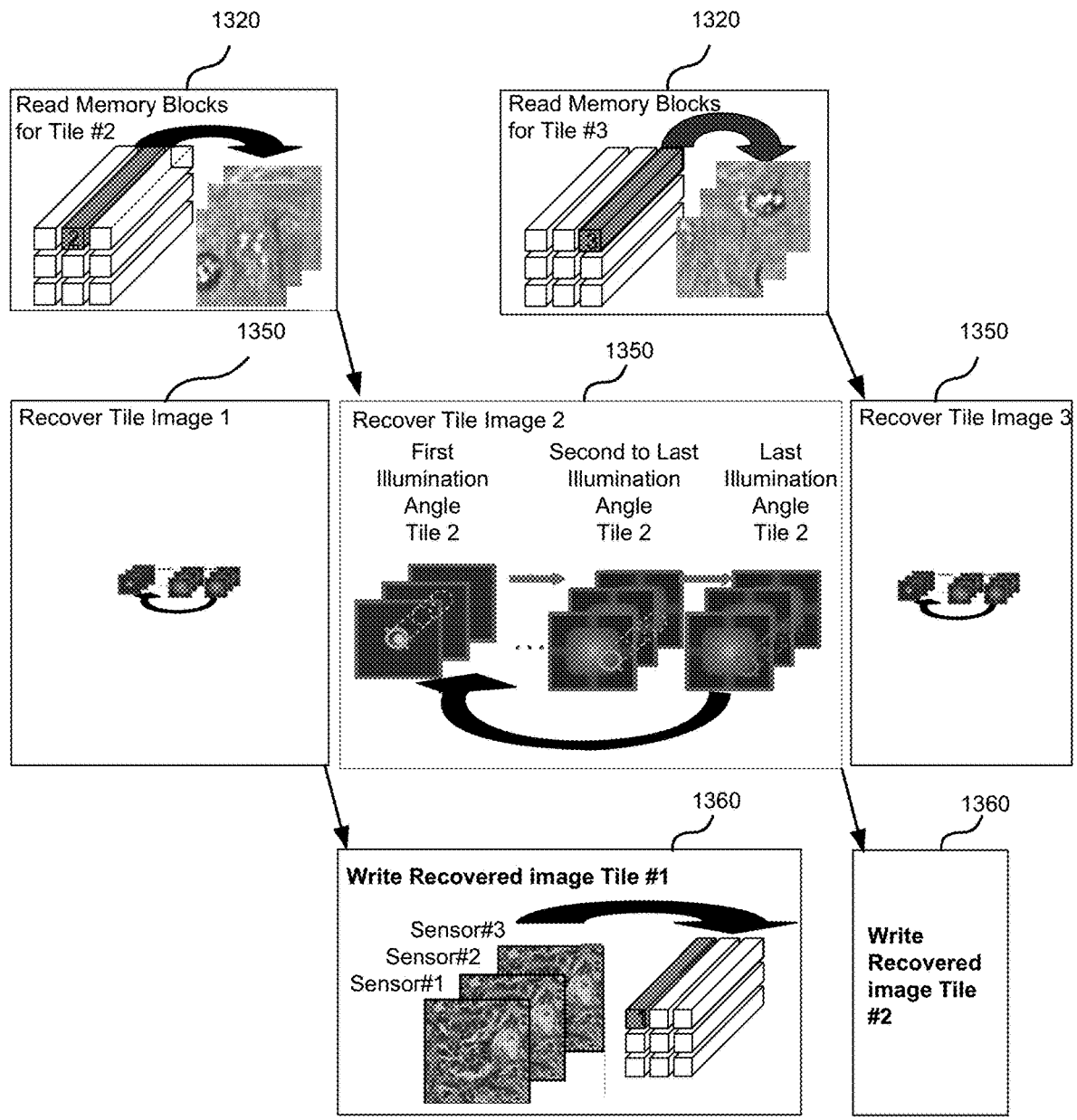
FIG. 14 is a schematic illustration of the example of the cascading, parallel restoration process shown in FIG. 13, according to some implementations.

At operation 1360, the processor, $P_i$, indexes and writes the improved resolution image for the $Q_i$, tile for each image sensor to the external drive. The resultant chunk of restored images for all the images sensors of dimensions (e.g., number of image sensors×256×256) is saved in the corresponding chunk of the hypercube, which is also managed by the in-memory parallel file system. Such image indexing and saving at operation 1360 are illustrated in FIGS. 13 and 14. Both image loading and saving in operation 1360 are performed in a cascading fashion (asynchronously) with the image restoration operations 1350 to reduce the processor idling time in data transfer.

Enabled by the data alignment of the image chunks and the identical illumination pattern across all the image sensors, multiple image segments can be restored by the multiple processors in a massively parallel manner. As illustrated in FIGS. 13 and 14, a chunk of image segments for all image sensors can be processed simultaneously since it is based on the same illumination angle. This improves computation efficiency substantially because one image chunk only requires one set of function calls and data read/write instead of for all the sensors, reducing the processing overhead.

FIG. 13 also includes a diagram at the bottom showing a timeline of the three-stage pipeline of the parallel processes during parallel, cascading image restoration process. As shown, a first processor performs the three-stage pipeline operations 1320, 1350, and 1360. In parallel, as the first processor performs operation 1350, a second processor performs operation 1320. In parallel, as the first processor performs operation 1360, the second processor performs, operation 1350, and a third processor performs operation 1320. In parallel, as the second processor performs operation 1360, the third processor performs operation 1350, and a further processor performs operation 1320, and so on.

FIG. 14 is a schematic diagram of the three-stage pipeline of a portion of the parallel processes during parallel, cascading image restoration process. As shown, a first processor performs operation 1350 to recover a higher resolution image of tile 1, a second processor performs operation 1320 to link and load the memory block for tile 2. As the first processor performs operation 1360 to index and save the recovered higher resolution image of tile 1 to the external memory, the second processor performs operation 1350 to recover high-resolution image of tile 2, and a third processor performs operation 1320 to link and load the memory block for tile 3.

During the acquisition phase, each tile is uniquely identified by the index (n, T, i, j), and the corresponding memory block resides on the external memory. By linking, the processor directly seeks the corresponding memory block of a given (n, T, i, j). By loading, the data of corresponding memory block is read and transferred to the processor.

Modifications, additions, or omissions may be made to any of the above-described embodiments without departing from the scope of the disclosure. Any of the embodiments described above may include more, fewer, or other features without departing from the scope of the disclosure. Additionally, the steps of the described features may be performed in any suitable order without departing from the scope of the disclosure.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, object-oriented techniques. The software code may be stored as a series of instructions, or commands on a CRM such as a random access memory (RAM), a read only memory (ROM), a magnetic medium such as a hard-drive or a floppy disk, or an optical medium such as a CD-ROM. Any such CRM may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. An imaging system comprising:
   an illumination system having an array of light sources configured to sequentially activate different subsets of light sources in the array to provide a plurality of illumination patterns incident one or more sample wells;
   an optical system configured to focus light transmitted through the one or more sample wells;
   one or more sets of image sensors, each set configured to receive light focused by the optical system from one sample well of the one or more sample wells and configured to acquire a plurality of raw images, each raw image acquired while illumination of one of the illumination patterns is incident at least the one sample well;
   one or more multiplexers, each multiplexer in communication with one set of the one or more sets of image sensors, each multiplexer and configured to forward raw images acquired by the one set of image sensors;
   an internal memory comprising an in-memory parallel system;
   a hard drive; and
   a plurality of processors comprising at least a first processor and a second processor, each processor in read/write communication with the memory and in communication with one of the multiplexers, each processor configured to: (i) perform sorting, segmenting, and indexing of the plurality of raw images incoming from each image sensor of the one set of image sensors to a four-dimensional hypercube formed in the in-memory parallel system and (ii) write segments of the four-dimensional hypercube to memory blocks on the hard drive,
   the plurality of processors comprising a first processor, a second processor and a third processor, the first processor configured to import memory blocks for a first tile while the second processor reconstructs an improved resolution image for a second tile using a reconstruction process and while the third processor writes an improved resolution image for a third tile to the hard drive.

2. The imaging system of claim 1, wherein the segments of the four-dimensional hypercube are linked to memory blocks on the hard drive.

3. The imaging system of claim 1, wherein the one or more sample wells are in a multi-well plate loaded into the imaging system during operation.

4. The imaging system of claim 1, wherein the plurality of processors are further configured to perform a cascading, parallel restoration operation to generate an improved resolution image for each of the one or more sample wells based on the plurality of raw images acquired for the respective well based on the plurality of illumination patterns.

5. The imaging system of claim 1,
   wherein each of the plurality of processors is configured to import memory blocks for one tile, to reconstruct an improved resolution image for the one tile using the reconstruction process, and to write the improved resolution image for the one tile for the one or more sets of image sensors to the hard drive.

6. The imaging system of claim 5, wherein each of the plurality of processors is configured to import, reconstruct, and write in a cascading manner.

7. The imaging system of claim 1, wherein the plurality of processors are further configured to discard one or more of the plurality of raw images before performing sorting, segmenting, and indexing of the plurality of raw images.

8. The imaging system of claim 1, wherein a master processor of the plurality of processors is configured to sequentially active different subsets of the light sources to provide the plurality of illumination patterns incident the one or more sample wells and activate the one or more sets of image sensors to acquire one of the plurality of images while light from one of the illumination patterns is incident the one or more sample wells.

9. An imaging method comprising:
- sequentially activating different subsets of light sources in an array of light sources to sequentially provide a plurality of illumination patterns of illumination incident one or more sample wells;
- acquiring, by each set of one or more sets of image sensors, a plurality of raw images, each raw image acquired while illumination of one of the illumination patterns is incident the one or more sample wells;
- sorting, segmenting, and indexing of the plurality of raw images incoming from each set of the one or more sets of image sensors to a four-dimensional hypercube formed in an in-memory parallel system;
- writing segments of the four-dimensional hypercube to linked memory blocks on a hard drive; and
- importing, with a first processor, memory blocks for a first tile from the hard drive while a second processor reconstructs an improved resolution image for a second tile using a reconstruction process and while a third processor writes an improved resolution image for a third tile to the hard drive.

10. The imaging method of claim 9, further comprising linking segments of the four-dimensional hypercube to memory blocks on the hard drive.

11. The imaging method of claim 9, further comprising loading a multi-well plate with the one or more sample wells.

12. The imaging method of claim 9, further comprising performing a cascading, parallel restoration operation to generate an improved resolution image for each of the one or more sample wells using image data from the plurality of raw images acquired for the respective well based on the plurality of illumination patterns.

13. The imaging method of claim 9, further comprising discarding one or more of the plurality of raw images before performing sorting, segmenting, and indexing of the plurality of raw images.

14. The imaging method of claim 9, further comprising multiplexing the plurality of raw images from each of the one or more sets of the image sensors to one of the plurality of processors.

* * * * *